(12) United States Patent
Suzuki et al.

(10) Patent No.: US 7,910,868 B2
(45) Date of Patent: *Mar. 22, 2011

(54) AUTOFOCUS DEVICE DETECTING FOCUS POINT WITH LIQUID CRYSTAL LENS

(75) Inventors: Kazuo Suzuki, Fujimino (JP); Yuichi Kato, Higashiyamato (JP); Takahiro Kawada, Sayama (JP); Yasuhiro Kageyama, Tokorozawa (JP); Tomohiro Ando, Higashimurayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1066 days.

This patent is subject to a terminal disclaimer.

(21) Appl. No.: 11/660,508

(22) PCT Filed: Nov. 15, 2005

(86) PCT No.: PCT/JP2005/020973
§ 371 (c)(1),
(2), (4) Date: Feb. 20, 2007

(87) PCT Pub. No.: WO2006/054562
PCT Pub. Date: May 26, 2006

(65) Prior Publication Data
US 2007/0279539 A1 Dec. 6, 2007

(30) Foreign Application Priority Data

Nov. 16, 2004 (JP) ................. 2004-331719
Mar. 1, 2005 (JP) ................. 2005-055570
Mar. 14, 2005 (JP) ................. 2005-070588
Aug. 29, 2005 (JP) ................. 2005-247641
Sep. 8, 2005 (JP) ................. 2005-260593

(51) Int. Cl.
*G02B 7/04* (2006.01)

(52) U.S. Cl. ................ 250/201.2; 250/208.1
(58) Field of Classification Search ........... 250/201.2, 250/208.1, 214 R, 201.4, 201.5; 349/33, 349/200; 396/14, 15, 72
See application file for complete search history.

(56) References Cited

U.S. PATENT DOCUMENTS
7,532,303 B2 * 5/2009 Kato et al. ............ 349/200
(Continued)

FOREIGN PATENT DOCUMENTS
JP 61-140908 A 6/1986
(Continued)

OTHER PUBLICATIONS

Hain M et al., Fast switching liquid crystal lenses for a dual focus digital versatile disc pickup, Optics Communication, North-Holland Publishing Co. Amsterdam, NL, vol. 188, No. 5-6, Feb. 15, 2001 pp. 291-299.

(Continued)

*Primary Examiner* — Que T Le
(74) *Attorney, Agent, or Firm* — Sughrue Mion, PLLC

(57) ABSTRACT

Predetermined voltage is applied to a liquid crystal lens by a liquid crystal lens driver. Image signals are generated based on an optical image passed through the liquid crystal lens during transient response operation caused by application of the predetermined voltage, and plural focus signals are extracted by sampling the image signals at predetermined cycles. Levels of the extracted autofocus signals are compared to determine the maximum value of the autofocus signal. Thus, with the liquid crystal lens, by making use of the transient response operation of the liquid crystal lens, a focus point can be detected in sufficient speed.

16 Claims, 37 Drawing Sheets

U.S. PATENT DOCUMENTS

| | | | |
|---|---|---|---|
| 7,683,975 B2 * | 3/2010 | Kageyama | 349/33 |
| 2002/0041445 A1 | 4/2002 | Nishioka et al. | |
| 2002/0145701 A1 | 10/2002 | Sun et al. | |

FOREIGN PATENT DOCUMENTS

| | | | |
|---|---|---|---|
| JP | 61-156228 A | 7/1986 |
| JP | 62-36632 A | 2/1987 |
| JP | 1-15188 B2 | 3/1989 |
| JP | 2-11068 B2 | 3/1990 |
| JP | 2-44248 Y2 | 11/1990 |
| JP | 5-53089 A | 3/1993 |
| JP | 2742741 B2 | 2/1998 |
| JP | 3047082 B2 | 3/2000 |
| JP | 2001-154085 A | 6/2001 |
| JP | 2002-122784 A | 4/2002 |
| JP | 2002-228816 A | 8/2002 |
| JP | 2004-191893 A | 7/2004 |

OTHER PUBLICATIONS

Kentaro Hanma et al., "Auto Focus System by Detecting Edge Component of Video Signal", Institute of Television Engineers (ITE) Technical Report, Nov. 1982, p. 7-12, vol. 6, No. 29, and a partial English translation of p. 7.

* cited by examiner

FIG.7

| CLASS | | CORE VOLTAGE: Vinner [V] | PERIPHERAL VOLTAGE: Vouter [V] | FOCAL LENGTH f [mm] |
|---|---|---|---|---|
| CONVEX LENS | 1 | 1 | 5 | 100 |
| | 2 | 1 | 4 | 200 |
| | 3 | 1 | 3 | 500 |
| | 4 | 1 | 2 | 1000 |
| | 5 | 1 | 1 | ∞ |
| CONCAVE LENS | 6 | 2 | 1 | -1000 |
| | 7 | 3 | 1 | -500 |
| | 8 | 4 | 1 | -200 |
| | 9 | 5 | 1 | -100 |

| TEMPERA-TURE (°C) | RESPONSE TIME (MS) | | SERIAL EXTRACTION PROCESSING TIME (S) | COLLECTIVE EXTRACTION SAMPLING NUMBER |
|---|---|---|---|---|
| | tf | tr | | |
| 40 | 100 | 100 | 1 | 4 |
| 35 | 120 | 120 | 1.2 | 4 |
| 30 | 150 | 150 | 1.5 | 6 |
| 25 | 200 | 200 | 2 | 8 |
| 20 | 250 | 250 | 2.5 | 10 |
| 15 | 300 | 300 | 3 | 12 |
| 10 | 400 | 400 | 4 | 16 |
| 5 | 500 | 500 | 5 | 20 |
| 0 | 650 | 650 | 6.5 | 26 |

| | CORE VOLTAGE: Vinner [V] | PERIPHERAL VOLTAGE: Vouter [V] | FOCAL LENGTH: f [mm] | LENS LEVEL |
|---|---|---|---|---|
| CONVEX LENS | 1 | 5 | 100 | 0 |
| | 1 | 4 | 200 | 1 |
| | 1 | 3 | 500 | 2 |
| | 1 | 2 | 1000 | 3 |
| | 1 | 1 | ∞ | 4 |
| CONCAVE LENS | 2 | 1 | −1000 | 5 |
| | 3 | 1 | −500 | 6 |
| | 4 | 1 | −200 | 7 |
| | 5 | 1 | −100 | 8 |

FIG.40

| | ELAPSED TIME FROM TRANSIENT REAPONSE (MS) | LENS LEVEL |
|---|---|---|
| TEMPERATURE STATE 1 | 150 | 0 |
| | 250 | 1 |
| | 330 | 2 |
| | 450 | 3 |
| | 600 | 4 |
| | 680 | 5 |
| | 780 | 6 |
| | 900 | 7 |
| | 1000 | 8 |
| TEMPERATURE STATE 2 | 160 | 0 |
| | 270 | 1 |
| | 360 | 2 |
| | 490 | 3 |
| | 650 | 4 |
| | 740 | 5 |
| | 850 | 6 |
| | 980 | 7 |
| | 1090 | 8 |
| TEMPERATURE STATE 3 | 170 | 0 |
| | 290 | 1 |
| | 380 | 2 |
| | 520 | 3 |
| | 680 | 4 |
| | 790 | 5 |
| | 900 | 6 |
| | 1050 | 7 |
| | 1160 | 8 |
| TEMPERATURE STATE 4 | 200 | 0 |
| | 330 | 1 |
| | 430 | 2 |
| | 580 | 3 |
| | 750 | 4 |
| | 880 | 5 |
| | 1000 | 6 |
| | 1170 | 7 |
| | 1300 | 8 |

AUTOFOCUS DEVICE DETECTING FOCUS POINT WITH LIQUID CRYSTAL LENS

TECHNICAL FIELD

The present invention relates to an autofocus device, and particularly to an autofocus device that detects a focus point using a liquid crystal lens for adjustment of focal length, by extracting plural focus signals corresponding to a focus matching degree from image signals obtained from optical images that are formed through the liquid crystal lens during transient response operation of the liquid crystal lens, and by detecting a peak value of the focus signal.

BACKGROUND ART

Conventionally, as a focus mechanism changing the focal length or focus position of an optical system, the system of adjusting the focus by moving a lens has been widely used. However, this system needs a lens drive mechanism and thus has defects that the mechanism becomes complicated and needs comparatively high electric power for the lens-drive motor. Moreover, shock resistance is generally low. Therefore, as a focus mechanism that does not require the lens drive mechanism, such a system that adjusts the focus by changing the refractive index of a liquid crystal lens has been proposed (for example, see Patent document 1).

The liquid crystal lens for attaining this conventional system has a configuration of holding a liquid crystal layer between two glass substrates each of which is equipped with a pattern electrode and a common electrode. This pattern electrode has a core electrode and plural ring electrodes, and has a configuration that the core electrode and each of the ring electrodes are connected by a voltage drop resistor. To an extraction electrode that is connected to the core electrode but is insulated from each ring electrode, a variable resistor is connected via a power amplifier, and to an extraction electrode that is connected to a ring electrode (a peripheral electrode), variable resistor is connected via an amplifier. Furthermore, the alternating voltage supplied from the alternating power source connected in parallel with these variable resistors is lowered by the variable resistors.

Thus, voltage distribution is formed by the voltage signal applied to the extraction electrodes and the voltage drop resistors, and voltage distribution is formed on the liquid crystal layer. By adjusting each variable resistor, it becomes possible to generate various forms of voltage distribution on the liquid crystal layer.

As an autofocus (automatic focus) system for a video camera, a contour detection system is publicly known that extracts information corresponding to blurriness of an image directly from a photograph image signal and carries out hill-climbing control of the lens to minimize the blurriness (for example, see Non-patent literature 1). Various autofocus devices and the like using this hill-climbing control system have been proposed (for example, see Patent document 2, Patent document 3, Patent document 4, and Patent document 5).

Patent Document 1: Japanese Patent Publication No. 3047082
Patent Document 2: Japanese Utility Model Application Publication No. H2-44,248
Patent Document 3: Japanese Patent Publication No. 2742741
Patent Document 4: Japanese Patent Application Publication No. H1-15188
Patent Document 5: Japanese Patent Application Publication No. H2-11068

Non-patent Literature 1: Technical Report of Institute of Television Engineers of Japan, Nov. 29, 1982, pp. 7-12, titled "Contour Detection Autofocus System" by Kentaro Hanma and four others

DISCLOSURE OF INVENTION

Problem to be Solved by the Invention

However, adjustment of the focus by controlling changes in the refractive index of the liquid crystal lens by the hill-climbing control has not been reported, so far. It is considered that is because the liquid crystal lens takes a long time to detect the focus point by the hill-climbing control. For example, assuming that 50 focus positions are set in advance in a short- and long-distance view, and assuming that it is necessary to check 25 positions on average until a peak position is found when the peak information corresponding to blurriness is searched in a certain direction, time required to detect the focus point is compared between the method of moving a lens is applied and the method of using a liquid crystal lens is applied.

In the method of moving the lens, such an operation is repeated that the lens is moved to a position corresponding to a certain position and the information corresponding to the blurriness is obtained at this time, then the lens is moved to another position corresponding to a next position and obtains the information corresponding to blurriness. In this case, since the processing time at one position is as short as 67 milliseconds, for example, the time required for detecting the focus point is approximately 1.7 seconds (=67 ms/position× 25 position) on an average.

On the other hand, in the method using the liquid crystal lens, to drive the liquid crystal lens, distribution of the refractive index of the liquid crystal is altered by changing the voltage (driving voltage) applied. Accordingly, such an operation is repeated should be repeated that a driving voltage corresponding to a certain position is applied to the liquid crystal lens to obtain information corresponding to the blurriness at that time, and then a driving voltage corresponding to a next position is applied to the liquid crystal lens to obtain the information corresponding to the blurriness.

However, since the response of the liquid crystal to the driving voltage change is generally delayed, it is necessary to wait after change of the driving voltage until the response of the liquid crystal is stabilized. Therefore, the processing time per one position becomes long, for example 500 milliseconds, and the time to detect a focus point takes approximately 12.5 seconds (500 milliseconds/position×25 positions) on average, and it is impractical.

Moreover, according to Patent Document 1, the liquid crystal lens has a configuration in which voltages are applied to both ends of the voltage drop resistors, and naturally, there is a case when the voltage applied to one end is lower than that to the other end. For example, when the liquid crystal is expected to act as a convex lens, low voltage is applied to one extraction electrode, and high voltage is applied to another extraction electrode.

In this case, depending on a used liquid crystal material of the liquid crystal layer, the completion time of the transient response of the liquid crystal on the side of lower applied voltage becomes later than the completion time of the transient response of the liquid crystal on the side of higher applied voltage. Thus, for a liquid crystal lens to act as a convex lens, the lens has to respond to the voltage applied all over the crystal, but when transient response is completed at a later time on some places of the crystal layer, the response time of the liquid crystal on the side with the low applied voltage determines the required time for the crystal to function as a convex lens. In other words, during the transient response state, the refractive index distribution suitable as a convex lens has not been obtained.

Especially, when trying to pull out the power of the lens to the maximum extent, voltage difference between the core electrode and the peripheral electrode is made the maximum, thus on the side of the liquid crystal layer to which a lower voltage is applied, the lowest possible voltage at which liquid crystal molecules effectively operate is to be used, so that there has been a problem that a long time period is required until the lens becomes to have a suitable refractive index distribution on this side (until the transient response is completed).

Furthermore, when the power of a lens is enlarged as much as possible, the birefringence index of the liquid crystal material or thickness of the liquid crystal layer must be enlarged. However, when such a configuration is adopted, there has been a problem that the response of the liquid crystal becomes slow and a long time-period is required until the lens becomes to have a suitable refractive index distribution.

To solve the problems in the conventional technology mentioned above, it is an object of the present invention to provide an autofocus device that can detect the focus point with a sufficient speed for practical use, by detecting a peak value of focus signals after collectively extracting plural focus signals corresponding to a focus matching degree during a transient response operation of a liquid crystal lens.

Means for Solving Problem

To solve the above problems and to achieve an object, an autofocus device according to the present invention includes an optical lens unit including a liquid crystal lens; a photoelectric converting unit that converts an optical image formed through the optical lens unit into an electrical signal to output an image signal; and a liquid crystal lens control unit that extracts a focus signal corresponding to a focus matching degree from the image signal, and controls a driving condition of the liquid crystal lens such that the focus signal becomes maximum value. The liquid crystal lens control unit includes a voltage applying unit that applies a predetermined voltage to the liquid crystal lens, a focus signal extracting unit that extracts a plurality of focus signals by performing, at predetermined cycles, sampling of an image signal generated based on an optical image that has passed through the liquid crystal lens under transient response operation caused by application of the predetermined voltage by the voltage applying unit, and a focus point judging unit that judges a maximum value of the focus signal based on the focus signals extracted by the focus signal extracting unit.

According to the above described invention, in the autofocus device of the present invention, the voltage applying unit applies, as the predetermined voltage, a voltage to bring the liquid crystal lens into a convex lens state.

According to the above described invention, in the autofocus device of the present invention, the voltage applying unit applies, as the predetermined voltage, a voltage to bring the liquid crystal lens into a concave lens state.

According to the above described invention, in the autofocus device of the present invention, wherein the voltage applying unit applies, as the predetermined voltage, a first voltage to bring the liquid crystal lens into a convex lens state, and a second voltage to bring the liquid crystal lens into a concave lens state, at different timings. Moreover, according to the above described invention, in the autofocus device of the present invention, the voltage applying unit applies voltage such that a period is present in which a third voltage that is neither to bring the liquid crystal lens into the convex lens state nor to bring the liquid crystal lens into the concave lens state is applied, between a period in which the first voltage is applied to the liquid crystal lens and a period in which the second voltage is applied to the liquid crystal lens.

According to above described invention, in the autofocus device of the present invention, when it is judged that the focus signal is at a maximum value while the liquid crystal lens is in the transient response operation caused by application of either of the first voltage or the second voltage, the liquid crystal lens control unit cancels application of the other one of the first voltage and the second voltage to the liquid crystal lens.

According to the above described invention, in the autofocus device of the present invention, the liquid crystal lens includes a liquid crystal layer held between two transparent substrates each of which has a pattern electrode and a common electrode formed thereon, the pattern electrode including a core electrode and peripheral electrodes connected with resistors, and the voltage applying unit applies different predetermined voltages to the core electrode and to the peripheral electrodes, and modulates amplitude of a smaller voltage among the different predetermined voltages.

According to the above described invention, in the autofocus device of the present invention, the voltage applying unit modulates the amplitude such that the amplitude is enlarged only during a predetermined time, and then, is gradually attenuated to be returned to a predetermined amplitude.

According to the above described invention, in the autofocus device of the present invention, the liquid crystal lens includes a liquid crystal layer held between two transparent substrates each of which has a pattern electrode and a common electrode formed thereon, the pattern electrode including a core electrode and peripheral electrodes connected with resistors, and the voltage applying unit applies different predetermined voltages to the core electrode and to the peripheral electrodes, and modulates a pulse width of a smaller voltage among the different predetermined voltages.

According to the above described invention, in the autofocus device of the present invention, the voltage applying unit modulates the pulse width such that the pulse width is widened only during a predetermined time, and then, is gradually narrowed to be returned to a predetermined pulse width.

According to the above described invention, in the autofocus device of the present invention, the focus signal extracting unit includes a focus signal serial extraction unit that extracts a plurality of focus signals by performing the sampling in a state in which liquid crystal operation of the liquid crystal lens is stabilized while changing the voltage applied to the liquid crystal lens by the voltage applying unit; and a focus signal collective extraction unit that extracts a plurality of focus signals by performing, at predetermined cycles, the sampling of the image signal generated based on the optical image that has passed through the liquid crystal lens under the transient response operation caused by application of the predetermined voltage by the voltage applying unit.

According to the above described invention, in the autofocus device of the present invention, the liquid crystal lens control unit further includes an extraction method selecting unit that performs selection between the focus signal serial extraction unit and the focus signal collective extraction unit.

According to the above described invention, the autofocus device of the present invention further includes a temperature detecting unit that detects temperature of the liquid crystal lens. The extraction method selecting unit selects the focus signal serial extraction unit or the focus signal collective extraction unit based on information indicative of the temperature detected by the temperature detecting unit.

According to the above described invention, in the autofocus device the present invention, the liquid crystal lens control unit further includes a measuring unit that measures elapsed time since the sampling is started; a first storage unit that stores data in which a focal length of the liquid crystal lens and the elapsed time are associated; and a second storage unit that stores a focal length corresponding to a focus signal judged to be maximum based on the elapsed time using the data stored in the first storage unit, and the liquid crystal lens control unit adjusts the liquid crystal lens to the focal length after the sampling is completed, regarding the focal length stored in the second storage unit as a focal length of the focus point.

According to the above described invention, the autofocus device of the present invention further includes a temperature detecting unit that detects temperature of the liquid crystal lens. The first storage unit stores a plurality of pieces of data in which a focal length at each temperature and the elapsed time are associated for each temperature, and a focal length is stored in the second storage unit using data corresponding to temperature information from the temperature detecting unit.

According to the above described invention, the autofocus device of the present invention further includes a camera lens unit including the voltage applying unit, the focus signal extracting unit; the measuring unit, the first storage unit; the optical lens unit, and the photoelectric converting unit; and an autofocus controller including the focus point judging unit and the second storage unit. The camera lens unit and the autofocus controller are connected through an interface, and the voltage applying unit and the focus signal extracting unit in the camera lens unit are operated by an instruction from the autofocus controller to store a desired focal length in the second storage unit.

EFFECT OF THE INVENTION

According to the present invention, it is possible to obtain an autofocus device capable of detecting a focus point sufficiently speedily in practical use by using a liquid crystal lens for adjustment of focal length, by collectively extracting multiple focus signals corresponding to focus matching degree during a transient response operation of the liquid crystal lens, and by detecting a peak value of the focus signals.

BRIEF DESCRIPTION OF DRAWINGS

FIG. 7 is a table showing an example of a relation between the focal length of the liquid crystal lens and a driving voltage in a static condition;

FIG. 8-1 is an explanatory diagram showing a first voltage application pattern to the liquid crystal lens;

FIG. 8-2 is an explanatory diagram showing the first voltage application pattern to the liquid crystal lens;

FIG. 8-3 is a chart showing change in inverse of the focal length in the first voltage application pattern;

FIG. 9-1 is an explanatory diagram showing a second voltage application pattern to the liquid crystal lens;

FIG. 9-2 is an explanatory diagram showing the second voltage application pattern to the liquid crystal lens;

FIG. 9-3 is a chart showing change in inverse of the focal length in the second voltage application pattern;

FIG. 10-1 is an explanatory diagram showing a third voltage application pattern to the liquid crystal lens;

FIG. 10-2 is an explanatory diagram showing the third voltage application pattern to the liquid crystal lens;

FIG. 10-3 is a chart showing change in inverse of the focal length in the third voltage application pattern;

FIG. 11-1 is an explanatory diagram showing a fourth voltage application pattern to the liquid crystal lens;

FIG. 11-2 is an explanatory diagram showing the fourth voltage application pattern to the liquid crystal lens;

FIG. 11-3 is a chart showing change in inverse of the focal length in the fourth voltage application pattern;

FIG. 12-1 is an explanatory diagram showing a fifth voltage application pattern to the liquid crystal lens;

FIG. 12-2 is an explanatory diagram showing the fifth voltage application pattern to the liquid crystal lens;

FIG. 12-3 is a chart showing change in inverse of the focal length in the fifth voltage application pattern;

FIG. 13-1 is an explanatory diagram showing a sixth voltage application pattern to the liquid crystal lens;

FIG. 13-2 is an explanatory diagram showing the sixth voltage application pattern to the liquid crystal lens;

FIG. 13-3 is a chart showing change in inverse of the focal length in the sixth voltage application pattern;

FIG. 14-1 is an explanatory diagram showing a seventh voltage application pattern to the liquid crystal lens;

FIG. 14-2 is an explanatory diagram showing the seventh voltage application pattern to the liquid crystal lens;

FIG. 14-3 is a chart showing change in inverse of the focal length in the seventh voltage application pattern;

FIG. 15-1 is an explanatory diagram showing an eight voltage application pattern to the liquid crystal lens;

FIG. 15-2 is an explanatory diagram showing the eighth voltage application pattern to the liquid crystal lens;

FIG. 15-3 is a chart showing change in inverse of the focal length in the eight voltage application pattern;

FIG. 16-1 is an explanatory diagram showing a ninth voltage application pattern to the liquid crystal lens;

FIG. 16-2 is an explanatory diagram showing the ninth voltage application pattern to the liquid crystal lens;

FIG. 16-3 is a chart showing change in inverse of the focal length in the ninth voltage application pattern;

FIG. 17-1 is an explanatory diagram showing a tenth voltage application pattern to the liquid crystal lens;

FIG. 17-2 is an explanatory diagram showing the tenth voltage application pattern to the liquid crystal lens;

FIG. 17-3 is a chart showing change in inverse of the focal length in the tenth voltage application pattern;

FIG. 18-1 is an explanatory diagram showing an eleventh voltage application pattern to the liquid crystal lens;

FIG. 18-2 is an explanatory diagram showing the eleventh voltage application pattern to the liquid crystal lens;

FIG. 18-3 is a chart showing change in inverse of the focal length in the eleventh voltage application pattern;

FIG. 19-1 is an explanatory diagram showing a twelfth voltage application pattern to the liquid crystal lens;

FIG. 19-2 is an explanatory diagram showing the twelfth voltage application pattern to the liquid crystal lens;

FIG. 19-3 is a chart showing change in inverse of the focal length in the twelfth voltage application pattern;

FIG. 27-1 is an explanatory diagram showing an example of a profile of a voltage Vouter applied to a peripheral electrode in the liquid crystal lens mounted on the autofocus device according to the fourth embodiment;

FIG. 27-2 is an explanatory diagram showing an example of a profile of a voltage Vinner applied to a core electrode in the liquid crystal lens mounted on the autofocus device according to the fourth embodiment;

FIG. 27-3 is a diagram showing change in inverse of the focal length when voltage profiles according to FIG. 27-1 and FIG. 27-2 are applied to the liquid crystal lens mounted on the autofocus device according to the fourth embodiment;

FIG. 35-1 is a graph showing a voltage application pattern to the liquid crystal lens and the change in inverse of the focal length in a focus signal serial extraction control;

FIG. 35-2 is a graph showing a voltage application pattern to the liquid crystal lens and the change in inverse of the focal length in the focus signal serial extraction control;

FIG. 35-3 is a graph showing a voltage application pattern to the liquid crystal lens and the change in inverse of the focal length in the focus signal serial extraction control;

FIG. 36-1 is a graph schematically showing an operation of the focus signal serial extraction control;

FIG. 36-2 is a graph schematically showing an operation of the focus signal serial extraction control;

FIG. 40 is a table showing an example correspondence table of elapsed time from start of the transient response operation and the lens level.

Figure 1:
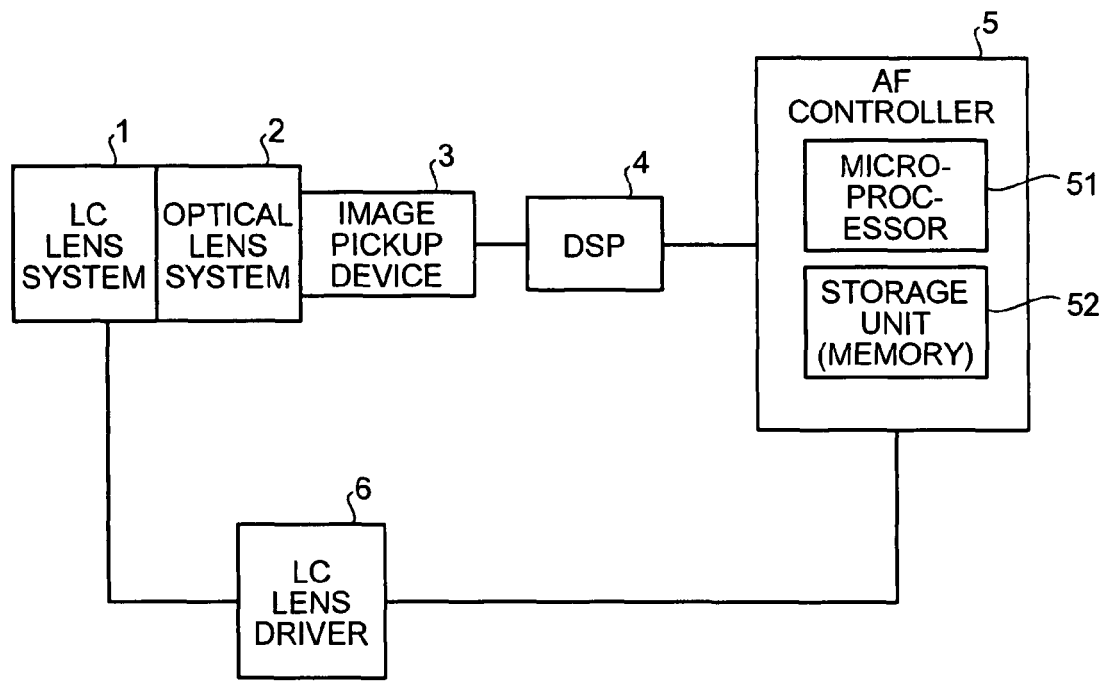
FIG. 1 is a block diagram of a schematic configuration of an autofocus device according to the present invention.

EXPLANATIONS OF LETTERS OR NUMERALS 1, 7 Optical lens unit (liquid crystal lens)
2 Optical lens unit (pan-focus group lens)
3 Photoelectric converting unit (image pickup device)
4 Photoelectric converting unit (DSP)
5 Liquid crystal lens control unit, Focus signal extracting unit, Focus point judging unit (autofocus controller)
6 Voltage applying unit (liquid crystal lens driver)
8, 9 Glass substrate
10 Pattern electrode
11 Common electrode
12, 13 Oriented film
14 Liquid crystal layer
15 Lens unit
16 Sealing member
17 Spacer member
18 Electrode takeout portion
19 Flexible printed circuit board (FPC)
20 Core electrode
21 Ring electrode
22 Ring electrode (peripheral electrode)
23 Ring connection
24 Core extraction electrode
25 Peripheral extraction electrode
51 Microprocessor
52 Storage unit

BEST MODE(S) FOR CARRYING OUT THE INVENTION

Exemplary embodiments of an autofocus device according to the present invention are explained below in detail with reference to accompanying drawings.

First Embodiment

FIG. 1 is a block diagram of a schematic configuration of the autofocus device. As shown in FIG. 1, the autofocus device includes a liquid crystal (LC) lens system 1, an optical lens system 2, an image pickup device 3, a DSP (a digital signal processor) 4, an autofocus (AF) controller 5, and a liquid crystal lens driver 6. The liquid crystal lens system 1 has a structure in which a liquid crystal lens for a P wave and a liquid crystal lens for an S wave are combined. The optical lens system 2 has an aperture, a pan-focus group lens and an infrared cut-off filter. The image pickup device 3 has an image sensor including a solid state image pickup device, such as a CCD and a CMOS, and an analog-digital converter.

The optical images focused by passing through the liquid crystal lens system 1 and the optical lens system 2 are converted into electrical signals by the image sensor of the image pickup device 3. The electrical signals output from the image sensor are converted into digital signals by the analog-digital converter. The DSP 4 performs an image processing on the digital signals output from the analog-digital converter. The autofocus controller 5 extracts multiple focus signals corresponding to the focus matching degree (hereafter referred to as autofocus signals) by sampling, with a predetermined cycle, the image signals output from the DSP 4 during transient response operation periods of the liquid crystal lens. And the autofocus controller 5 judges the sampling timing when the autofocus signal level becomes maximum based on the extracted plural autofocus signals, and controls the driving condition of the liquid crystal lens system 1 based on the result of the judgment.

The autofocus controller 5 has a microprocessor 51 that performs a series of controls mentioned above and a storage unit 52. The storage unit 52 has a read-only memory unit (ROM unit) which stores the programs the microprocessor 51 performs and various relations required to obtain the optimal driving voltage and the like, and a writable memory unit (RAM unit) used as a working area of the microprocessor 51. The liquid crystal lens driver 6 applies a voltage to the liquid crystal lens system 1, based on the control signal output from the autofocus controller 5.

Processing performed by the autofocus controller 5 will be described later. The liquid crystal lens system 1 and the optical lens system 2 correspond to the optical lens unit. The image pickup device 3 and the DSP 4 correspond to the photoelectric converting unit. The autofocus controller 5 corresponds to the focus signal extracting unit and the focus point judging unit of the liquid crystal lens control unit. The liquid crystal lens driver 6 corresponds to the voltage applying unit of the liquid crystal lens control unit.

Figure 2:
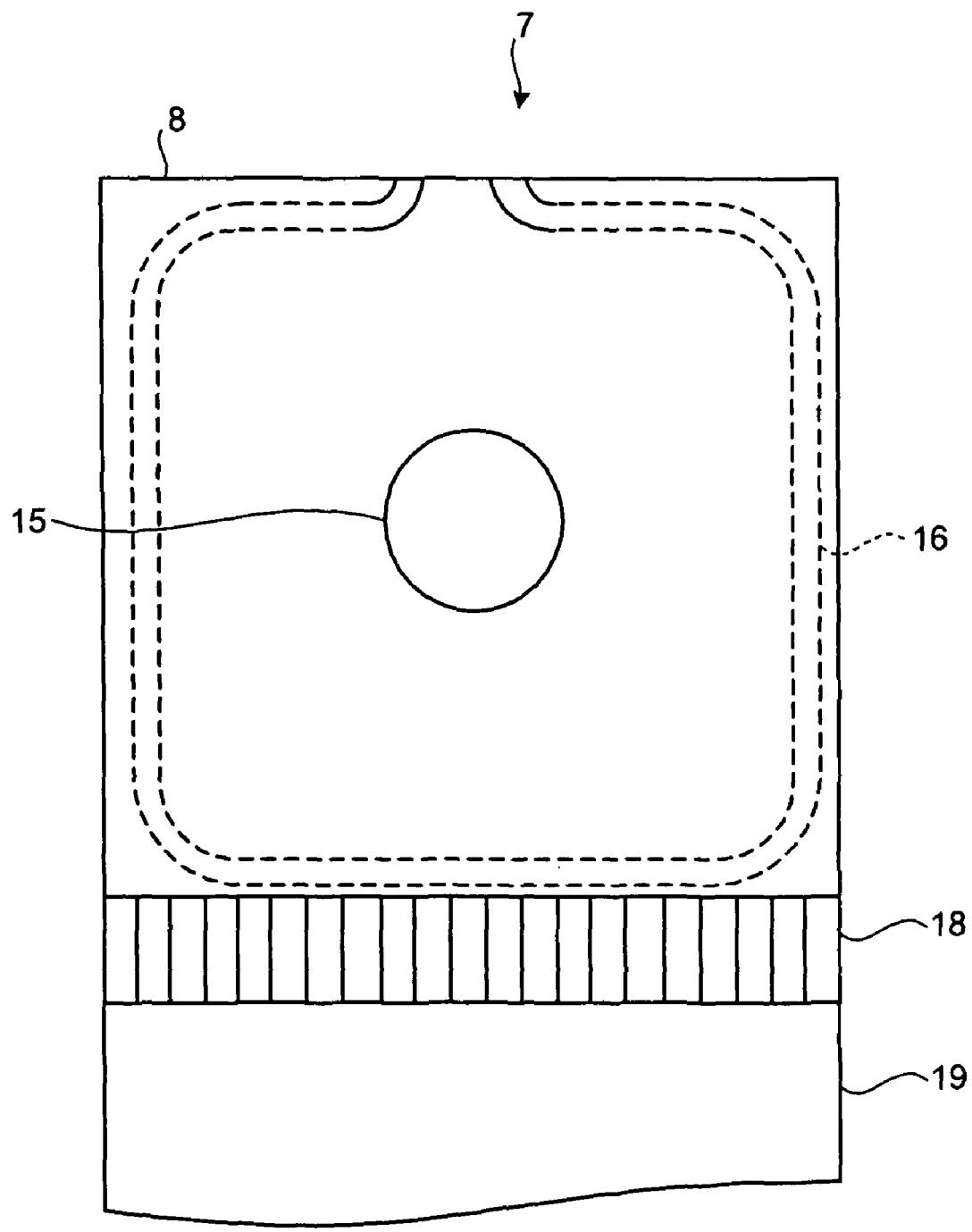
FIG. 2 is a front view of a configuration of a liquid crystal lens.
Figure 3:
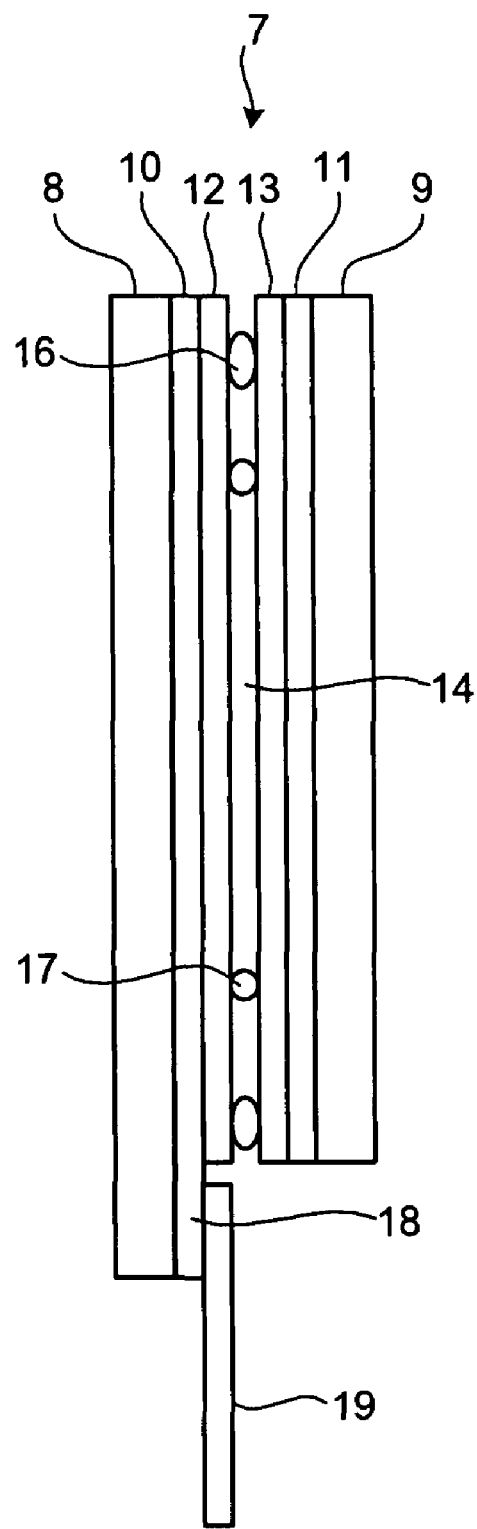
FIG. 3 is a cross-section of a configuration of a liquid crystal lens.

FIGS. 2 and 3 are, respectively, a front view and a cross-section showing a cell configuration of the liquid crystal lens. As shown in these figures, in a liquid crystal lens 7, a pattern electrode 10 and a common electrode 11 are arranged facing with each other inside a pair of confronting glass substrates 8 and 9, and inside the pattern electrode 10 and the common electrode 11, oriented films 12 and 13 are arranged face to face, constituting a liquid crystal panel with an enclosed liquid crystal layer 14 with homogeneous alignment, for example, between them.

Although the configuration of the liquid crystal lens for the P wave and that for the S wave are the same, the alignment directions of the liquid crystal layers 14 differ by 90° with each other. This is because, when the refractive index distribution of the liquid crystal lens for the P wave is changed, the light having the polarization plane in the same direction as the alignment direction of the liquid crystal lens for the P wave is affected by the change in the refractive index distribution, but the light that has the polarization plane in the direction perpendicular to the alignment direction of the liquid crystal lens for the P wave is not affected by the change in the refractive index distribution. The same may hold for the liquid crystal lens for S waves.

Therefore, two liquid crystal lenses of which alignment directions differ by 90°, i.e., the liquid crystal lenses for the P wave and for the S wave, are necessary. The liquid crystal lens for the P wave and that for the S wave are driven by the driving voltages with the same waveform. The driving voltage is, for example, a pulse height modulated (PHM) or a pulse width modulated (PWM) alternating voltage.

In the center portion of the liquid crystal panel, a lens portion 15 of which refractive index changes according to the applied voltage is formed. And the edge part of the liquid crystal panel is sealed by a sealing member 16. The thickness of the liquid crystal layer 14 is kept constant by spacer members 17. To an electrode takeout portion 18 of the pattern electrode 10, a flexible printed circuit board (FPC) 19 is connected using an anisotropic electroconductive film. A part of the electrode takeout portion 18 is insulated from the pattern electrode 10, and is connected to the common electrode 11.

Dimension of the liquid crystal lens 7 is shown as an example without limiting in particular. The length of one side of the glass substrates 8, 9 is from several mm to ten and several mm, for example, 10 mm. However, for the glass substrate 8 on the side of the pattern electrode 10, it is a dimension except the part which covers the electrode takeout portion 18 of the pattern electrode 10. The thicknesses of the glass substrates 8, 9 are about several hundreds of μm, for example, 300 μm. The thickness of the liquid crystal layer 14 is from about ten and several μm to about several tens of μm, for example, 23 μm. The diameter of the lens unit 15 is about several mm, for example, 2.4 mm.

Figure 4:
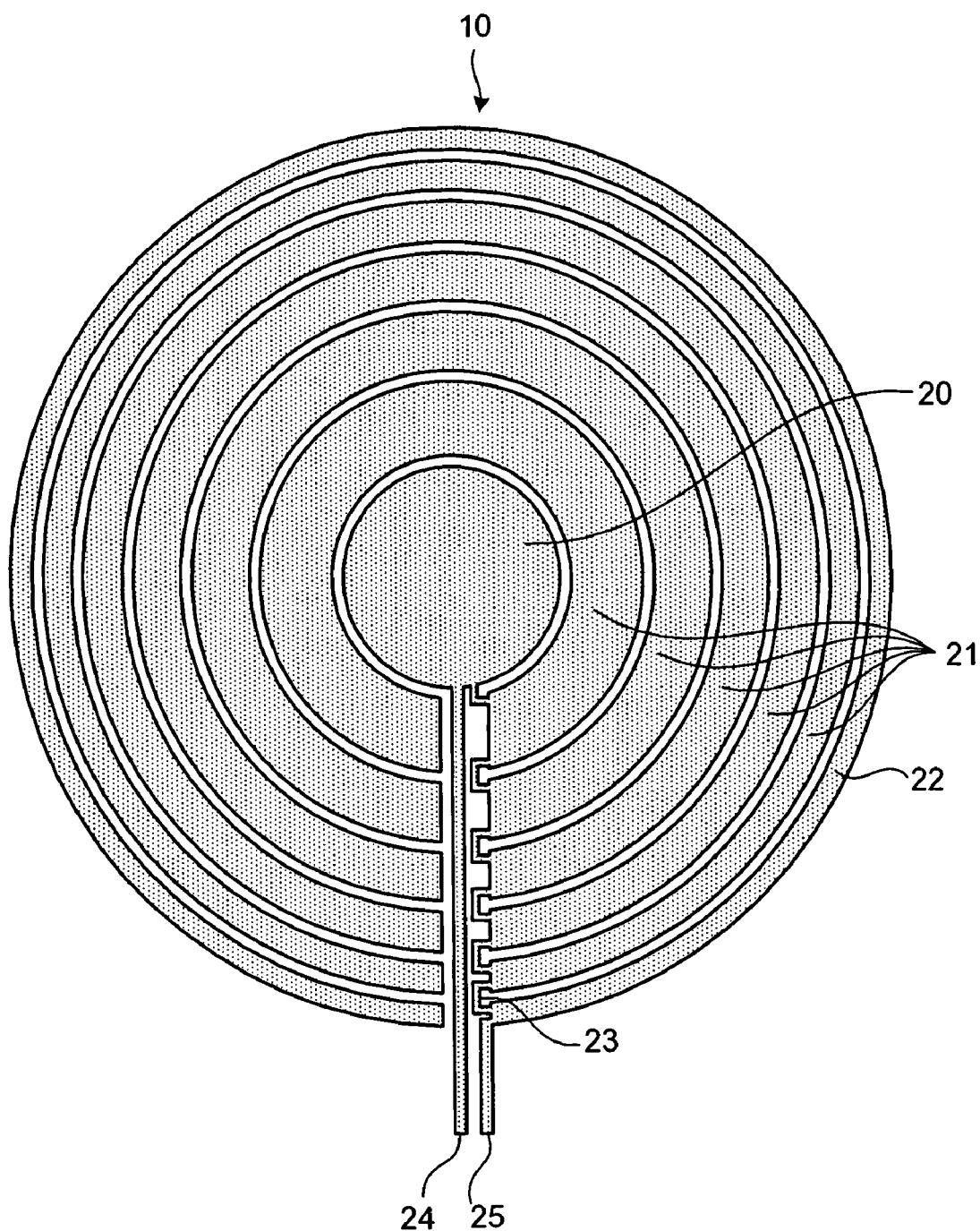
FIG. 4 is a front view of a configuration of a pattern electrode.

FIG. 4 is a front view of a configuration of configuration of the pattern electrode 10. As shown in FIG. 4, the pattern electrode 10 has a pattern in which plural C-shaped ring electrodes 21 and 22 are arranged along plural concentric circles with different radii around the round-shaped core electrode 20. There are spaces between the core electrode 20 and the innermost ring electrode 21 and between the adjacent ring electrodes 21 and 22. In addition, the core electrode 20 and the innermost ring electrode 21, and the adjacent ring electrodes 21 and 22, are connected, respectively, by ring connections 23.

From the core electrode 20, a core extraction electrode 24 extends to the outside of the ring electrode 22 on the outermost periphery (hereafter, "peripheral electrode 22"), separated (i.e., insulated) from other ring electrodes 21 and 22 and the ring connections 23. On the other hand, from the peripheral electrode 22, peripheral extraction electrode 25 is extended to the outside thereof, insulated from other electrodes. The pattern of the pattern electrode 10 shown in FIG. 4 is arranged so as to be superimposed on the lens unit 15.

Depending on the voltages applied to the core extraction electrode 24 and to the peripheral extraction electrode 25, respectively, a situation arises wherein the voltage values of the core electrode 20, of each ring electrode 21 existing between the core electrode 20 and the peripheral electrode 22, and of the peripheral electrode 22, against the common electrode 11, respectively, are different. That is, voltage distribution is generated in the lens portion 15 by the pattern electrodes 10. By changing this voltage distribution, distribution of the refractive index of the liquid crystal lens 7 is changed, and the liquid crystal lens 7 can be put into the convex lens state, into the parallel glass state, or into the concave lens state.

The dimension and characteristics of each part of the pattern electrodes 10 are shown as an example, without particular limitation. The total number of the core electrode 20, the peripheral electrode 22, and the ring electrodes 21 between them is, for example, 27. Moreover, the diameter of the core electrode 20, the width of each ring electrode 21 and the width of the peripheral electrode 22 are chosen so that a desired distribution of the refractive index can be obtained in the lens portion 15. The width of the space between the adjacent two among the core electrode 20, the ring electrodes 21, and the peripheral electrode 22 is 3 μm, for example. The resistance of each ring connection 23 is, for example, 1 kΩ.

Figure 5:
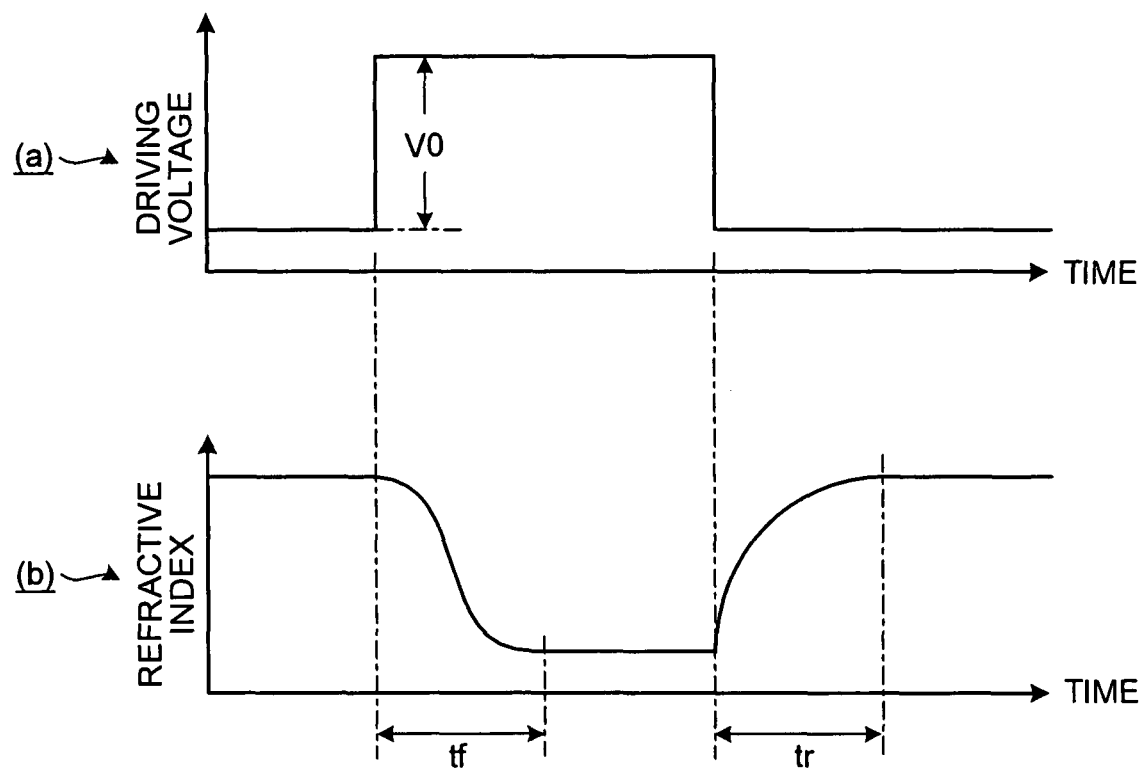
FIG. 5 is an explanatory diagram showing change of a refractive index when voltage is applied to liquid crystal.

Next, an explanation will be given about the change in the refractive index when voltage is applied to the liquid crystal under the condition that light having the polarization plane in the same direction as the alignment direction of the liquid crystal is passing through the liquid crystal. If the driving voltage V0 is applied to the liquid crystal from the exterior as shown in FIG. 5 (FIG. 5 (*a*)), the refractive index of the liquid crystal becomes in the condition corresponding to the driving voltage V0 being delayed by the time tf from the timing of rise of the driving voltage V0 (FIG. 5 (*b*)). Moreover, the refractive index of the liquid crystal returns to the original state being delayed by the time tr from the timing of fall of the driving voltage V0 (FIG. 5 (*b*)). These times tf and tr are periods during which the liquid crystal is carrying out the transient response operation, and thus the refractive index changes gradually. Here, the driving voltage V0 is, for example, a pulse height modulated (PHM) or a pulse width modulated (PWM) alternating voltage, as mentioned above.

Assuming to use, for example, the liquid crystal lens 7 and the pattern electrodes 10 in which the dimensions and characteristics of each portion have the values mentioned above. Moreover, assuming to use, for the liquid crystal layer 14, a nematic liquid crystal of which the refractive index ne for the extraordinary light and the refractive index no for the ordinary light are 1.75 and 1.5 respectively, and of which the birefringence Δn is 0.25. In this case, both the transient response operation time tf of the liquid crystal for the rise of the driving voltage V0 from 0 V to 5 V and the transient response operation time tr of the liquid crystal for the fall of the driving voltage V0 from 5 V to 0 V are about 500 ms.

Figure 6:
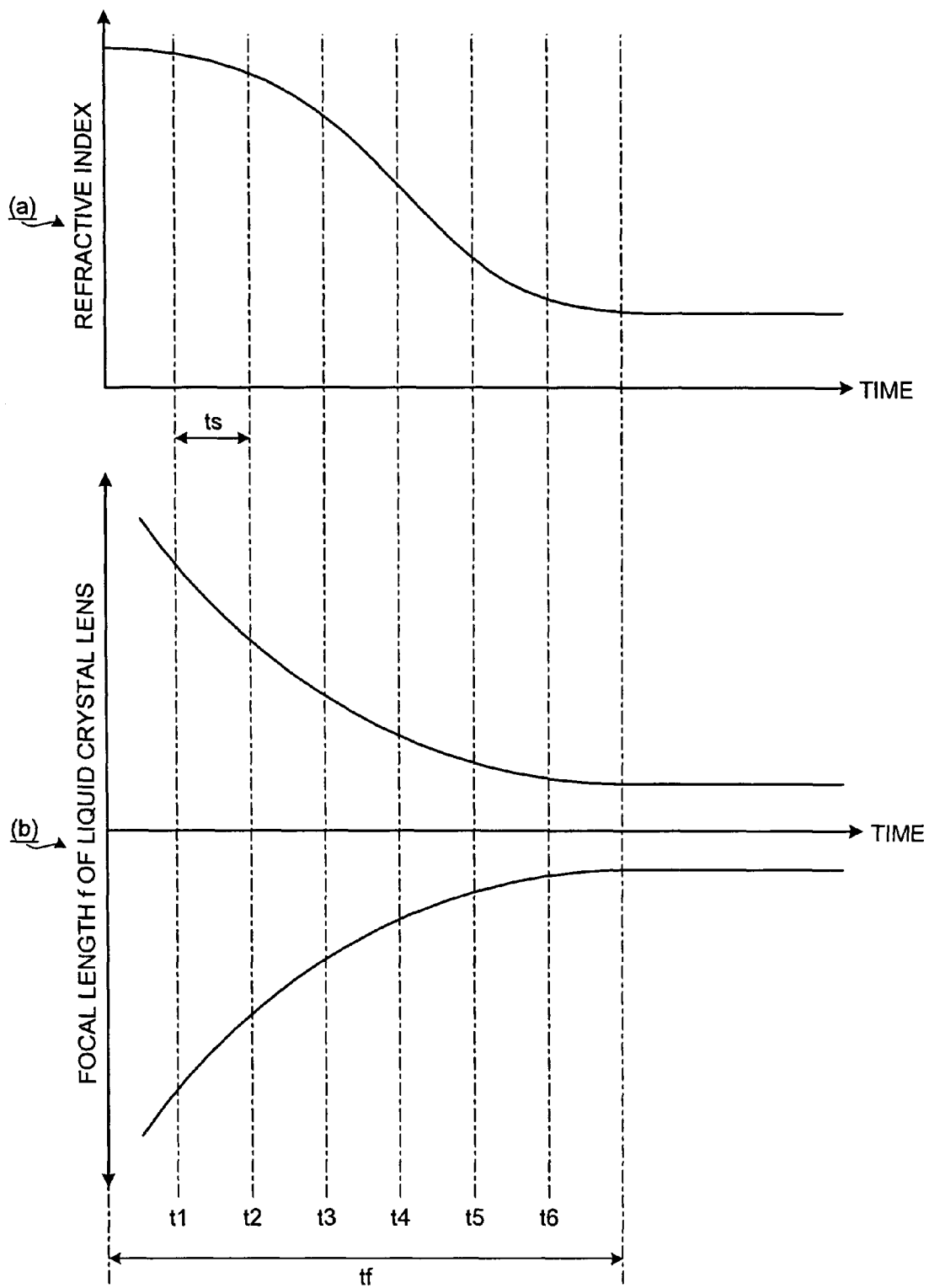
FIG. 6 is an explanatory diagram showing the change of the refractive index of liquid crystal and change of focal length of the liquid crystal lens during a transient response operation period.

In this way, it takes a certain period of time for the liquid crystal to complete the transient response operation. Thus, in the first embodiment, the image signals generated from the optical images which have passed through the liquid crystal lens system 1 and the optical lens system 2 are sampled with a predetermined cycle during the transient response operation period of the liquid crystal. In FIG. 6, the processes of the changes in the refractive index of the liquid crystal and in the focal length of the liquid crystal lens 7 during the transient response operation period tf upon the rise of the driving voltage are shown.

For example, as shown in FIG. 6 (*a*), the refractive index of the liquid crystal changes during the transient response operation period tf and becomes constant after the transient response operation period tf has passed, so that the refractive index of the part of the liquid crystal corresponding to the core electrode 20, to each of the ring electrodes 21, and to the peripheral electrode 22 of the liquid crystal lens 7, respectively, becomes constant. Therefore, at the time when the transient response operation period tf has passed, the distribution of the refractive index of the liquid crystal lens 7 becomes settled as a certain distribution, and as shown in FIG. 6 (*b*), the focal length f of the liquid crystal lens 7 converges to a definite value according to the refractive index distribution.

The curves drawn above and below the abscissa in FIG. 6 (*b*) represent the profiles of changes in the focal length f in the cases when the liquid crystal lens 7 is in the convex lens state, and in the concave lens state. In the first embodiment, for the convenience of description, when the liquid crystal lens 7 is in the convex lens state, the focal length f is expressed with a positive value, and when the liquid crystal lens 7 is in the concave lens state, the focal length is expressed with a negative value. When expressed in this way, the liquid crystal lens 7 is in the parallel glass state when f is positive or a negative infinity.

In the first embodiment, image signals are sampled at the times t1, t2, t3, t4, t5, and t6 during the transient response operation period tf which is the time for the focal length of the liquid crystal lens 7 to converge to a constant value. At each sampling timing, the focal length f of the liquid crystal lens 7 differs. Therefore, image signals generated from the optical images passed through the liquid crystal lens 7 with various focal lengths f can be sampled during one transient response operation period, and thus multiple autofocus signals corresponding to the focus matching degree can be extracted.

Here, the sampling period ts synchronizes, for example, with the period of the frames. In addition, the image signals may be sampled during the transient response operation period tr of the liquid crystal lens 7 upon the fall. Moreover, the sampling number may not be limited to six.

The relations between the times of sampling and the focal lengths of the liquid crystal lens 7, such as the focal length f1 of the liquid crystal lens 7 at the first sampling time t1 and the focal length f2 of the liquid crystal lens 7 at the second sampling time t2 are determined beforehand. These relations are stored, for example, in the ROM unit of the storage unit 52 in the autofocus controller 5.

Thus, the microprocessor 51 of the autofocus controller 5 can find the focal length of the liquid crystal lens 7 at each sampling time based on the image signal sampling time during the transient response operation period of the liquid crystal lens 7. By those procedures, the correspondence between each focal length of the liquid crystal lens 7 and the level of the autofocus signal can be determined, and therefore the focal length of the liquid crystal lens 7 when the level of the autofocus signal is the maximum, i.e., when the image is in focus, can be found.

Moreover, the relation between the focal length f of the liquid crystal lens 7 in a static state and the driving voltage applied to the liquid crystal lens 7 to make the focal length f of the liquid crystal lens 7 a certain value, such as the value of the voltage Vouter of the peripheral electrode 22 and the voltage Vinner of the core electrode 20 when the focal length of the liquid crystal lens 7 is f1 in a static state, and the values of Vouter and Vinner when the focal length of the liquid crystal lens 7 is f2 in a static state has been obtained. This relation is also stored, for example, in the ROM unit of the storage unit 52 in the autofocus controller 5.

Therefore, the microprocessor 51 can obtain information how much driving voltage should be applied to the liquid crystal lens 7 to actually bring the object into focus, namely to adjust the focal length of the liquid crystal lens 7 to the focal length when the level of the autofocus signal becomes the maximum. In FIG. 7 an example of the relation between the focal lengths of the liquid crystal lens 7 in the static state, and the voltage applied to the liquid crystal lens 7 to make the focal length of the liquid crystal lens 7 a given value is shown.

Next, the voltage application pattern to the liquid crystal lens 7 for changing the liquid crystal lens 7 into both the convex lens state and the concave lens state is explained. The liquid crystal lens 7 becomes in the convex lens state when the voltage Vouter applied to the peripheral electrode 22 in the pattern electrode 10 is higher than the voltage Vinner applied to the core electrode 20, and when the situation is reversed, it becomes in the concave lens state. The following 12 kinds can be considered as the voltage application patterns.

Figures 1, 8:
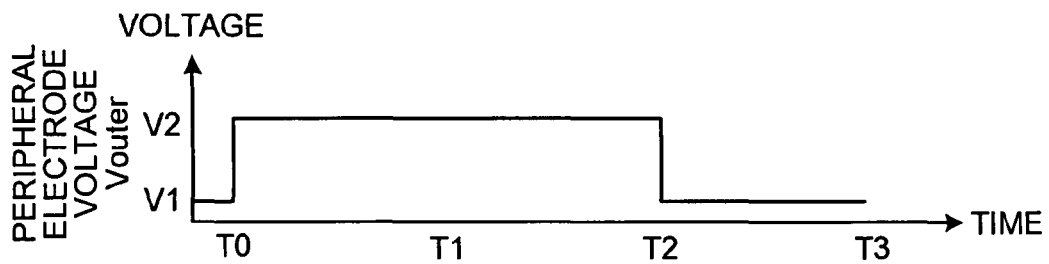
Figures 2, 8:
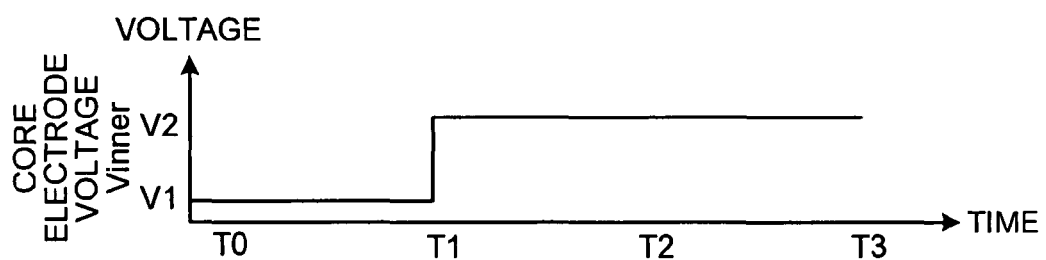
Figures 3, 8:
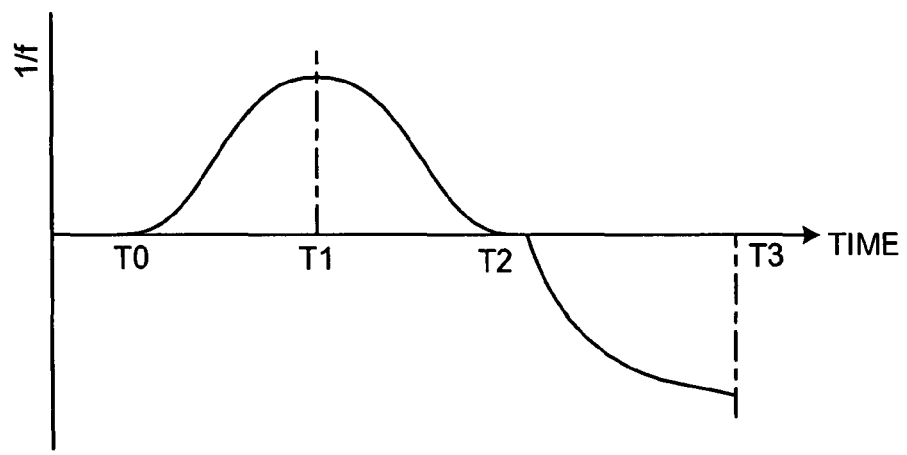

In the first pattern, as shown in FIGS. 8-1 and 8-2, first both the voltage Vouter applied to the peripheral electrode 22 of the pattern electrode 10 and the voltage Vinner applied to the core electrode 20 are set to be the first voltage V1. Subsequently, at time T0, only the voltage Vouter of the peripheral electrode 22 is changed to the second voltage V2 higher than the first voltage V1. Next, at time T1, only the voltage Vinner of the core electrode 20 is changed to the second voltage V2. Then, at time T2, only the voltage Vouter of the peripheral electrode 22 is changed to the first voltage V1, and the operation is terminated at time T3.

The liquid crystal lens 7 is in the parallel glass state at time T0. In the period from time T0 to time T1, it is in the convex lens state in which the lens power becomes larger gradually. In the period from time T1 to time T2, it is in the convex lens state in which the lens power gradually becomes smaller, and in the period from time T2 to time T3, it is in the concave lens state in which the lens power becomes larger gradually. FIG. 8-3 is a chart showing the change of the inverse of the focal length f in the first pattern.

As shown in FIG. 8-3, the value of 1/f is zero at time T0. Between time T0 and time T1, the value changes along a downward convex curve, and then along an upward convex curve after passing an inflection point. At time T1, it becomes the maximum positive value. Therefore, at the time T1, the liquid crystal lens becomes in the convex lens state with the maximum lens power. Between time T1 and time T2, the value of 1/f changes along an upward convex curve, passes the inflection point and changes along a downward convex curve to reach the value zero. Between time T2 and time T3, the value changes along a downward convex curve to become the maximum negative value at time T3.

Therefore, at the T3, the lens is in the concave lens state with the largest lens power. If the first voltage V1 is set to 0 V and the second voltage V2 is set to 5 V, the voltage Vouter of the peripheral electrode 22 rises at time T0, and the transient response operation period tf of the liquid crystal lens 7 is about 500 ms this time, as mentioned above.

At time T1, the voltage Vinner of the core electrode 20 rises, and the transient response operation period tf of the liquid crystal lens 7 this time is about 500 ms, as mentioned above. Furthermore, at time T2, the voltage Vouter of the peripheral electrode 22 falls and the transient response operation time tr of the liquid crystal lens 7 this time is about 500 ms, as mentioned above. Therefore, the time required to complete the autofocus control is about 1.5 seconds in total.

Figures 1, 9:
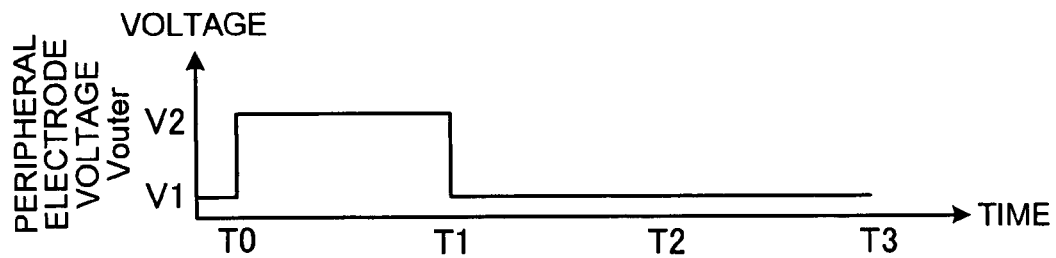
Figures 2, 9:
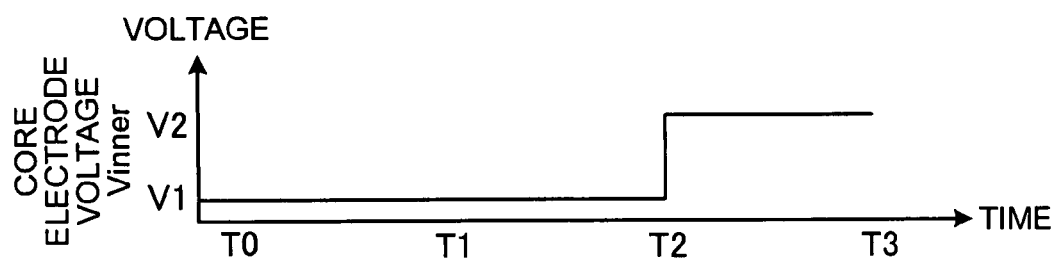
Figures 3, 9:
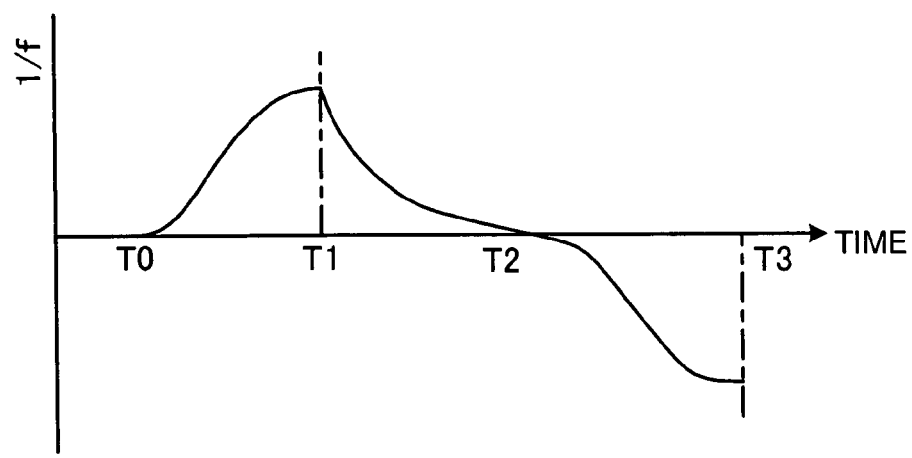

In the second pattern, as shown in FIGS. 9-1 and 9-2, both the voltage Vouter of the peripheral electrode 22 and the voltage Vinner of the core electrode 20 are first set to be the first voltage V1. Subsequently, at time T0, only the voltage Vouter of the peripheral electrode 22 is changed to the second voltage V2. Next, at time T1, only the voltage Vouter of the peripheral electrode 22 is changed to the first voltage V1. Then, at time T2, only the voltage Vinner of the core electrode 20 is changed to the second voltage V2, and the operation is terminated at time T3.

The liquid crystal lens 7 is, in the parallel glass state, in the convex lens state in which the lens power gradually becomes larger, in the convex lens state in which the lens power gradually becomes smaller, and in the concave lens state in which the lens power becomes larger gradually at the time T0, in the period from time T0 to time T1, in the period from time T1 to time T2, and in the period from time T2 to time T3 respectively. FIG. 9-3 is a chart showing the change in the inverse of the focal length f in the second pattern.

As shown in FIG. 9-3, the value of 1/f becomes zero, the maximum positive value, zero, and the maximum negative value at times T0, T1, T2, and T3 respectively. Therefore, at time T1, the liquid crystal lens becomes in the convex lens state with the maximum lens power, and at time T3, it is in the concave lens state with the greatest lens power. Moreover, in the second pattern, the time required to complete the autofocus control is about 1.5 seconds in total.

Figures 1, 10:
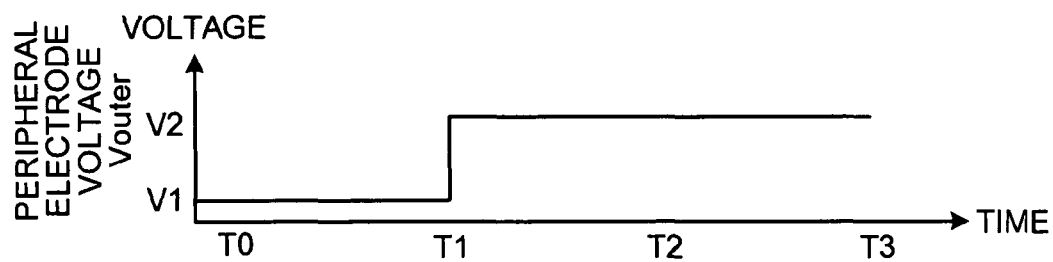
Figures 2, 10:
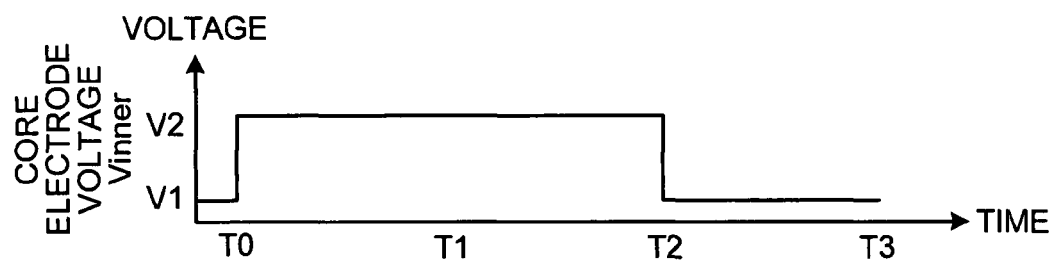
Figures 3, 10:
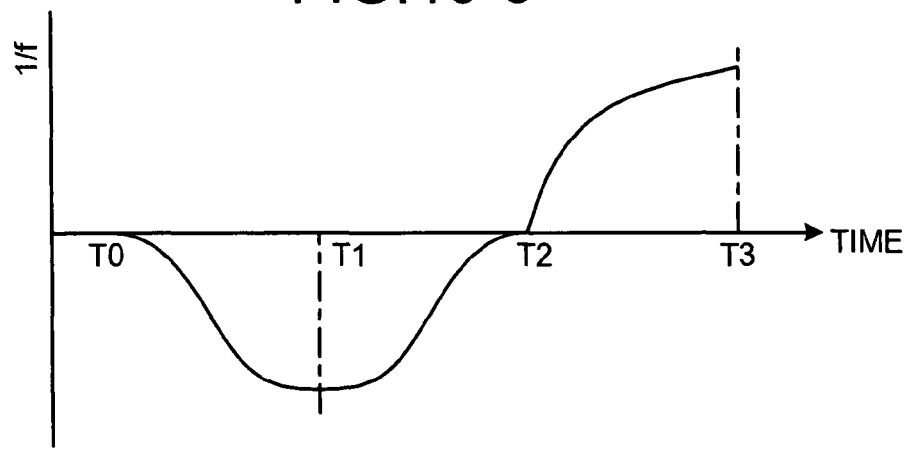

In the third pattern, as shown in FIGS. 10-1 and 10-2, both the voltage Vouter of the peripheral electrode 22 and the voltage Vinner of the core electrode 20 are first set to the first voltage V1. Subsequently at time T0, only the voltage Vinner of the core electrode 20 is changed to the second voltage V2. Next, only the voltage Vouter of the peripheral electrode 22 is changed to the second voltage V2 at time T1. Then at the time T2, only the voltage Vinner of the core electrode 20 is changed to the first voltage V1, and the operation is terminated at time T3.

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 10-3 is a chart showing the change in the inverse of the focal length in the third pattern.

As shown in FIG. 10-3, the value of 1/f becomes zero, the maximum negative value, zero, and the maximum positive value at times T0, T1, T2, and T3 respectively. Therefore, at time T1, the liquid crystal lens becomes in the concave lens state with the maximum lens power, and at time T3, it is in the convex lens state with the largest lens power. Moreover, the time required to complete the autofocus control in the third pattern is about 1.5 seconds in total.

Figures 1, 11:
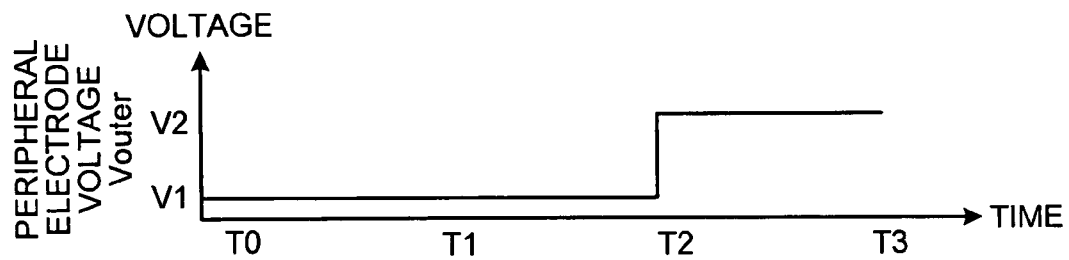
Figures 2, 11:
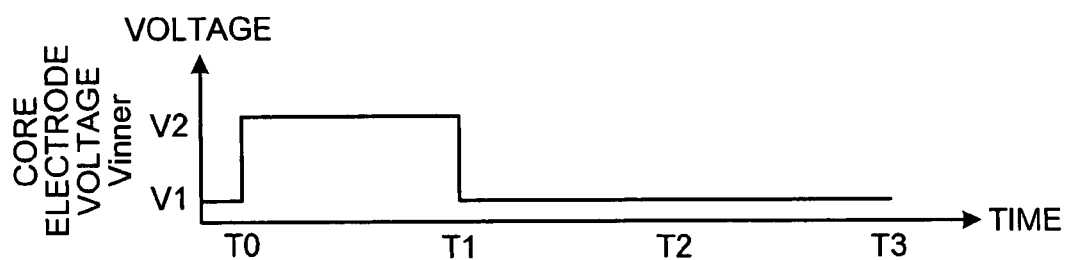
Figures 3, 11:
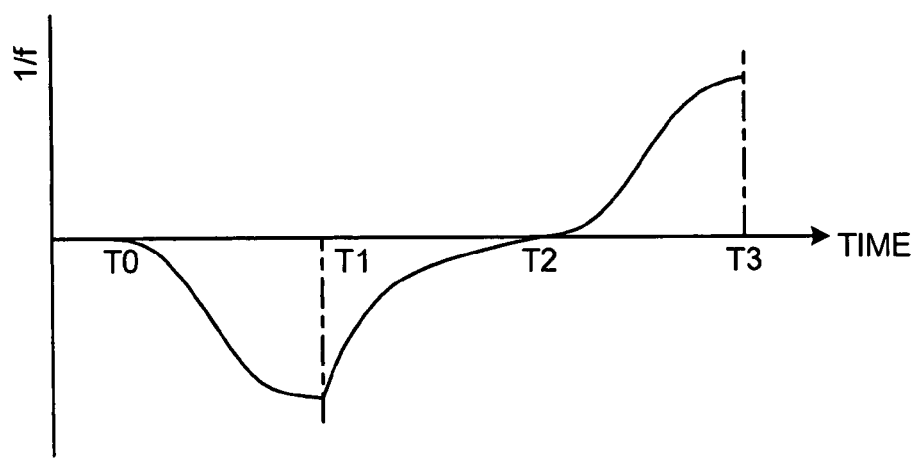

In the fourth pattern, as shown in FIGS. 11-1 and 11-2, both the voltage Vouter of the peripheral electrode 22 and the voltage Vinner of the core electrode 20 are first set to the first voltage V1. Subsequently at the T0, only the voltage Vinner of the core electrode 20 is changed to the second voltage V2. Next, at time T1, only the voltage Vinner of the core electrode 20 is changed to the first voltage V1. Then, only the voltage Vouter of the peripheral electrode 22 is changed to the second voltage V2 at time T2, and the operation is terminated at time T3.

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 11-3 is a chart showing the change of the inverse of the focal length in the fourth pattern.

As shown in FIG. 11-3, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and is in the convex lens state with the greatest lens power at the time T3. The time required to complete the autofocus control in the fourth pattern is about 1.5 seconds in total.

Figures 1, 12:
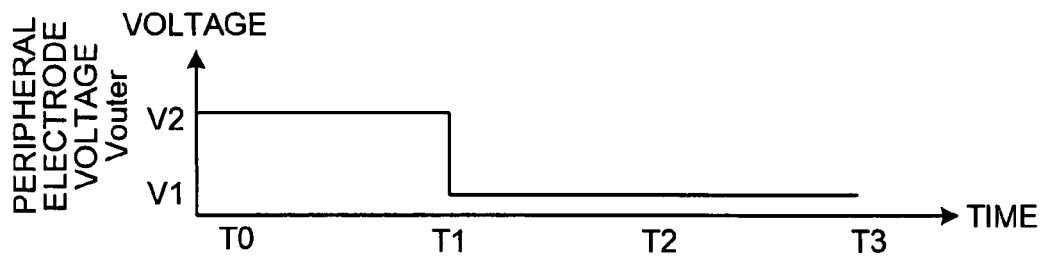
Figures 2, 12:
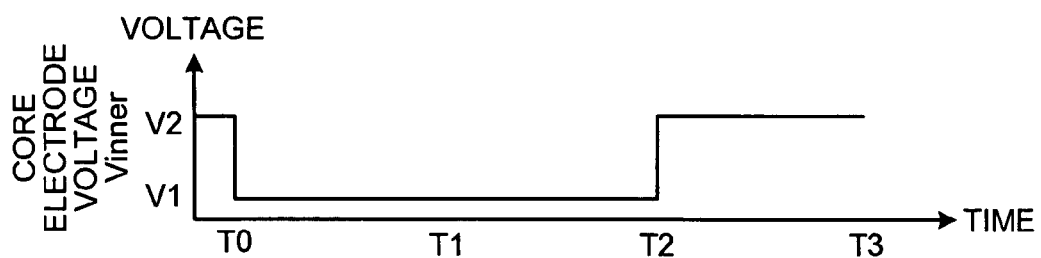
Figures 3, 12:
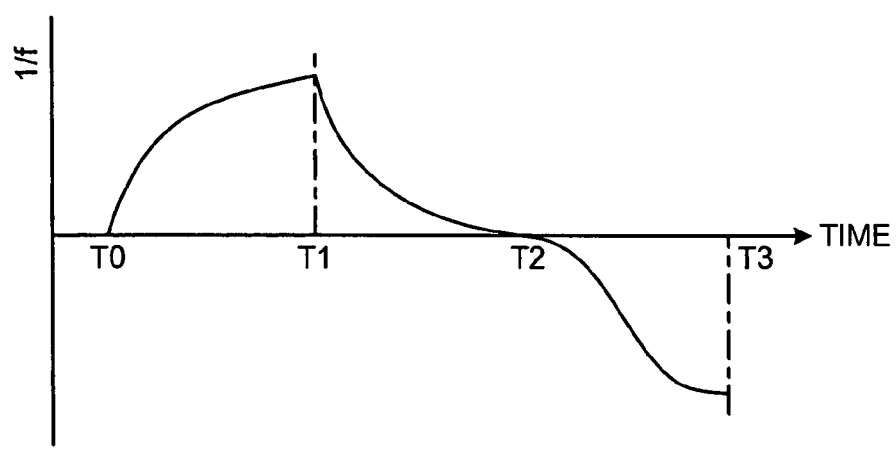

In the fifth pattern, as shown in FIGS. 12-1 and 12-2, both the voltage Vouter of the peripheral electrode 22 and the voltage Vinner of the core electrode 20 are first set to the second voltage V2. Subsequently, at time T0, only the voltage Vinner of the core electrode 20 is changed to the first voltage V1. Next, at time T1, only the voltage Vouter of the peripheral electrode 22 is changed to the first voltage V1. Then, at time T2, only the voltage Vinner of the core electrode 20 is changed to the second voltage V2, and the operation is terminated at time T3.

The liquid crystal lens 7 is in the parallel glass state, in the convex lens state in which the lens power gradually becomes larger, in the convex lens state in which the lens power gradually becomes smaller, and in the concave lens state in which the lens power becomes larger gradually at time T0, in the period from time T0 to time T1, in the period from time T1 to time T2, and in the period from time T2 to time T3 respectively. FIG. 12-3 is a chart showing the change in the inverse of the focal length f in the fifth pattern.

As shown in FIG. 12-3, the value of 1/f becomes zero, the maximum positive value, zero, and the maximum negative value at times T0, T1, T2, and T3 respectively. Therefore, the liquid crystal lens becomes in the convex lens state with the maximum lens power at time T1, and is in the concave lens state with the maximum lens power at time T3. In the fifth pattern, the time required to complete the autofocus control is about 1.5 seconds in total.

Figures 1, 13:
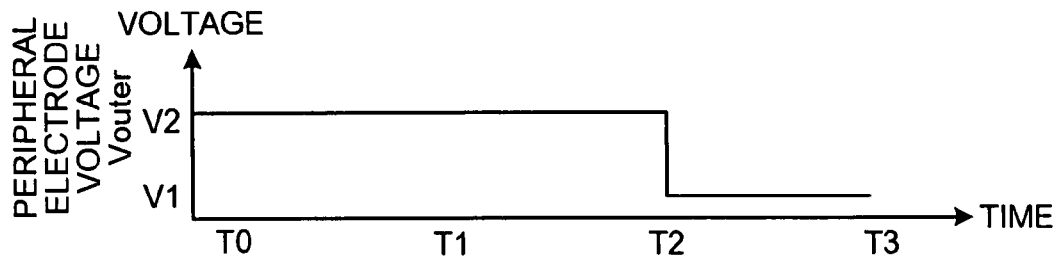
Figures 2, 13:
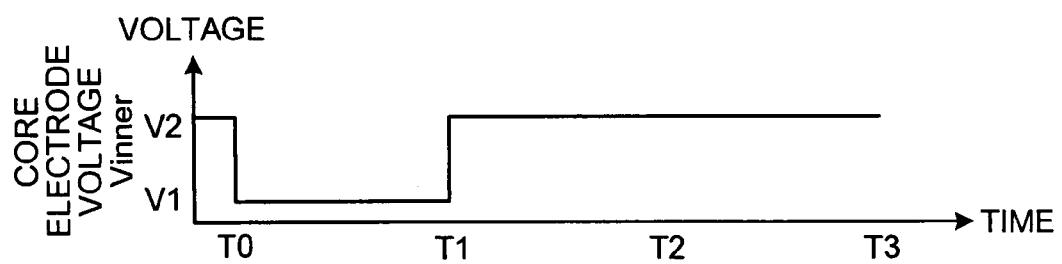
Figures 3, 13:
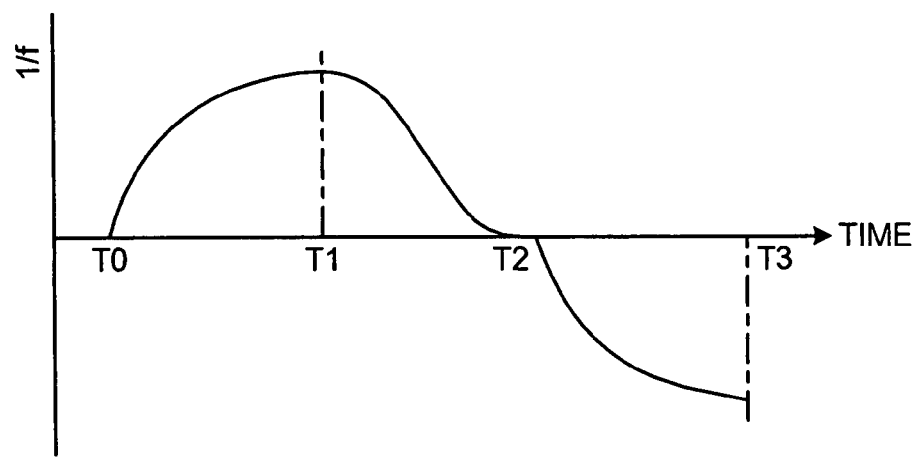

In the sixth pattern, as shown in FIGS. 13-1 and 13-2, both the voltage Vouter of the peripheral electrode 22 and the voltage Vinner of the core electrode 20 are first set to the second voltage V2. Subsequently, at time T0, only the voltage Vinner of the core electrode 20 is changed to the first voltage V1. Next, at time T1, only the voltage Vinner of the core electrode 20 is changed to the second voltage V2. Then, at time T2, only the voltage Vouter of the peripheral electrode 22 is changed to the first voltage V1, and the operation is terminated at time T3.

The liquid crystal lens 7 is in the parallel glass state. In the convex lens state in which the lens power gradually becomes larger, in the convex lens state in which the lens power gradually becomes smaller, and in the concave lens in which the lens power gradually becomes larger at the time T0, in the period from the time T0 to the time T1, in the period from time T1 to time T2, and in the period from time T2 to time T3 respectively. FIG. 13-3 is a chart showing the change of the inverse of the focal length in the sixth pattern.

As shown in FIG. 13-3, the value of 1/f becomes zero, the maximum positive value, zero, and the maximum negative value at times T0, T1, T2, and T3 respectively. Therefore, the liquid crystal lens becomes in the convex lens state with the maximum lens power at time T1, and is in the concave lens state with the greatest lens power at the time T3. The time required to complete the autofocus control in the sixth pattern is about 1.5 seconds in total.

Figures 1, 14:
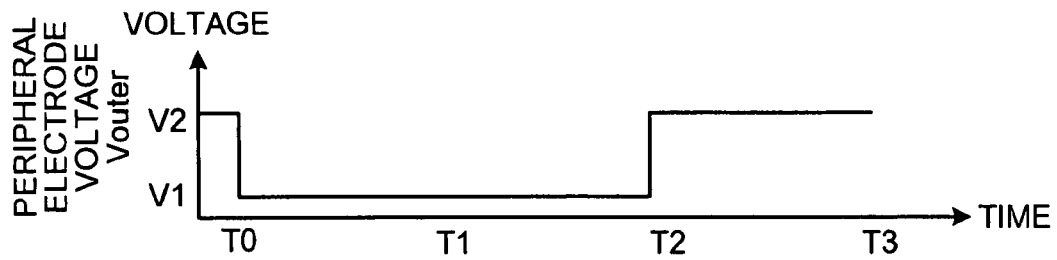
Figures 2, 14:
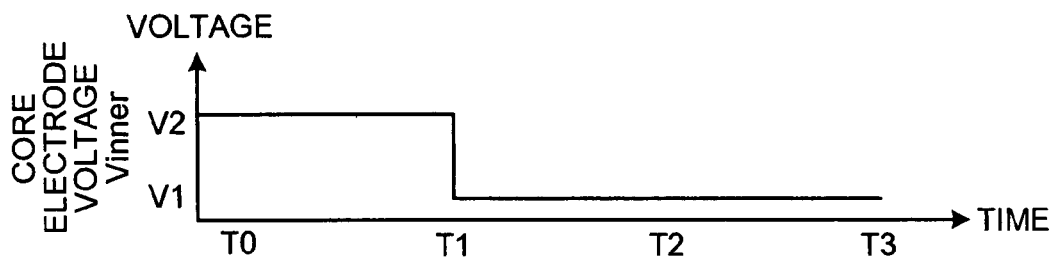
Figures 3, 14:
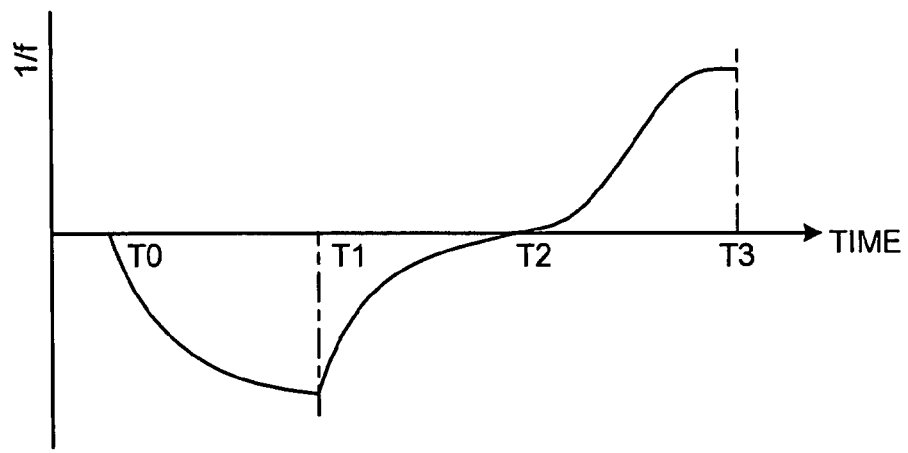

In the seventh pattern, as shown in FIGS. 14-1 and 14-2, both the voltage Vouter of the peripheral electrode 22 and the voltage Vinner of the core electrode 20 are first set to the second voltage V2. Subsequently, at time T0, only the voltage Vouter of the peripheral electrode 22 is changed to the first voltage V1. Next, at time T1, only the voltage Vinner of the core electrode 20 is changed to the first voltage V1. Then, at time T2, only the voltage Vouter of the peripheral electrode 22 is changed to the second voltage V2, and the operation is terminated at time T3.

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 14-3 is a chart showing the change of the inverse of the focal length f in the seventh pattern.

As shown in FIG. 14-3, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and it is in the convex lens state with the largest lens power at the time T3. In the seventh pattern, the time required to complete the autofocus control is about 1.5 seconds in total.

Figures 1, 15:
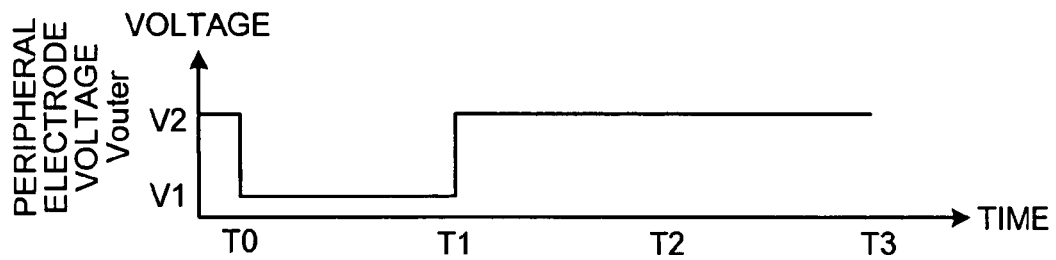
Figures 2, 15:
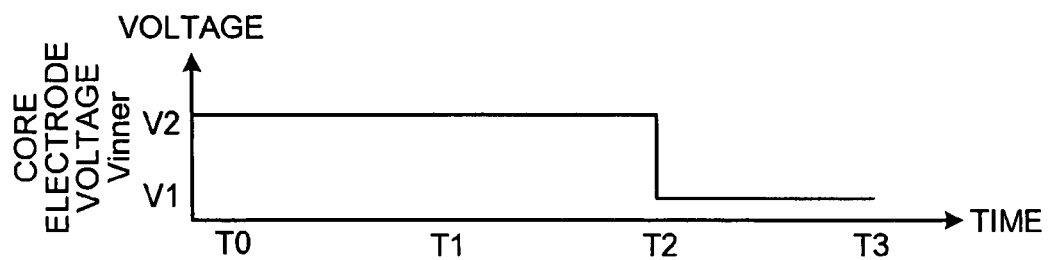
Figures 3, 15:
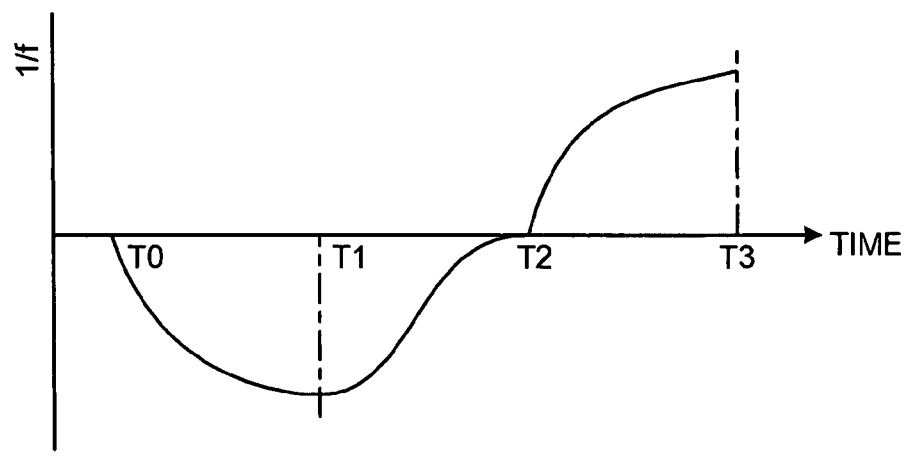

In the eighth pattern, as shown in FIGS. 15-1 and 15-2, both the voltage Vouter of the peripheral electrode 22 and the voltage Vinner of the core electrode 20 are first set to the second voltage V2. Subsequently, at time T0, only the voltage Vouter of the peripheral electrode 22 is changed to the first voltage V1. Next, at time T1, only the voltage Vouter of the peripheral electrode 22 is changed to the second voltage V2. Then, at time T2, only the voltage Vinner of the core electrode 20 is changed to the first voltage V1, and the operation is terminated at time T3.

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at a time T0, in the period from time T0 to time T1, in the period from time T1 to time T2, and in the period from time T2 to time T3 respectively. FIG. 15-3 is a chart showing the change of the inverse of the focal length f in the eighth pattern.

As shown in FIG. 15-3, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and is in the convex lens state with the largest lens power at the time T3. In the eighth pattern, the time required to complete the autofocus control is about 1.5 seconds in total.

Figures 1, 16:
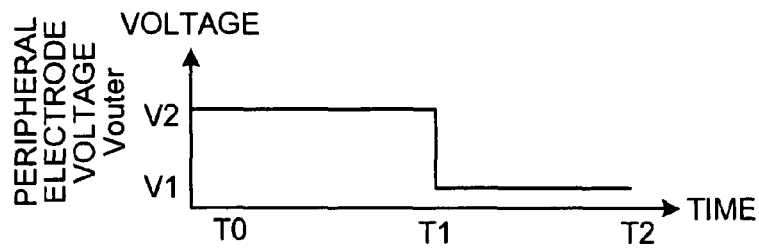
Figures 2, 16:
Figures 3, 16:
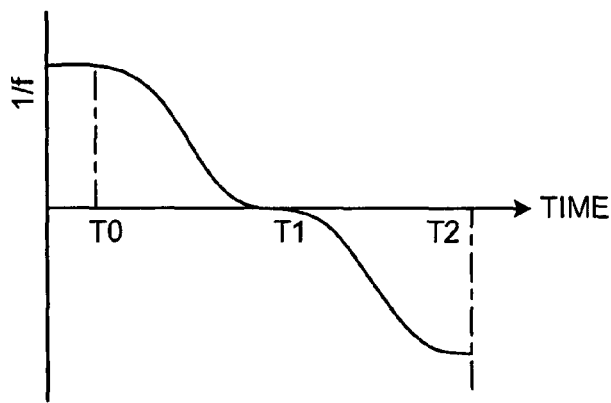

In the ninth pattern, as shown in FIGS. 16-1 and 16-2, first, the voltage Vouter of the peripheral electrode 22 is set to the second voltage V2, and the voltage Vinner of the core electrode 20 is set to the first voltage V1. Subsequently, at time T0, only the voltage Vinner of the core electrode 20 is changed to the second voltage V2. Then, at time T1, only the voltage Vouter of the peripheral electrode 22 is changed to the first voltage V1, and the operation is terminated at time T2.

The liquid crystal lens 7 is in the convex lens state with the maximum lens power, in the convex lens state in which the lens power gradually becomes smaller, and in the concave lens state in which the lens power gradually becomes larger at time T0, in the period from time T0 to time T1, and in the period from time T1 to time T2 respectively. FIG. 16-3 is a chart showing the change of the inverse of the focal length f in the ninth pattern.

As shown in FIG. 16-3, the value of 1/f is the maximum positive value at time T0. Then, from time T0 to time T1, the value changes along an upward convex curve, and then along a downward convex curve after passing the inflection point, and becomes zero at time T1. Between time T1 and time T2, the value of 1/f changes along an upward convex curve, and then along a downward convex curve after passing an inflection point to reach the maximum negative value. Therefore, at time T2, the liquid crystal lens becomes to be in the concave lens state with the maximum lens power. In the ninth pattern, the time required to complete the autofocus control is about 1.0 s in total.

Figures 1, 17:
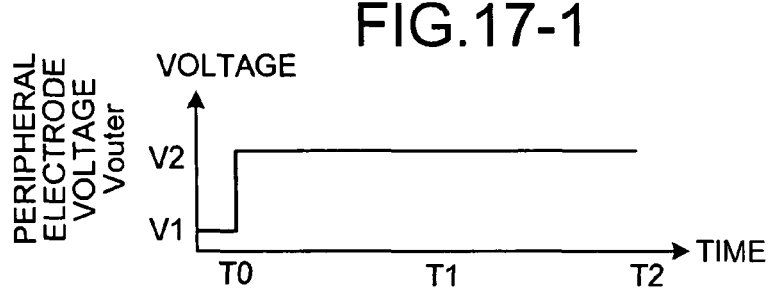
Figures 2, 17:
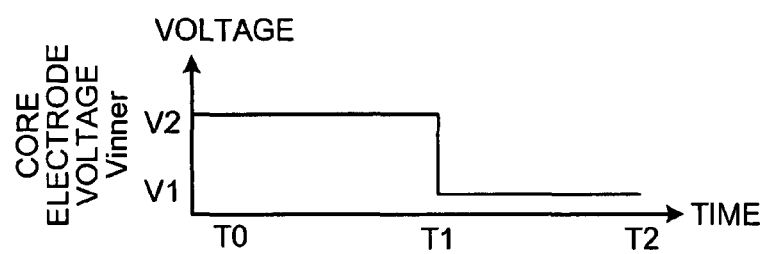
Figures 3, 17:
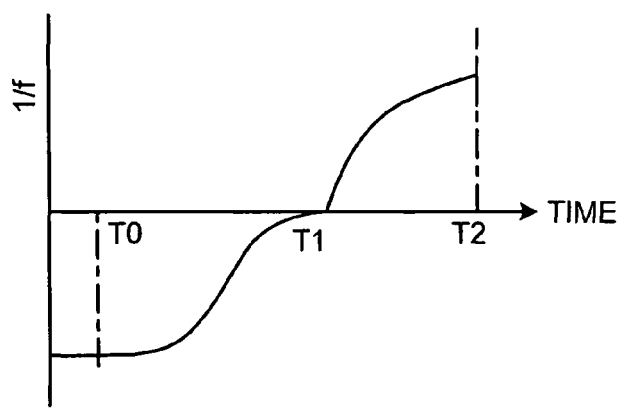

In the tenth pattern, as shown in FIGS. 17-1 and 17-2, first, the voltage Vouter of the peripheral electrode 22 is set to the first voltage V1, and the voltage Vinner of the core electrode 20 is set to the second voltage V2. Subsequently, at time T0, only the voltage Vouter of the peripheral electrode 22 is changed to the second voltage V2. Then, at time T1, only the voltage Vinner of the core electrode 20 is changed to the first voltage V1, and the operation is terminated at time T2.

The liquid crystal lens 7 is in the concave lens state with the maximum lens power, in the concave lens state in which the lens power gradually becomes smaller, and in the convex lens state in which the lens power gradually becomes larger at time T0, in the period from time T0 to time T1, and in the period from time T1 to time T2 respectively. FIG. 17-3 is a chart showing the change of the inverse of the focal length f in the tenth pattern.

As shown in FIG. 17-3, the value of 1/f is the maximum negative value, zero, and the maximum positive value at times T0, T1, and T2 respectively. Therefore, at time T2, the liquid crystal lens is in the convex lens state with the maximum lens power. In the tenth pattern, the time required to complete the autofocus control is about 1.0 second in total.

Figures 1, 18:
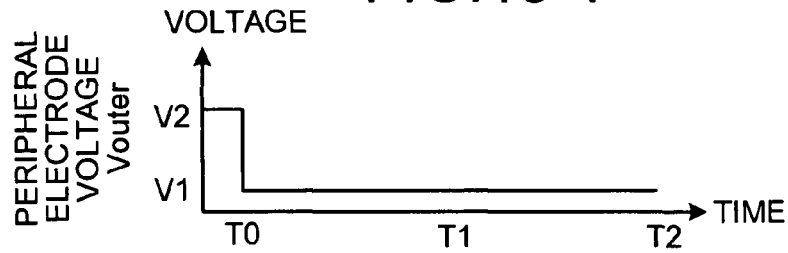
Figures 2, 18:
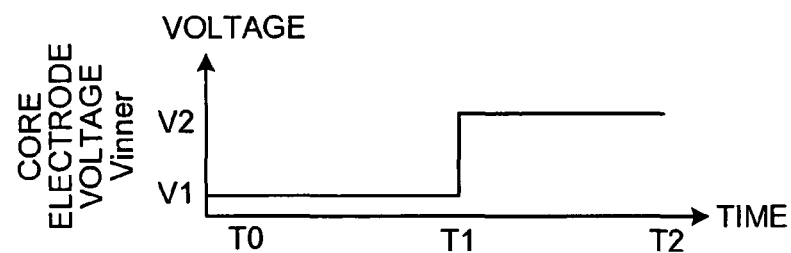
Figures 3, 18:
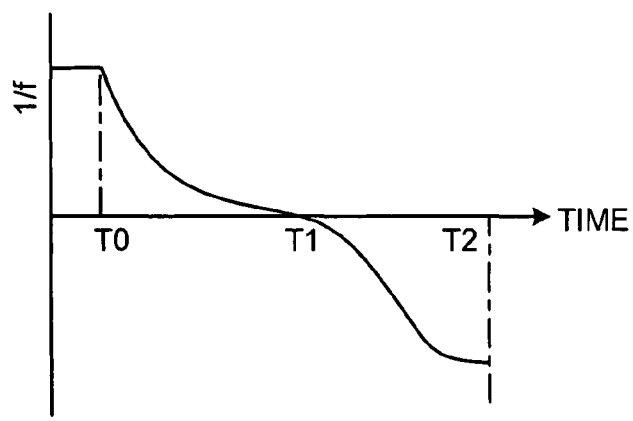

In the eleventh pattern, as shown in FIGS. 18-1 and 18-2, first, the voltage Vouter of the peripheral electrode 22 is set to the second voltage V2, and the voltage Vinner of the core electrode 20 is set to the first voltage V1. Subsequently, at the time T0, only the voltage Vouter of the peripheral electrode 22 is changed to the first voltage V1. Then, at time T1, only the voltage Vinner of the core electrode 20 is changed to the second voltage V2, and the operation is terminated at time T2.

The liquid crystal lens 7 is in the convex lens state with the maximum lens power, in the convex lens state in which the lens power gradually becomes smaller, and in the concave lens state in which the lens power gradually becomes larger at time T0, in the period from time T0 to time T1, and in the period from time T1 to time T2 respectively. FIG. 18-3 is a chart showing the change of the inverse of the focal length in the eleventh pattern.

As shown in FIG. 18-3, the value of 1/f is the maximum positive value, zero, and the maximum negative value at times T0, T1, and T2 respectively. Therefore, at time T2, the liquid crystal lens is in the concave lens state with the maximum lens power. In the eleventh pattern, the time required to complete the autofocus control is about 1.0 second in total.

Figures 1, 19:
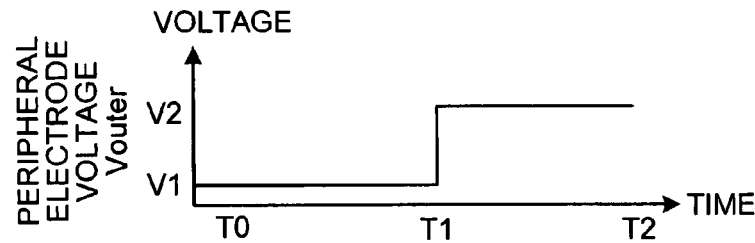
Figures 2, 19:
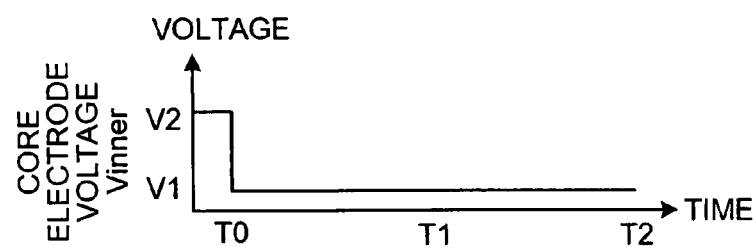
Figures 3, 19:
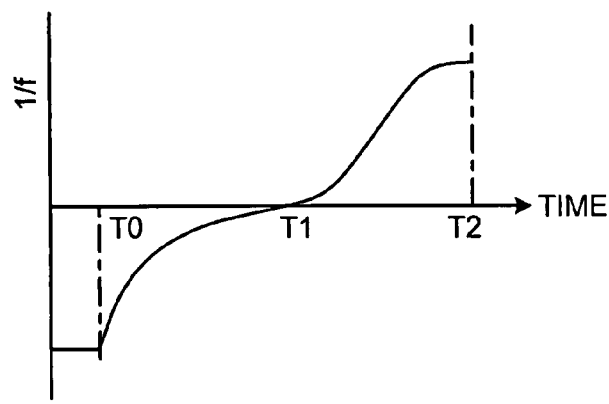

In the twelfth pattern, as shown in FIGS. 19-1 and 19-2, first, the voltage Vouter of the peripheral electrode 22 is set to the first voltage V1, and the voltage Vinner of the core electrode 20 is set to the second voltage V2. Subsequently, at time T0, only the voltage Vinner of the core electrode 20 is changed to the first voltage V1. Then, at time T1, only the voltage Vouter of the peripheral electrode 22 is changed to the second voltage V2, and the operation is terminated at time T2.

The liquid crystal lens 7 is in the concave lens state with the maximum lens power, in the concave lens state in which the lens power gradually becomes smaller, and in the convex lens state in which the lens power gradually becomes larger at time T0, in the period from time T0 to time T1, and in the period from time T1 to time T2 respectively. FIG. 19-3 is a chart showing the change of the inverse of the focal length f in the twelfth pattern.

As shown in FIG. 19-3, the value of 1/f is the maximum negative value, zero, and the maximum positive value at times T0, T1, and T2 respectively. Therefore, at time T2, the liquid crystal lens is in the convex lens state with the maximum lens power. In the twelfth pattern, the time required to complete the autofocus control is about 1.0 second in total.

Next, an evaluation of plural autofocus signals obtained both when the liquid crystal lens 7 is put into the convex lens state and when the liquid crystal lens 7 is put into the concave lens state, will be explained. Here, it is not particular limited, but it is assumed that a photographic subject at a distance L of 200 mm is adjusted to be in focus by the optical lens system 2 in the configuration shown in FIG. 1 without the liquid crystal lens system 1.

Therefore, in the configuration shown in FIG. 1, when the distance L to the photographic subject is shorter than 200 mm, the liquid crystal lens 7 is put into the convex lens state, while when the distance L to a photographic subject is longer than 200 mm, the liquid crystal lens 7 is put into the concave lens state. As described above, in the first embodiment, in the case when the liquid crystal lens 7 is in the convex lens state, the focal length f is expressed with a positive value, and in the case when the liquid crystal lens 7 is in the concave lens state, the focal length is expressed with a negative value.

Accordingly, in the convex lens state, the power of the liquid crystal lens 7 becomes weaker along with the change of the value f, for example, from 100 mm to 200 mm, 500 mm and 1000 mm, and in the concave lens sate the power of the liquid crystal lens 7 becomes weaker along with the change of f value, for example, from −100 mm to −200 mm, −500 mm and −1000 mm.

Figure 20:
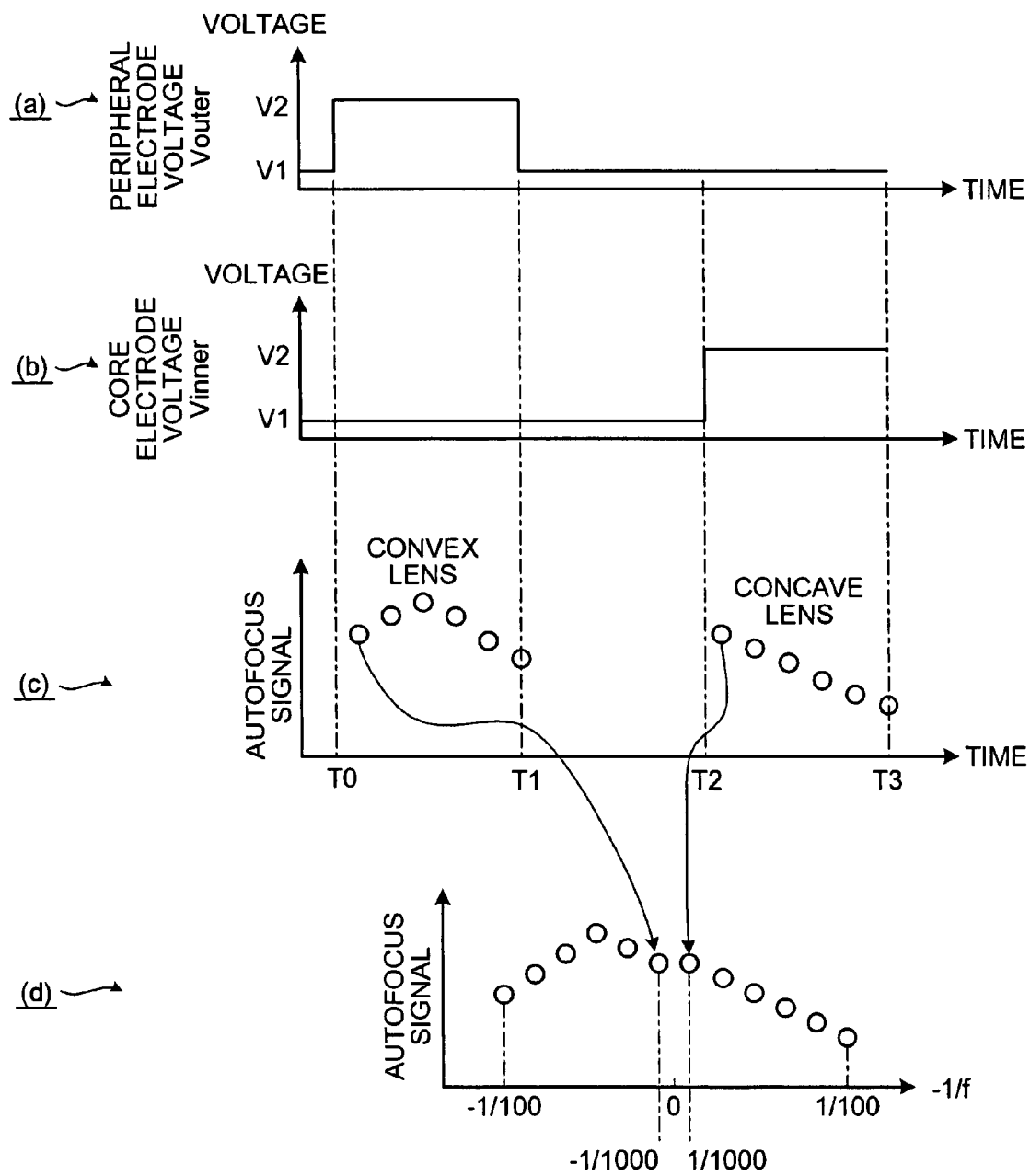
FIG. 20 is an explanatory diagram showing a method of evaluation of autofocus signals.
Figure 21:
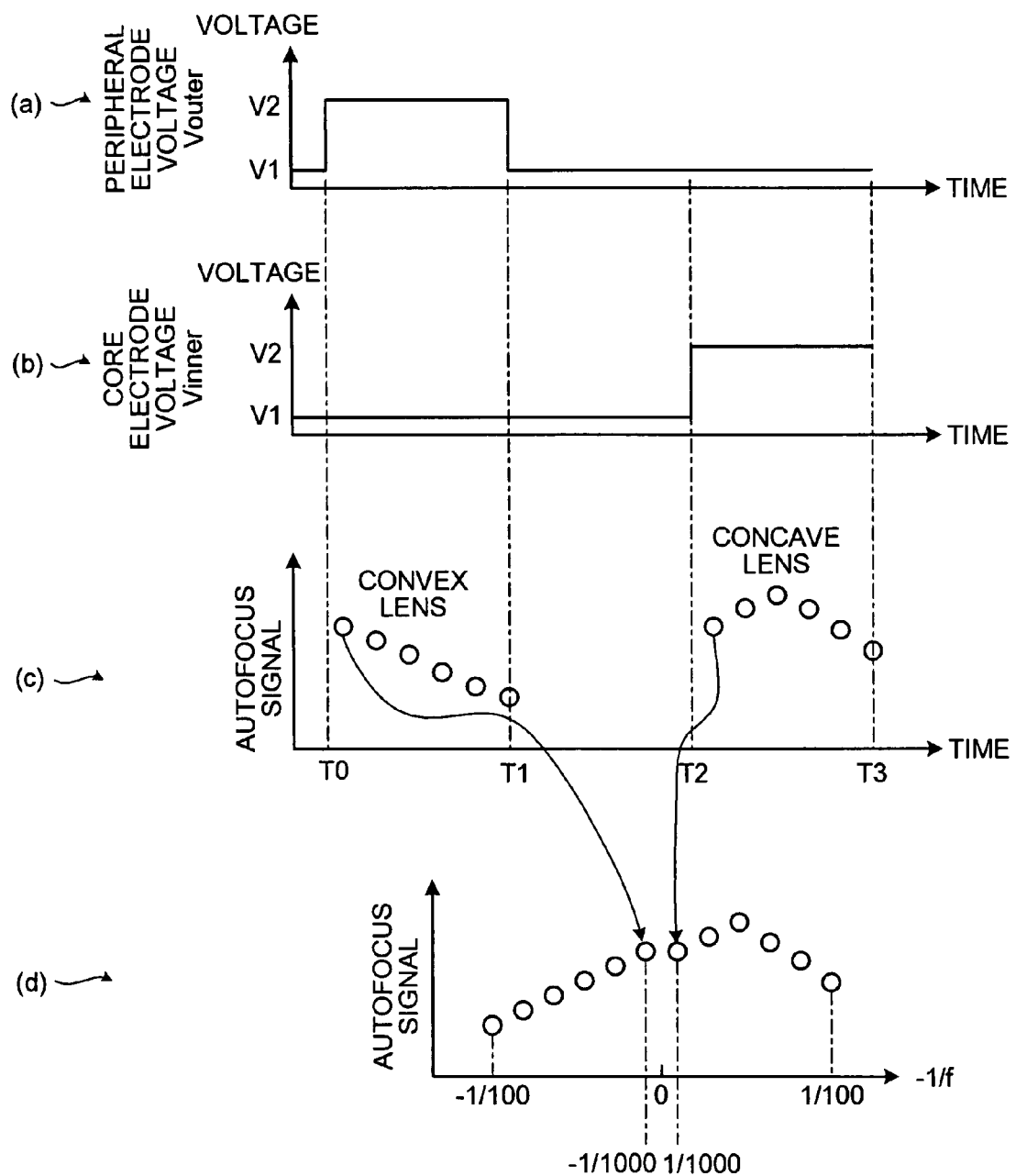
FIG. 21 is an explanatory diagram showing the method of evaluation of the autofocus signals.

Explanation will be given taking the above mentioned second voltage application pattern as an example. FIGS. 20 and 21 are explanatory diagrams illustrating a method of evaluation of the autofocus signals in the second voltage application pattern. As shown in (a), (b) and (c) of FIG. 20 or 21, in the second voltage application pattern, during the period from time T0 to time T1 when the liquid crystal lens 7 is in the convex lens state, plural autofocus signals, six autofocus signals in the example illustrated although not particularly limited thereto, are obtained.

In the period from time T2 to time T3 when the liquid crystal lens 7 is in the state of the concave lens, plural autofocus signals, six autofocus signals in the illustrated example although not particularly limited to it, are obtained. At that time, sampling is started with a little delay after the time of changing the voltage Vouter of the peripheral electrode 22 or the voltage Vinner of the core electrode 20.

The example shown in FIG. 20 (c) is a case where the distance L to a photographic subject is shorter than 200 mm, for example, 170 mm. Therefore, when the liquid crystal lens 7 is in the convex lens state, the autofocus signal becomes the maximum. For convenience, the inverse of the focal length f with reversed positive/negative sign, i.e., the value of −1/f is used.

When plural autofocus signals obtained by the sampling during the transient response operation period of the liquid crystal lens 7 are arranged in order based on the values of −1/f from the negative value having the largest absolute value to the positive value having the largest absolute value, the autofocus signals are expressed as shown in FIG. 20 (d). In this illustrated example, it can be seen that the autofocus signals are sampled in the range of the −1/f values from −1/100 to 1/100. Also it can be seen that at a value of −1/f between −1/100 and −1/1000, the autofocus signal becomes maximum.

The example shown in FIG. 21 (c) is a case where the distance L to a photographic subject is longer than 200 mm, for example, 350 mm. Therefore, the autofocus signal is the maximum when the liquid crystal lens 7 is in the concave lens state. When plural autofocus signals obtained by the sampling during the transient response operation period of the liquid crystal lens 7 are arranged in order based on −1/f from the negative value having the largest absolute value to the positive value having the largest absolute value, the autofocus signals are expressed as shown in FIG. 21 (d).

Also in this illustrated example it can be seen that the autofocus signals are sampled for the value −1/f in the range from −1/100 to 1/100. It can also be seen that at the value of −1/f between 1/100 and 1/1000, the autofocus signal becomes maximum. In either case, after all the samplings of the autofocus signals have been completed, the levels of all the autofocus signals are compared, and the maximum among them is judged.

The same may hold, in the cases of the first and the third to the eighth voltage application patterns described above. The principle of the contour detection system in which the autofocus signal becomes the maximum when a photographic subject is in focus is disclosed in Non-patent literature 1 mentioned above, so that the explanation is omitted here.

Figure 22:
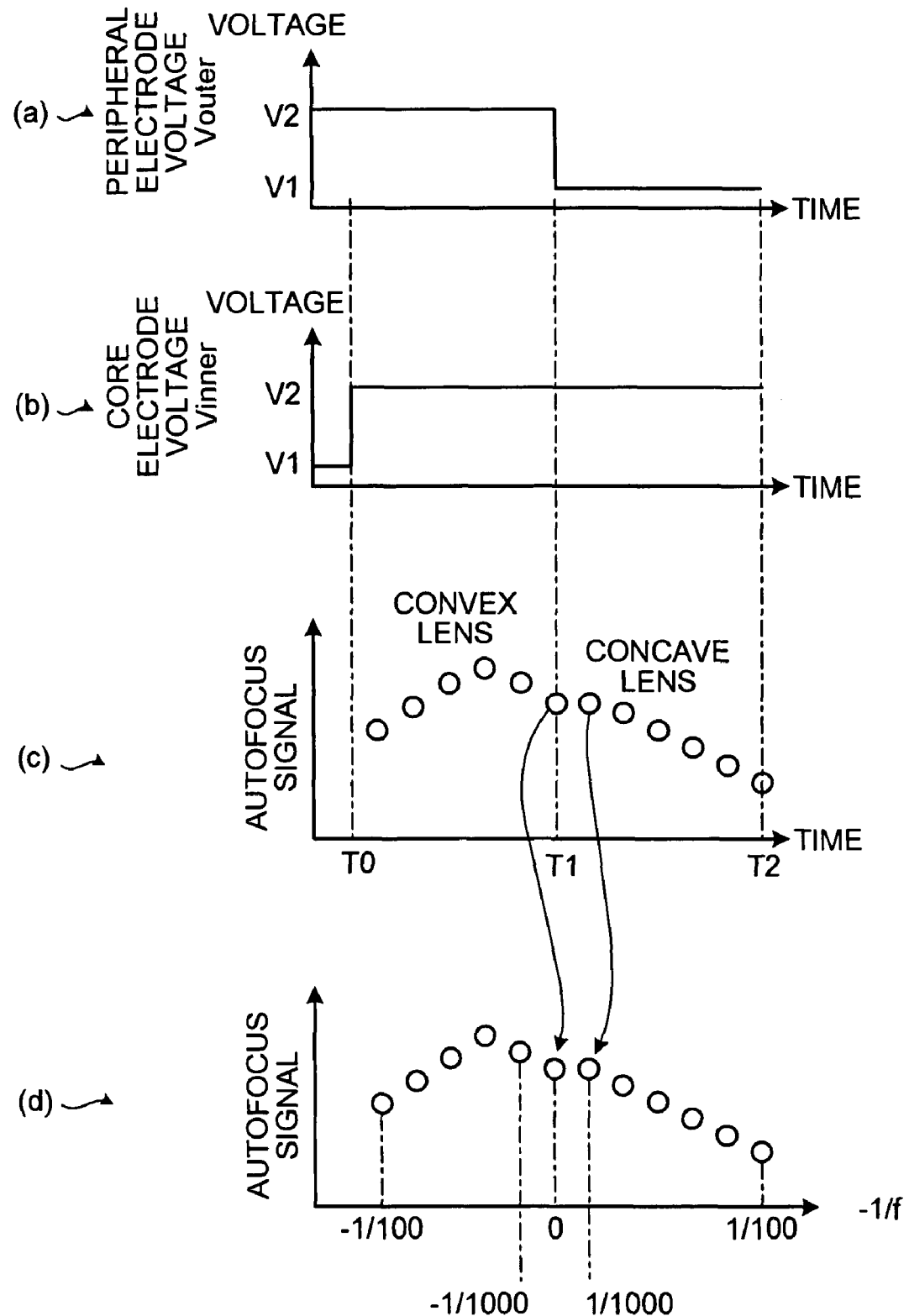
FIG. 22 is an explanatory diagram showing the method of evaluation of the autofocus signals.
Figure 23:
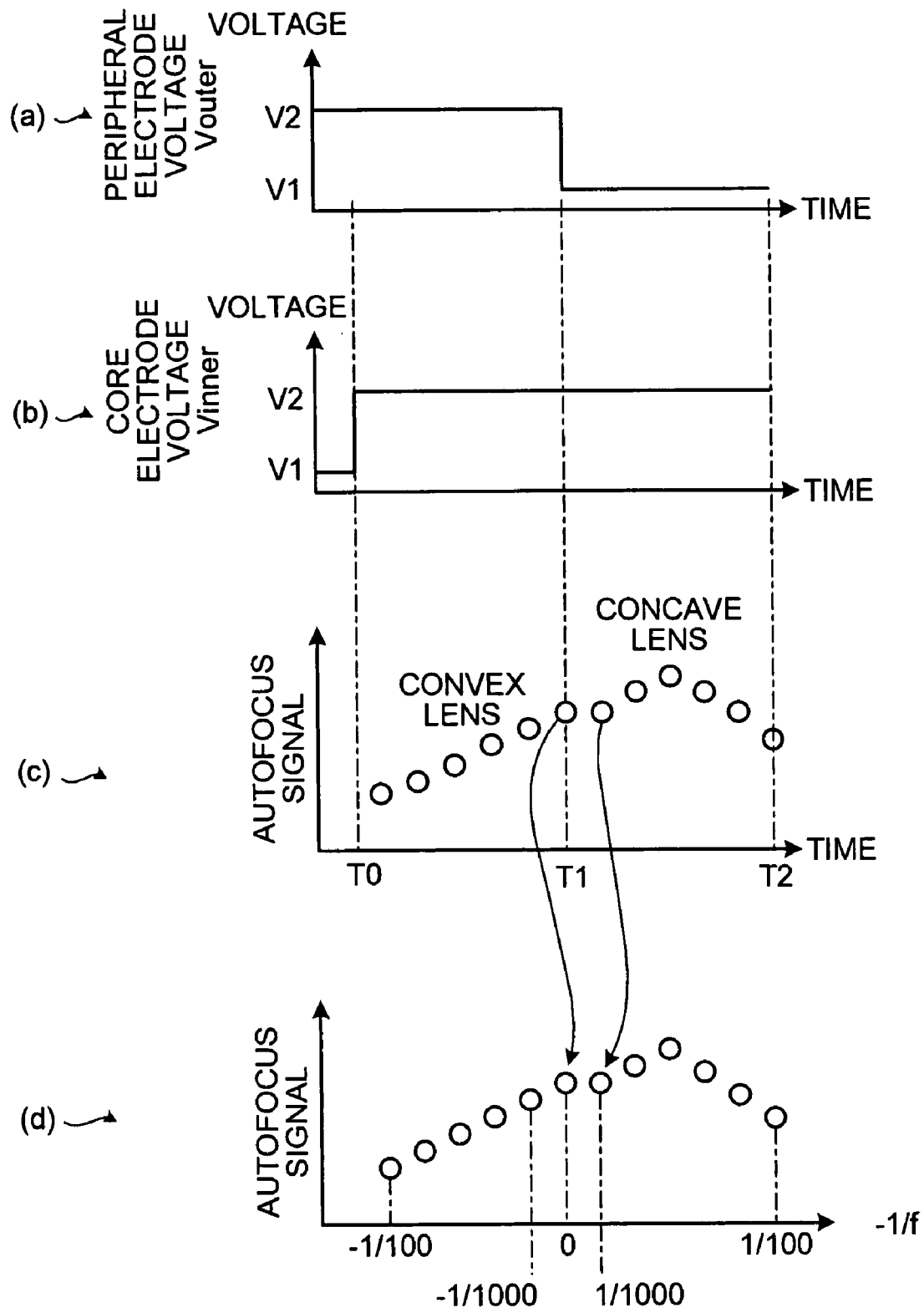
FIG. 23 is an explanatory diagram showing the method of evaluation of the autofocus signals.

As another example, the procedures of evaluation of the autofocus signals in the ninth voltage application pattern are shown in FIGS. 22 and 23. The example shown in FIG. 22 is a case where the distance L to a photographic subject is shorter than 200 mm, for example, 170 mm. The example shown in FIG. 23 is a case where the distance L to a photographic subject is longer than 200 mm, for example, 350 mm. When plural autofocus signals obtained by the sampling during the transient response operation period of the liquid crystal lens 7 are arranged in order based on the values of $-1/f$ from the negative value having the largest absolute value to the positive value having the largest absolute value, the autofocus signals are expressed as shown in (d) of FIG. 22 or 23.

Also in these illustrated examples, it can be seen that the autofocus signals are sampled for $-1/f$ values in the range of $-1/100$ to $1/100$. After all the samplings of the autofocus signals have been completed, the levels of all the autofocus signals are compared and the maximum value thereof is judged. The same may hold in the cases of the tenth to twelfth voltage application patterns.

Any of the voltage application patterns may be adopted. For example, when the first, second, fifth, sixth, ninth, or eleventh voltage application pattern is adopted, if the distance L to a photographic subject is shorter than 200 mm, the maximum value of the autofocus signal is obtained within the period (T0 to T1) where the liquid crystal lens 7 is in the convex lens state. In that case, the operation within the period of T1 to T2 and T2 to T3 thereafter may be cancelled.

Moreover, for example, when the third, fourth, seventh, eighth, tenth, or twelfth voltage application pattern is adopted, if the distance L to a photographic subject is longer than 200 mm, the maximum of the autofocus signal is obtained within the period (T0 to T1) where the liquid crystal lens 7 is in the concave lens state. In that case, the operation within the periods of T1 to T2 and T2 to T3 thereafter may be cancelled.

Thus, to detect that the maximum of the autofocus signal is obtained when the liquid crystal lens 7 has experienced only either of the periods of the convex lens state and of the concave lens state, the maximum value of the autofocus signal is judged at the time of obtaining the plural autofocus signals only within either of the periods. Then, it is judged whether the maximum value obtained as a result of the judgment is larger than the respective autofocus signal levels obtained at the sampling timings just before and just after the sampling timing at which the maximum was obtained.

As explained above, according to the first embodiment, a predetermined voltage is applied to the liquid crystal lens, plural focus signals are sampled during the period when the liquid crystal lens is carrying out the transient response operation affected by the applied voltage, and the maximum of the focus signal is obtained based on those plural focus signals. The level of the focus signal becomes the maximum when the photographic subject is in focus, and becomes smaller as the degree of focus mismatching (degree of blurriness) becomes stronger. Therefore, it is not necessary to change the voltage applied to liquid crystal stepwise and to sample focus signals after waiting until the response of the liquid crystal is stabilized at each time, and thus the focus point can be detected in a short time.

According to the first embodiment, the voltage applying unit applies, as the predetermined voltage, a first voltage to bring the liquid crystal lens into the convex lens state, and a second voltage to bring the liquid crystal lens into the concave lens state at different timings. The voltage applying unit applies the voltage to the liquid crystal lens in a way so that there is a period to apply a third voltage that is neither the voltage for putting the liquid crystal lens into the convex lens state nor the voltage for putting into the concave lens state, between the period of application of the first voltage and the period of application of the second voltage to the liquid crystal lens. For this reason, it is effective in both cases where the distance to a photographic subject is shorter and longer than the predetermined distance on which the focus is adjusted beforehand without using adjustment of the focal length by the liquid crystal lens.

Moreover, according to the first embodiment, if the liquid crystal lens control unit judges that the focus signal is maximum during the period when the liquid crystal lens is carrying out the transient response operation after either the first voltage or the second voltage is applied to the liquid crystal lens, the liquid crystal lens control unit cancels application of the other voltage to a liquid crystal lens. As a result, the time required to detect the focus point becomes half.

Second Embodiment

In a second embodiment, the liquid crystal lens 7 is operated only in the convex lens state. In this case, for example, in the configuration shown in FIG. 1 without the liquid crystal lens system 1, although it is not particularly limited, the optical lens system 2 adjusts the distance L to a photographic subject in focus to 60 cm. When the distance L to a photographic subject is shorter than 60 cm, the liquid crystal lens 7 is put into the convex lens state to adjust the focus on the subject. Others are the same as in the case of the first embodiment.

Figure 24:
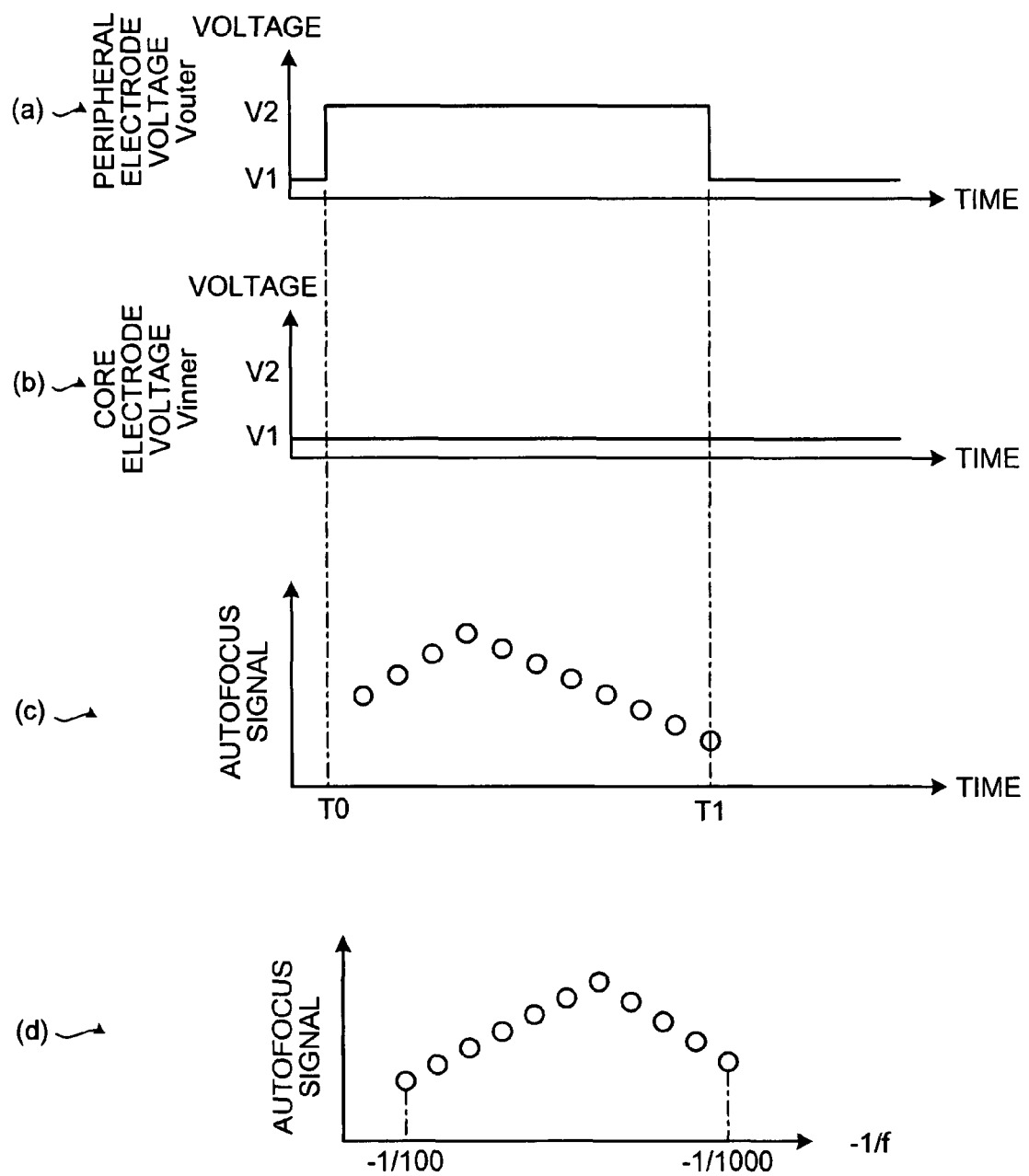
FIG. 24 is an explanatory diagram showing the method of evaluation of the autofocus signals.

FIG. 24 is an explanatory diagram showing the method of evaluation of the autofocus signals in the second embodiment. As shown in (a), (b) and (c) of FIG. 24, in the period from time T0 to time T1 when the liquid crystal lens 7 is in the convex lens state, plural autofocus signals, eleven autofocus signals in the illustrated example although not particularly limited, are obtained.

In the same way as the first embodiment, when these 11 plots are arranged in the order based on the value of $-1/f$, they are as shown in FIG. 24 (d). Also in the second embodiment, the levels of all the autofocus signals are compared and their maximum is judged after all the samplings of the autofocus signals have been completed. In addition, in the example shown in FIG. 24, the sampling period ts is shorter than in the first embodiment.

As explained above, according to the second embodiment, the voltage applying unit is effective when the distance to a photographic subject is shorter than the predetermined distance where the focus has been adjusted beforehand without using the adjustment of the focal length by the liquid crystal lens, because the voltage applying unit applies the voltage, as the predetermined voltage, to bring the liquid crystal lens into the convex lens state.

Third Embodiment

In a third embodiment, the liquid crystal lens 7 is operated only in the concave lens state. In this case, for example, in the configuration shown in FIG. 1 without the liquid crystal lens system 1, although not particularly limited, the optical lens system 2 adjusts the distance L to a photographic subject in focus to 5 cm. When the distance L to the photographic subject is longer than 5 cm, the liquid crystal lens 7 is made into the concave lens state to adjust the focus. Others are the same as in the case of the first embodiment.

As explained above, according to the third embodiment, the voltage applying unit is effective when the distance to a photographic subject is longer than the predetermined distance where the focus has been set beforehand without depending on the adjustment of the focal length by the liquid crystal lens, because the voltage applying unit applies the voltage, as the predetermined voltage, for changing the liquid crystal lens into the concave lens state.

Fourth Embodiment

The autofocus device according to a fourth embodiment not merely applies the driving voltage to the pattern electrodes formed in the liquid crystal lens by the voltage applying unit, but includes a modulating unit that eliminates the delay in a transient response operation in a region of the liquid crystal on which the smaller driving voltage among the driving voltages is applied, and applies this predetermined driving voltage (specifically, for example, pulse height modulation (PHM)) so that the maximum focus signal can be judged by means of a focus point judging unit using plural focus signal data obtained by performing sampling of the focus signals at predetermined cycles, when the liquid crystal is in the transient response operation.

By constituting such an autofocus device, due to the effect to make the response of the liquid crystal on the low-voltage-applied-side in the liquid crystal lens quicker, the focus point can be obtained using a suitable refractive index distribution also during the transient response of liquid crystal.

As for the outline configuration of the autofocus device according to the fourth embodiment, explanation thereof is omitted, since it is the same as that of the autofocus device according to the first embodiment shown in FIG. 1. As for the configuration of a liquid crystal lens system 1 in the autofocus device according to the fourth embodiment, description thereof is also omitted, since it is the same as that of the autofocus device according to the first embodiment shown in FIGS. 2 and 3. Furthermore, as for the configuration of the pattern electrode provided in the liquid crystal lens 7 of the autofocus device according to the fourth embodiment and the action of the liquid crystal lens, description thereof is also omitted, since it is the same as that of the autofocus device according to the first embodiment shown in FIG. 4.

Figure 25:
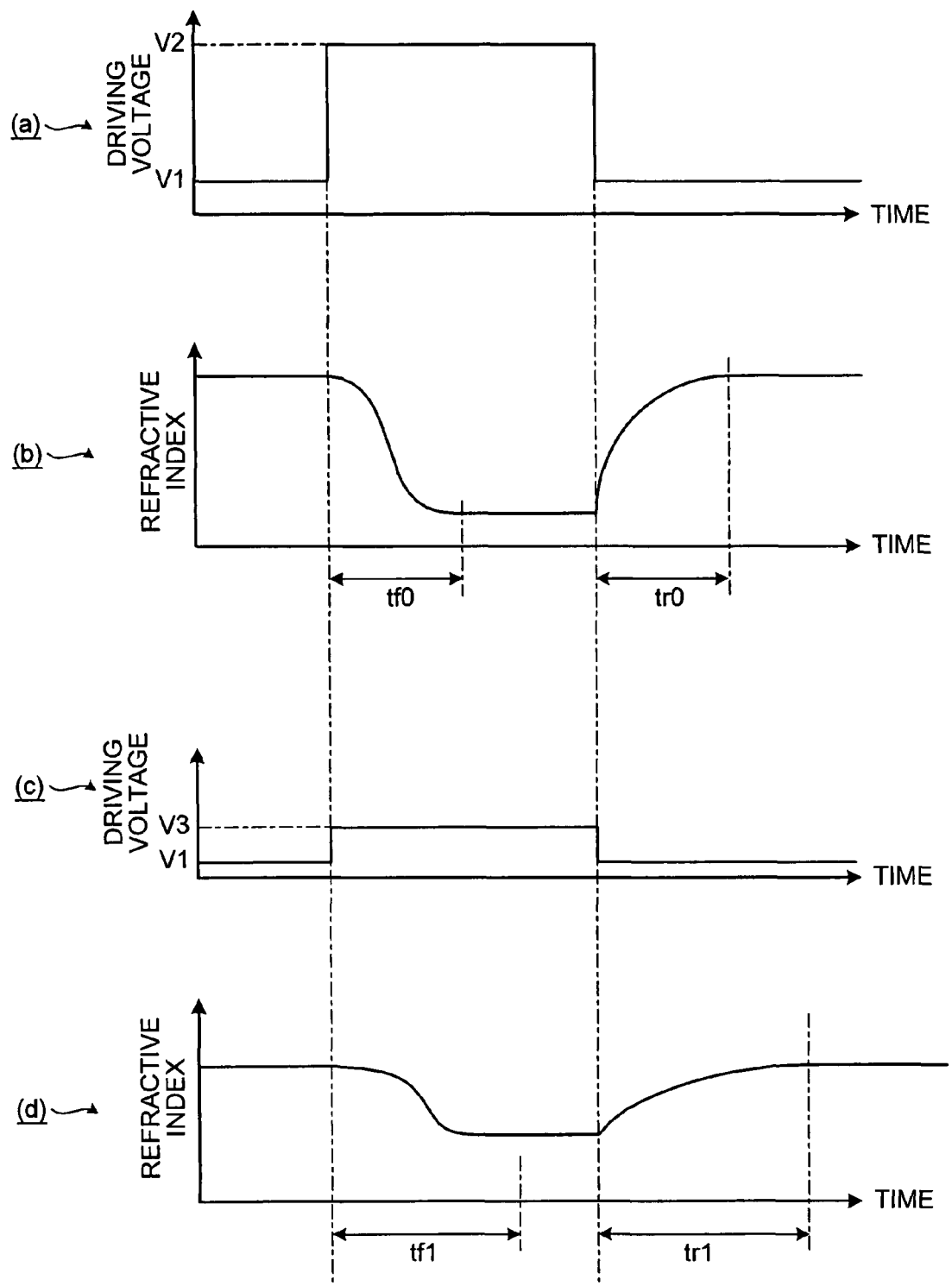
FIG. 25 is an explanatory diagram showing an example of driving voltage profile of the liquid crystal lens mounted on an autofocus device according to a fourth embodiment, and change of the refractive index.

Here, control of the liquid crystal lens system 1 in the autofocus device according to the fourth embodiment is explained. First, change in the refractive index when a voltage is applied to the liquid crystal is explained in a situation where light having the polarization plane in the same direction as the alignment direction of the liquid crystal is passing through the liquid crystal. FIG. 25 is an explanatory diagram illustrating the change in the refractive index when a voltage is applied to the liquid crystal. FIG. 25 (a) is a graph showing the driving voltage profile when a high driving voltage is applied on the liquid crystal, and FIG. 25 (b) is a graph showing the refractive index change at this time. FIG. 25 (c) is a graph showing the driving voltage profile when a driving voltage lower than the high driving voltage shown in FIG. 25 (a) is applied on the liquid crystal, and FIG. 25 (d) is a graph showing the refractive index change at this time. In addition, both the liquid crystal lens for the P wave and the liquid crystal lens for the S wave constituting the liquid crystal lens system 1 control the light entering into this liquid crystal lens system 1 by the driving unit not shown in the figure.

As shown in FIG. 25, when a driving voltage V2 is applied under the condition a driving voltage V1 has been already applied to the liquid crystal (FIG. 25 (a)), the refractive index of liquid crystal moves into the state corresponding to the driving voltage V2 being delayed by the transient response operation period tf0 from the timing of the rise of the driving voltage V1 (FIG. 25 (b)). And the refractive index of the liquid crystal returns to the original state, being delayed by the period tr0 from the timing of fall of the driving voltage from V2 to V1 (FIG. 25 (b)). These transient response operation periods, tf0 and tr0, are periods when the liquid crystal is carrying out the transient response operation, and the refractive index changes gradually.

On the other hand, if a driving voltage V3 smaller than the driving voltage V2 is applied (FIG. 25 (c)), the refractive index of the liquid crystal moves into the state corresponding to the driving voltage V3 being delayed from the timing of the rise of the driving voltage from V1 to V3 by the transient response operation period tf1 (FIG. 25 (d)). The refractive index of the liquid crystal returns to the original state, being delayed by the transient response operation period tr1 from the timing of the fall of the driving voltage (FIG. 25 (d)). In these ways, the present figure shows that the transient response operation periods tf1 and tr1 are longer than the transient response operation periods tf0 and tr0. By the way, the driving voltages V1, V2, and V3 are, for example, pulse height modulated (PHM) alternating voltages.

For example, suppose that the liquid crystal lens 7 and the pattern electrodes 10 in which the dimensions and characteristics of each part have the values mentioned above are used. Moreover, suppose that, as the liquid crystal layer 14, a nematic liquid crystal of which refractive index for an extraordinary light ne and the refractive index for a normal light no are 1.75 and 1.5 respectively, and of which birefringence Δn is 0.25 is used. In this case, when driving voltage V1 is set to 1 V and driving voltage V2 is set to 5 V, both the transient response operation period tf0 of the liquid crystal for the voltage rise and the transient response operation period tr0 of the liquid crystal for the voltage fall are both about 500 ms. And if the driving voltage V1 is set to 1 V and the driving voltage V3 is set to 2 V, where the driving voltages are in the same pulse height modulation (PHM), the transient response operation period tf1 of the liquid crystal for a voltage rise and the transient response operation period tr1 for a voltage fall are both about 800 ms.

In this way, when different driving voltages are simply applied to the core electrode 20 and to the peripheral electrode 22 for obtaining a final refractive index distribution, the distribution of the transient response operation period is generated radially from the core to the periphery. That is, on the side to which a low voltage was applied, the transient response operation period becomes longer. Then, the refractive index distribution becomes less suitable during the transient response, so that the lens aberration becomes large.

Therefore, to reduce the lens aberration during the transient response period of the liquid crystal, a procedure for modulation was adopted in which in place of the smaller driving voltage (corresponds to the driving voltage V3 in FIG. 25) among the driving voltages applied to the core electrode 20 and to the peripheral electrode 22, a larger voltage than having been planned in the early stage is applied instead by a voltage applying unit, and after maintaining the voltage for a certain period, the driving voltage is reduced gradually.

Figure 26:
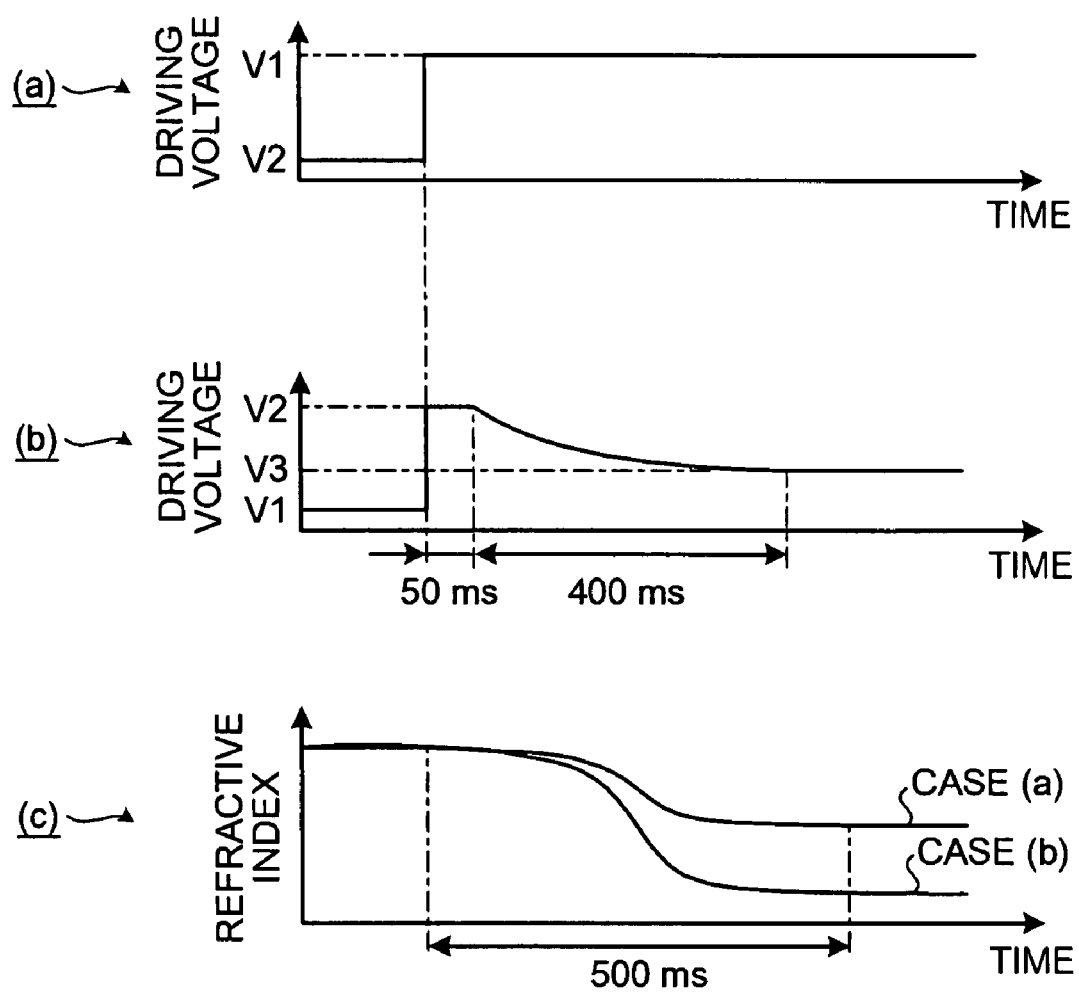
FIG. 26 is an explanatory diagram showing an example of the driving voltage profile of the liquid crystal lens mounted on the autofocus device according to the fourth embodiment, and change of the refractive index during the transient response operation period.

FIG. 26 is an explanatory diagram showing an example of the voltage modulating unit, and the change in the refractive index during the transient response operation period. FIG. 26 (a) shows an example of the driving voltage profile applied to the peripheral electrode 22 by this voltage modulating unit, FIG. 26 (b) shows an example of the driving voltage profile applied to the core electrode 20, and FIG. 26 (c) is a graph showing a refractive index change in the liquid crystal layer when the driving voltage profiles of FIGS. 26 (a) and (b) are adopted.

For example as shown in FIG. 26 (a), the case where a high driving voltage V2 is applied to the peripheral electrode 22, and a low driving voltage V3 is applied to the core electrode 20, is considered. And it is assumed that the driving voltages V2 and V3 have been pulse height modulated (PHM). Here, a modulated driving voltage is applied to the core electrode 20 such that a driving voltage V3 modulated to the same pulse height as the driving voltage applied to the peripheral electrode 22 is applied for 50 ms at the beginning, and afterwards the pulse height is gradually decreased over the period of 400 ms (FIG. 26 (b)). Then, the transient response on the core electrode 20 side and that on the peripheral electrode 22 side becomes almost the same in the early phase, and can be made to reach the steady state in about 500 ms. And, by making the liquid crystal lens perform such operations, the lens aberration during the transient response can be largely reduced (FIG. 26 (c)).

When the above modulations are performed, the transient response of the liquid crystal in the ring electrode 21 between the core electrode 20 and the peripheral electrode 22 will be influenced by the modulated driving voltage, since they are electrically connected by the ring connections 23. However, the driving voltage applied to the ring electrode 21 is a resistance divided voltage of the core electrode 20 driving voltage and the peripheral electrode 22 driving voltage. Therefore, the ring electrode 21 nearer the core electrode 20 will be more strongly influenced by the above-mentioned modulating unit, and the transient response time of the ring electrode 21 nearer the core electrode 20 becomes shorter.

In addition, in the above-mentioned modulating unit, as the modulating unit of the driving voltage applied to the core electrode 20, a modulating unit in which an enlarged amplitude is applied only for a predetermined time and then the amplitude is gradually decreased to return to the predetermined amplitude, was shown (FIG. 26 (b)). However, in the early phase, the driving voltage may be set to the same voltage as the driving voltage V2 applied to the peripheral electrode 22, and this driving voltage may be dropped gradually to the driving voltage V3. Moreover, the driving voltage applied in an early phase is not necessarily V2, but a higher voltage than V2 may be set and may be returned to the desired driving voltage V3.

Also in the fourth embodiment, a unit to sample, with a predetermined cycle, the image signals generated from the optical images passed through the liquid crystal lens system 1 and the optical lens system 2 during the transient response operation period of the liquid crystal was adopted in the same way as the first embodiment. The profile of the changes in the refractive index of the liquid crystal and in the focal length of the liquid crystal lens 7 during the transient response operation period tf upon the rise of the driving voltage, are the same as in the first embodiment shown in FIG. 6, therefore, explanation thereof is omitted. An example of the relation between the focal length of the liquid crystal lens 7 in the static state and the voltage applied to the liquid crystal lens 7 to make the focal length a given value is also the same as in the first embodiment shown in FIG. 7, therefore explanation thereof is omitted. As shown in FIG. 7, it can be seen that the liquid crystal lens becomes in the convex lens states, the parallel glass state, and the concave lens state, respectively, by setting the voltage applied to the core electrode 20, i.e., the core voltage Vinner and the voltage applied to the peripheral electrode 22, i.e., the peripheral voltage Vouter, into combination of different voltages.

Figures 1, 27:
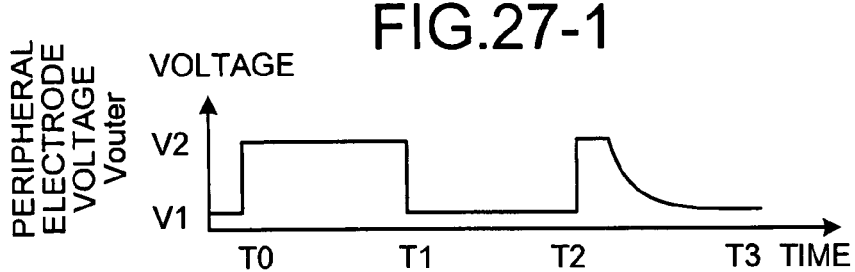
Figures 2, 27:
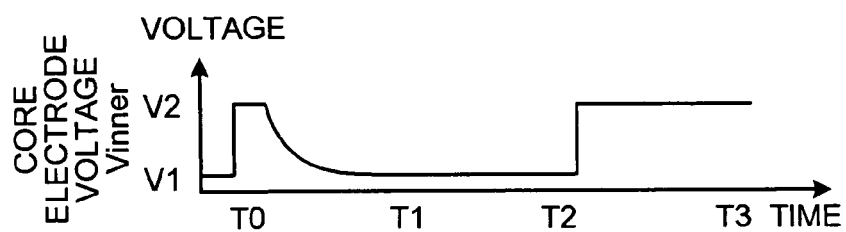
Figures 3, 27:
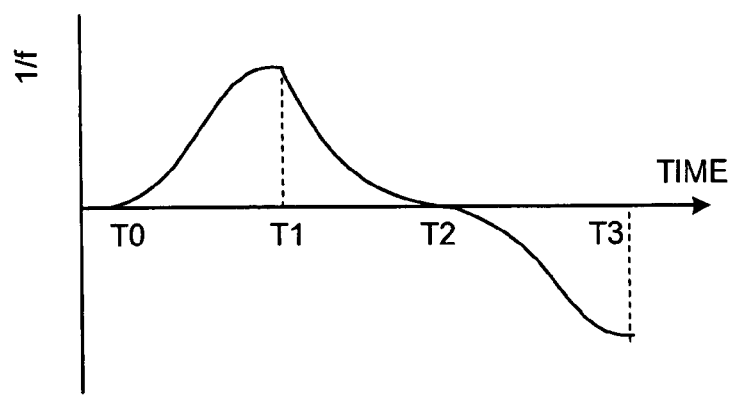

Next, the voltage application patterns to the liquid crystal lens 7 for putting the liquid crystal lens 7 into both the convex lens state and the concave lens state is explained. FIG. 27-1 is an explanatory diagram showing the voltage Vouter profile applied to the peripheral electrode 22 in the liquid crystal lens 7, FIG. 27-2 is an explanatory diagram showing the voltage Vinner profile applied to the core electrode 20 in the liquid crystal lens 7, and FIG. 27-3 is an explanatory diagram showing the change in the inverse of the focal length when the voltage profiles according to FIG. 27-1 and FIG. 27-2 are applied to the liquid crystal lens. By the way, the liquid crystal lens 7 becomes in the convex lens state when the voltage Vouter applied to the peripheral electrode 22 in the pattern electrode 10 is higher than the voltage Vinner applied to the core electrode 20, and when the situation is reversed, the liquid crystal lens 7 becomes in the concave lens state. Although various voltage application patterns may be figured out, an example of the case making the convex lens state will be explained hereafter.

As shown in FIGS. 27-1 and 27-2, both the voltage Vouter first applied to the peripheral electrode 22 of the pattern electrodes 10 and the voltage Vinner applied to the core electrode 20 are set to be the first voltage V1. Subsequently at time T0, the voltage Vouter of the peripheral electrode 22 and the voltage Vinner of the core electrode 20 are changed to the second voltage V2 higher than the first voltage V1. Next, after 50 ms, the voltage Vinner of the core electrode 20 is gradually dropped. Then, at time T1, the voltage Vouter of the peripheral electrode 22 is changed to the first voltage V1. Next, at time T2, the voltage Vinner of the core electrode 20 and the voltage Vouter of the peripheral electrode 22 are changed to the second voltage V2, and the operation is terminated at time T3.

The liquid crystal lens 7 is in the parallel glass state at time T0, is in the convex lens state in which the lens power becomes larger gradually in the period from time T0 to time T1, is in the convex lens state in which the lens power gradually becomes smaller in the period from the time T1 to the time T2, and is in the concave lens state in which the lens power becomes larger gradually in the period from time T2 to time T3.

When the liquid crystal lens 7 is operated in this way, as shown in FIG. 27-3, the value of 1/f is zero at time T0, and between time T0 and time T1, the value changes along a downward convex curve, then along an upward convex curve after passing an inflection point, and at time T1, reaches the maximum positive value. Therefore, at time T1, the liquid crystal lens becomes in the convex lens state with the maximum lens power. And the value of 1/f changes, between time T1 and time T2, along a downward convex curve to reach the value zero, and between time T2 and time T3, the value changes along an upward convex curve and then along a downward convex curve to become the maximum negative value at time T3. Therefore, at time T3, the lens is in the concave lens state with the greatest lens power.

If the first voltage V1 is set to 1 V and the second voltage V2 is set to 5 V, the voltage Vouter of the peripheral electrode 22 rises at time T0, and since the first voltage V1 is lower compared with the second voltage V2, a voltage modulation is performed on the first voltage V1 according to the profile shown in FIG. 27-2. At this time, the transient response operation time tf of the liquid crystal lens 7 can be made about 500 ms, as mentioned above.

Further, since the voltage Vinner of the core electrode 20 rises at time T2, a voltage modulation is performed on the voltage Vouter of the peripheral electrode 22 according to the profile shown in FIG. 27-1. That is, at the time T2, the voltage Vouter of the peripheral electrode 22 is changed to the second voltage V2 higher than the first voltage V1, and after 50 ms, the driving voltage is gradually dropped. At this time, the transient response operation time tf of the liquid crystal lens 7 is about 500 ms, as mentioned above. Therefore, the time required to complete the autofocus control is about 1.5 seconds in total.

Next, an evaluation of the plural autofocus signals obtained for the liquid crystal lens 7 both in the convex lens state and in the concave lens state is explained. Although not particularly limited, it is assumed here that in the configuration shown in FIG. 1 without the liquid crystal lens system 1, the optical lens system 2 has focused on a photographic subject at a distance L of 200 mm.

Therefore, in the configuration according to the fourth embodiment (see FIG. 1), when the distance L to a photographic subject is shorter than 200 mm, the liquid crystal lens 7 is put into the convex lens state, while, when the distance L to the subject is longer than 200 mm, the liquid crystal lens 7 is put into the concave lens state, as in the case of the first embodiment. As described above, in the fourth embodiment, in the case when the liquid crystal lens 7 is in the convex lens state, the focal length f is expressed with a positive value, and in the case when the liquid crystal lens 7 is in the concave lens state, it is expressed with a negative value.

And, in the convex lens state, the power of the liquid crystal lens 7 becomes weaker along with the change in f value of 100 mm, 200 mm, 500 mm, and 1000 mm, and in the concave lens state the power of the liquid crystal lens 7 becomes weaker along with the change in the value f, for example, of −100 mm, −200 mm, −500 mm and −1000 mm.

Figure 28:
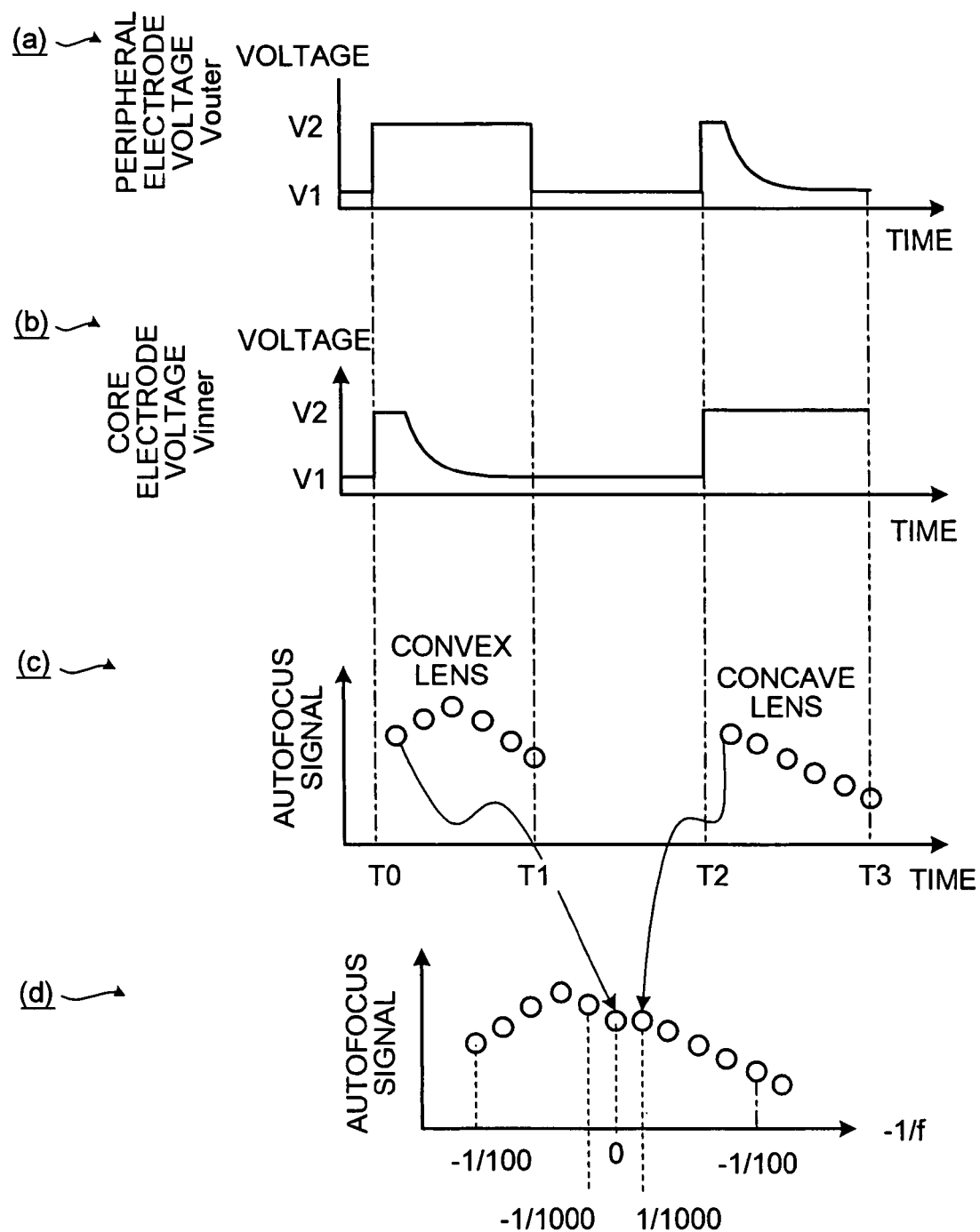
FIG. 28 is an explanatory diagram illustrating a method of evaluation of the autofocus signals in the autofocus device according to the fourth embodiment.
Figure 29:
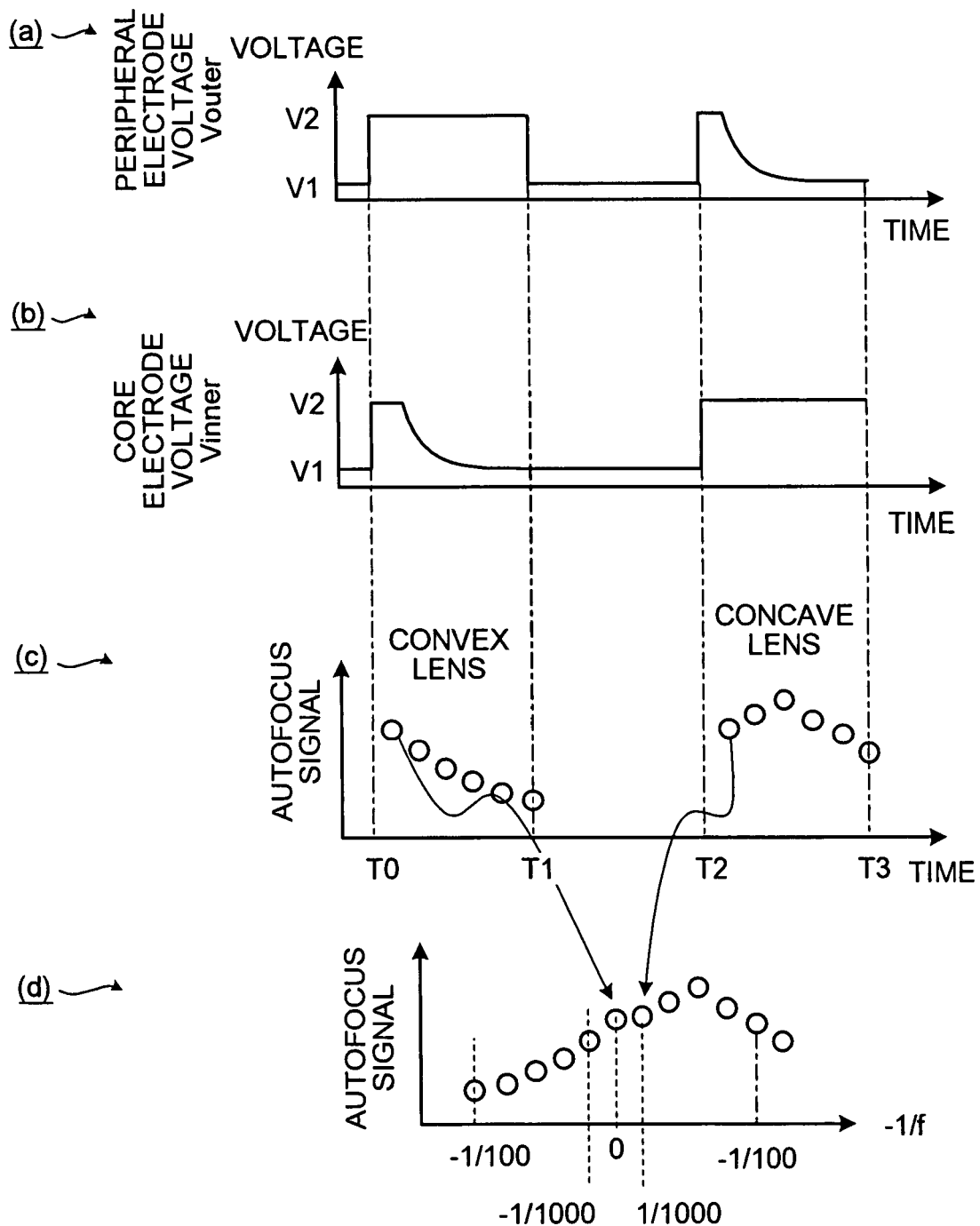
FIG. 29 is an explanatory diagram illustrating the method of evaluation of the autofocus signals in the autofocus device according to the fourth embodiment.

These phenomena are explained, by taking up the voltage application pattern shown in FIGS. 27-1 to 27-3 as an example. FIGS. 28 and 29 are explanatory diagrams illustrating a method of evaluation of the autofocus signals in the voltage application profile shown in FIGS. 27-1 to 27-3.

As shown in FIGS. 28 (a)-(c) and FIGS. 29 (a)-(c), in these voltage application patterns, during the period from time T0 to time T1 when the liquid crystal lens 7 is in the convex lens state, six autofocus signals are obtained in the illustrated examples although not particularly limited.

Moreover, in the period from time T2 to time T3 when the liquid crystal lens 7 is in the concave lens state, six autofocus signals are obtained in the illustrated examples, although not particularly limited. In these cases, it is preferable that sampling is started with a little delay after the time of changing the voltage Vouter of the peripheral electrode 22 or the voltage Vinner of the core electrode 20.

And the example shown in FIG. 28 (c) is a case where the distance L to a photographic subject is shorter than 200 mm, for example, 170 mm. Therefore, when the liquid crystal lens 7 is in the convex lens state, the autofocus signal becomes the maximum. Here, for convenience, the value of inverse of the focal length f with reversed positive/negative sign, i.e., the value of −1/f is used.

When plural autofocus signals obtained by the sampling during the transient response operation period of the liquid crystal lens 7 are arranged based on the value of −1/f in order from the negative value having the largest absolute value to the positive value having the largest absolute value, the autofocus signals are expressed as shown in FIG. 28 (d). In this illustrated example, it can be seen that the autofocus signals have been sampled in the range of the −1/f values from −1/100 to 1/100. Also it can be seen that at the value of −1/f between −1/100 and −1/1000, the autofocus signal is the maximum.

The example shown in FIG. 29 (c) is a case where the distance L to a photographic subject is longer than 200 mm, for example, 350 mm. Therefore, the autofocus signal becomes the maximum, when the liquid crystal lens 7 is in the concave lens state. Plural autofocus signals obtained by the sampling during the transient response operation period of the liquid crystal lens 7 are arranged based on the value of −1/f in the order from the negative value having the largest absolute value to the positive value having the largest absolute value, the autofocus signals are expressed as shown in FIG. 29 (d).

Also in this illustrated example, it can be seen that the autofocus signals are sampled in the range of the −1/f values from −1/100 to 1/100. It can be seen that at the value of −1/f between 1/100 and 1/1000, the autofocus signal becomes the maximum. In either case, the levels of all the autofocus signals are compared and the maximum value among the autofocus signals is judged after all the samplings of the focus signals is completed. The principle of the contour detection procedure in which the autofocus signal becomes the maximum when a photographic subject is in focus is disclosed in Non-patent literature 1 mentioned above, therefore explanation thereof is omitted here.

When the distance L to a photographic subject is shorter than 200 mm, the maximum value of the autofocus signal is obtained within the period (T0 to T1) where the liquid crystal lens 7 is in the convex lens state. In that case, the operation within the period of T1 to T2 and T2 to T3 after that may be cancelled.

Furthermore, to detect that the maximum value of the autofocus signal was obtained at the stage when the liquid crystal lens 7 has experienced only one out of the convex lens state and concave lens state, the maximum value of the autofocus signal is judged when plural autofocus signals are obtained only in either one of these periods. Then, it is judged that the maximum value obtained as a result of the judgment is larger than the respective levels of the autofocus signals obtained at the sampling timings just before and just after the sampling timing at which the maximum value was obtained.

Fifth Embodiment

The autofocus device according to a fifth embodiment not merely applies the driving voltages to the pattern electrode formed in the liquid crystal lens by the voltage applying unit, but includes a modulating unit that eliminates the delay of a transient response operation in the liquid crystal area on which the smaller driving voltage among driving voltages is applied, and applies this predetermined driving voltage (specifically, for example pulse width modulation (PWM)) so that it can judge the maximum focus signal by means of a focus point judging unit using plural pieces of focus signal data obtained by sampling the focus signals at predetermined cycles when the liquid crystal is in the transient response operation.

By constituting such autofocus device, due to the effect to make the response of the liquid crystal on the low-voltage-applied-side in the liquid crystal lens quicker, the focus point can be obtained with a suitable refractive index distribution also during the transient response of the liquid crystal.

Since a schematic configuration of the autofocus device according to the fifth embodiment is the same as that of the autofocus device according to the first embodiment shown in FIG. 1, explanation thereof is omitted. Since a configuration of the liquid crystal lens system 1 in the autofocus device according to the fifth embodiment is the same as that of the autofocus device according to the first embodiment shown in FIGS. 2 and 3, explanation thereof is also omitted. Furthermore, since a configuration of the pattern electrode provided in the liquid crystal lens 7 of the autofocus device according to the fifth embodiment and the action of the liquid crystal lens are the same as that of the autofocus device according to the first embodiment shown in FIG. 4, explanation thereof is also omitted.

Here, control of the liquid crystal lens system 1 in the autofocus device according to the fifth embodiment is explained. Here, the change in the refractive index when voltage is applied to liquid crystal in a condition that the light with the polarization plane in the same direction as the alignment direction of the liquid crystal is passing through the liquid crystal is the same as that of the fourth embodiment shown in FIG. 25, therefore, explanation thereof is omitted. However, it is different from the fourth embodiment on the point that the driving voltages V1, V2, and V3 in FIG. 25 are the pulse width modulated (PWM) alternating voltages, for example.

Figure 30:
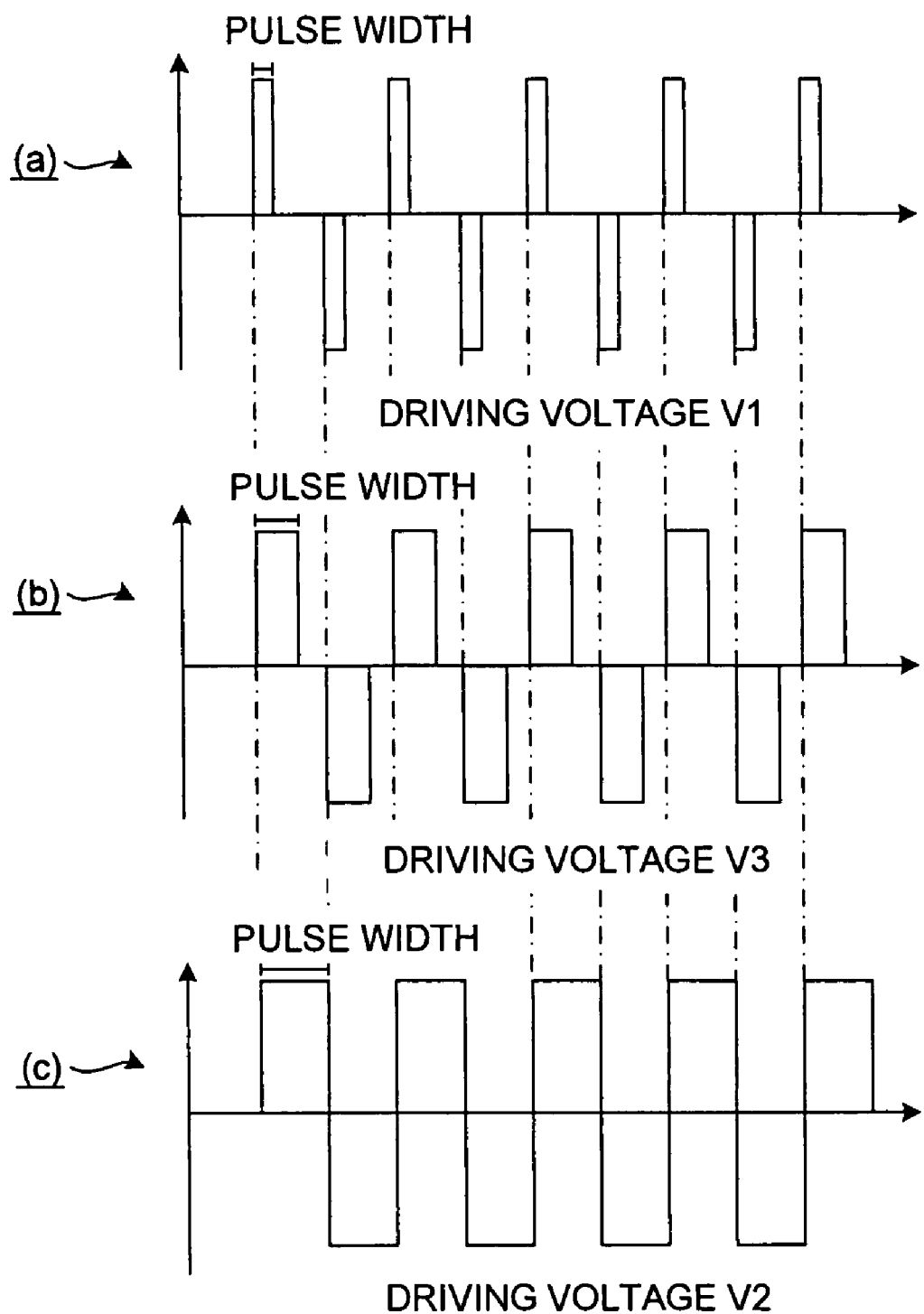
FIG. 30 is an explanatory diagram illustrating a pulse-width-modulated driving waveform applied to the liquid crystal lens mounted on an autofocus device according to a fifth embodiment.

Next, the pulse width modulated (PWM) waveforms are shown in FIG. 30. The waveform corresponding to the driving voltage V1 with the smallest effective voltage is shown in FIG. 30 (a), the waveform corresponding to the driving voltage V2 with the largest effective voltage is shown in FIG. 30(c), and the waveform corresponding to the intermediate driving voltage V3 between V1 and V2 is shown in FIG. 30 (b), respectively. Frequencies are all definite, and are square waves of about 1 kHz, for example, and the effective voltage is changed by changing the pulse width.

For example, we assume to use the liquid crystal lens 7 and the pattern electrode 10 with each of their parts having above mentioned dimensions and characteristics. Moreover, we assume to use, for the liquid crystal layer 14, a nematic liquid crystal having the refractive index ne for the extraordinary light of 1.75, and the refractive index no for the ordinary light of 1.5, respectively, and having the birefringence Δn of 0.25. In this case, when driving voltage V1 is set to 1 [Vrms] (expression by effective voltage, and hereafter specific driving voltage means effective voltage) and driving voltage V2 is set to 5 [Vrms], both the transient response operation period tf0 of the liquid crystal for the voltage rise and the transient response operation period tr0 of the liquid crystal for the voltage fall are about 500 ms. And when driving voltages are applied in the same pulse width modulation (PWM), if the driving voltage V1 is set to 1 [Vrms] and the driving voltage V3 is set to 2 [Vrms], the transient response operation period tf1 of the liquid crystal for a voltage rise and the transient response operation period tr1 for a voltage fall both become about 800 ms.

In this way, when different driving voltages for obtaining a final refractive index distribution are simply applied to the core electrode 20 and to the peripheral electrode 22, a distribution of the transient response operation period is generated radially from the core to the periphery. That is, on the side where a low voltage was applied, the transient response operation period becomes longer. Then, the refractive index distribution becomes less suitable during the transient response, so that the lens aberration becomes large.

Therefore, to reduce the lens aberration during the transient response period of the liquid crystal, a method of modulation is adopted, similarly to the fourth embodiment, in which by a voltage applying unit, a larger value of the driving voltage than having been planned in the early stage is applied in place of the smaller driving voltage (the driving voltage V3, see FIG. 25(c)) among the driving voltages applied to the core electrode 20 or to the peripheral electrode 22, and after maintaining the voltage for a certain period, the driving voltage is reduced gradually.

Figure 31:
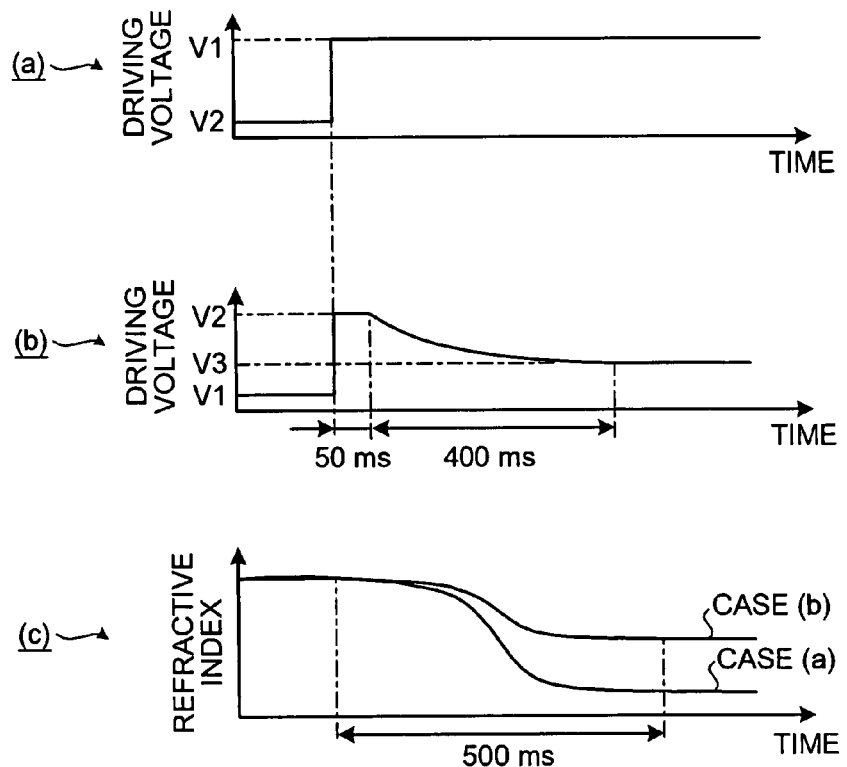
FIG. 31 is an explanatory diagram showing an example of a voltage modulation process of the autofocus device and change in the refractive index during the transient response operation period according to the fifth embodiment.

FIG. 31 is an explanatory diagram showing an example of the voltage modulating unit and the change in the refractive index during the transient response operation period. For example, as shown in FIG. 31 (a), the case where a high driving voltage V2 is applied to the peripheral electrode 22 and a low driving voltage V3 is applied to the core electrode 20 (FIG. 31(b)) is considered. It is assumed that the driving voltages V2 and V3 have been pulse width modulated (PWM). Here, a modulated driving voltage that is modulated such that a driving voltage V3 is applied for 50 ms at the beginning, and afterwards pulse width is gradually shortened over the period of 400 ms (FIG. 31 (b)) is applied to the core electrode 20. Then, the transient response on the core electrode 20 side and that on the peripheral electrode 22 side becomes similar in the early phase, and can be made to reach the steady state in about 500 ms. By making the liquid crystal lens perform such operations, the lens aberration during the transient response can be largely reduced.

When the above modulations are performed, the transient response of the liquid crystal in the ring electrode 21 between the core electrode 20 and the peripheral electrode 22 are influenced by the modulated driving voltage, since the core electrode 20 and the peripheral electrode 22 are electrically connected by the ring connections 23. However, the driving voltage applied to the ring electrode 21 is a resistance divided voltage of the core electrode 20 driving voltage and of the peripheral electrode 22 driving voltage. Therefore, the ring electrode 21 positioned closer to the core electrode 20 is more strongly influenced by the modulating unit, and the transient response time becomes almost about the same over the liquid crystal from the side near the core electrode 20 to the side near the peripheral electrode 22 (FIG. 31 (c)).

While for the modulating unit to modulate the driving voltage applied to the core electrode 20, a modulation to lengthen the pulse width for a predetermined time, and after that, to shorten the pulse width gradually and smoothly to return to the predetermined pulse width has been explained (FIG. 31 (b)), the driving voltage applied to the core electrode 20 may be set to the same driving voltage V2 applied to the peripheral electrode 22 in the early phase, and the pulse width is shortened in plural steps to become the driving voltage V3, or the driving voltage applied in an early phase may not be the same as the driving voltage applied to the peripheral electrode 22, but may be set to be higher than that. Furthermore, the modulating unit in which the liquid crystal has small aberration for acting as a lens is desirable.

Also in the fifth embodiment, a unit to sample, with a predetermined cycle, the image signals generated from the optical images having passed through the liquid crystal lens system 1 and the optical lens system 2 during the transient response operation period of the liquid crystal was adopted in the same way as the first embodiment. The profile of the changes in the refractive index of the liquid crystal and in the focal length of the liquid crystal lens 7 during the transient response operation period upon the rise of the driving voltage tf are the same as in the first embodiment shown in FIG. 6, so that their explanations are omitted. An example of the relation between the focal length of the liquid crystal lens 7 in the static state and the voltage applied to the liquid crystal lens 7 to put the focal length into a given value is also the same as in the first embodiment shown in FIG. 7, therefore, explanation thereof is omitted. As shown in FIG. 7, it can be seen that the liquid crystal lens becomes in the convex lens state, the parallel glass state, and the concave lens state, respectively, by setting the voltage applied to the core electrode 20, i.e., the core voltage Vinner and the voltage applied to the peripheral electrode 22, i.e., the peripheral voltage Vouter, into combination of different voltages.

The voltage application patterns to the liquid crystal lens 7 for putting the liquid crystal lens 7 into both the convex lens state and the concave lens state are the same as those in the fourth embodiment shown in FIGS. 27-1, 27-2, and 27-3, so that their explanations are omitted. Since the method of evaluation of the autofocus signals in the voltage application profile shown in FIGS. 27-1 to 27-3 is also the same as that of the fourth embodiment shown in FIGS. 28 and 29, explanation thereof is omitted.

Sixth Embodiment

Figure 32:
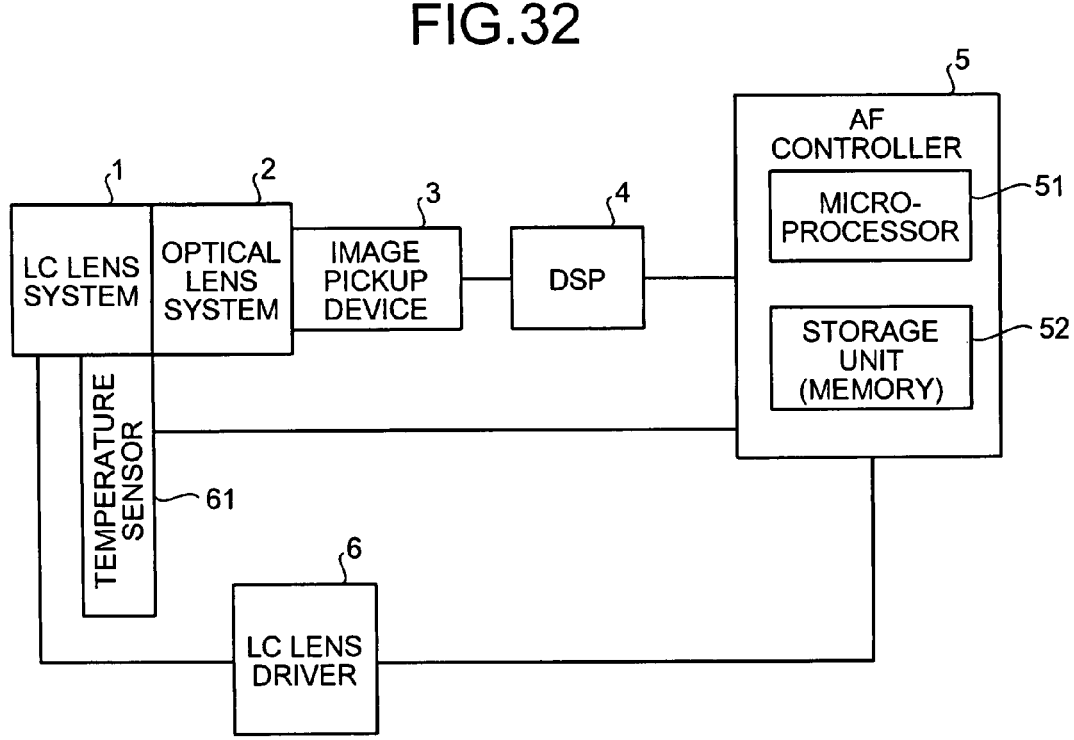
FIG. 32 is a block diagram of a schematic configuration of an autofocus device according to a sixth embodiment.

FIG. 32 is a block diagram of a schematic configuration of the autofocus device according to a sixth embodiment. As shown in FIG. 32, the autofocus device according to the sixth embodiment is equipped with a liquid crystal (LC) lens system 1, the optical lens system 2, an image pickup device 3, the DSP (a digital signal processor) 4, the autofocus (AF) controller 5, and the liquid crystal lens driver 6, in the same way as in the first embodiment. Furthermore, the autofocus device according to the sixth embodiment includes a temperature sensor 61. The liquid crystal lens system 1 has a combinatory configuration of a liquid crystal lens for the P wave and a liquid crystal lens for the S wave. The optical lens system 2 has an aperture, a pan-focus group lens and an infrared cut-off filter. The image pickup device 3 has an image sensor consisting of a solid state image pickup device, such as CCD and CMOS, and an analog-digital converter. The temperature sensor 61 measures the temperature of the liquid crystal lens system 1, and is arranged near the liquid crystal lens system 1.

The optical images focused by passing through the liquid crystal lens system 1 and the optical lens system 2 is changed into electrical signals by the image sensor of the image pickup device 3. The electrical signal output from the image sensor is changed into digital signals by an analog-digital converter. The DSP 4 extracts high frequency components of the image in a specific region from the digital signals output from the analog-digital converter, and obtains focus signals (hereafter, "autofocus signals"). The autofocus controller 5 extracts plural autofocus signals corresponding to the focus matching degree output from the DSP 4, by switching between a focus signal collective extraction unit or a focus signal serial extraction unit based on the temperature information from the temperature sensor 61.

The "focus signal serial extraction unit" mentioned above refers to, for example, a voltage applying unit that applies the predetermined voltage to a liquid crystal lens, and a unit that extracts plural focus signals by sampling signals in a state where the operation of the liquid crystal in the liquid crystal lens is stable, the state obtained while changing the voltage applied to the liquid crystal lens by the voltage applying unit.

The "focus signal collective extraction unit" refers to, for example, a unit that extracts plural focus signals by sampling, with a predetermined cycle, the image signals generated based on the optical images having passed through the liquid crystal lens that is in a transient response operation due to the applied predetermined voltage by the voltage applying unit. The specific controlling method of each of these units is described later.

And, the autofocus controller 5 controls the driving condition of the liquid crystal lens system 1, so that the level of the autofocus signal becomes the maximum, based on the extracted plural autofocus signals.

The autofocus controller 5 has the microprocessor 51 for performing a series of controls mentioned above and the storage unit 52. The storage unit 52 has a read-only memory unit (ROM unit) that stores the programs executed by the microprocessor 51 and various relations required to obtain the optimal driving voltage and the like, and a writable memory unit (RAM unit) that is used as a working area of the microprocessor 51. The liquid crystal lens driver 6 applies voltages to the liquid crystal lens system 1, based on the control signals output from the autofocus controller 5.

The content of processing performed by the autofocus controller 5 will be described later. The liquid crystal lens system 1 and the optical lens system 2 correspond to the optical lens unit. The image pickup device 3 and the DSP 4 correspond to the photoelectric converting unit. The autofocus controller 5 corresponds to the focus signal collective extraction unit, the focus signal serial extraction unit, the focus point judging unit and the extraction method selection unit of the liquid crystal lens control unit. The liquid crystal lens driver 6 corresponds to the voltage applying unit of the liquid crystal lens control unit. The temperature sensor 61 corresponds to a temperature detecting unit.

Since the configuration of the liquid crystal lens system 1 in the autofocus device according to the sixth embodiment is the same as that of the autofocus device according to the first embodiment shown in FIGS. 2 and 3, explanation thereof is omitted. Also, since the configuration of the pattern electrodes 10 provided to the liquid crystal lens 7 in the autofocus device according to the sixth embodiment, and the effects of this liquid crystal lens 7 are the same as those of the autofocus device according to the first embodiment shown in FIG. 4, explanation thereof is omitted. The changes in the refractive indexes when voltages are applied to the liquid crystal in a condition where the light having the polarization plane in the same direction as the alignment direction of the liquid crystal is passing through the liquid crystal is also the same as those of the autofocus device according to the first embodiment shown in FIG. 5, therefore, explanation thereof is omitted.

Figures 33, 34:
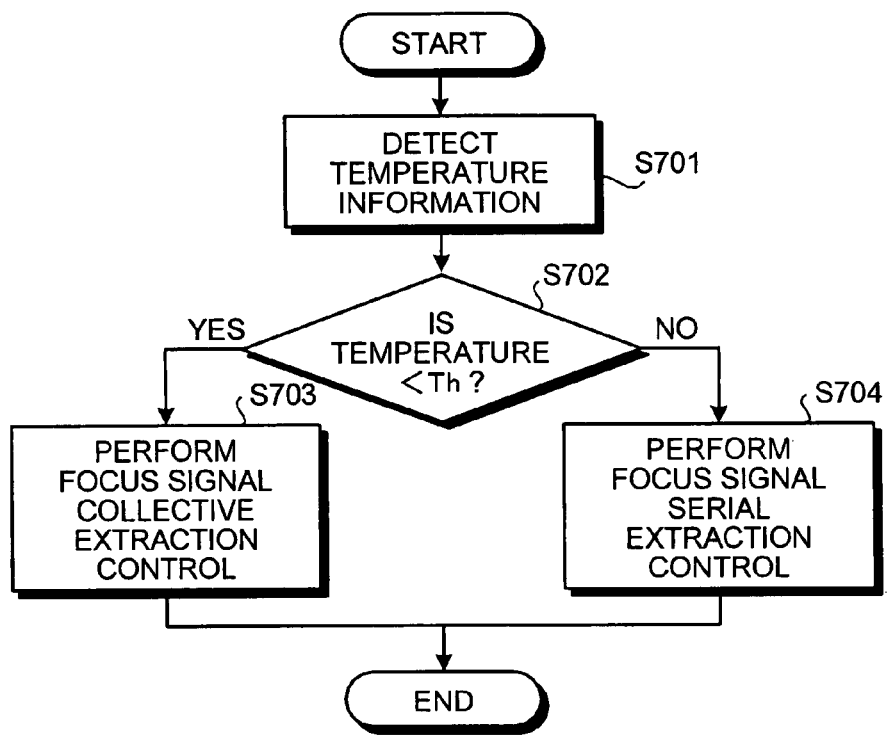
FIG. 33 is a table showing a response time, a processing time for focus signal serial extraction, and a sampling number for focus signal collective extraction, at each temperature when voltage is applied to the liquid crystal.
FIG. 34 is a flowchart of an autofocus operation of the autofocus device according to a sixth embodiment.
Figures 1, 35:
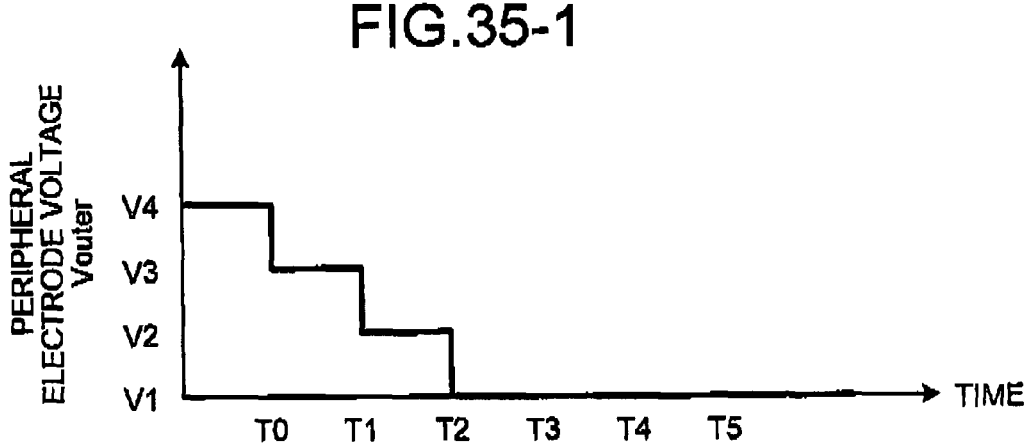
Figures 2, 35:
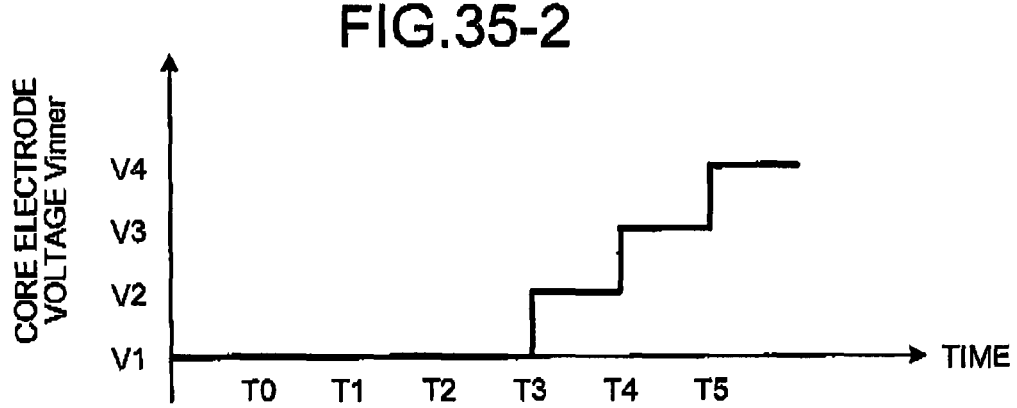
Figures 3, 35:
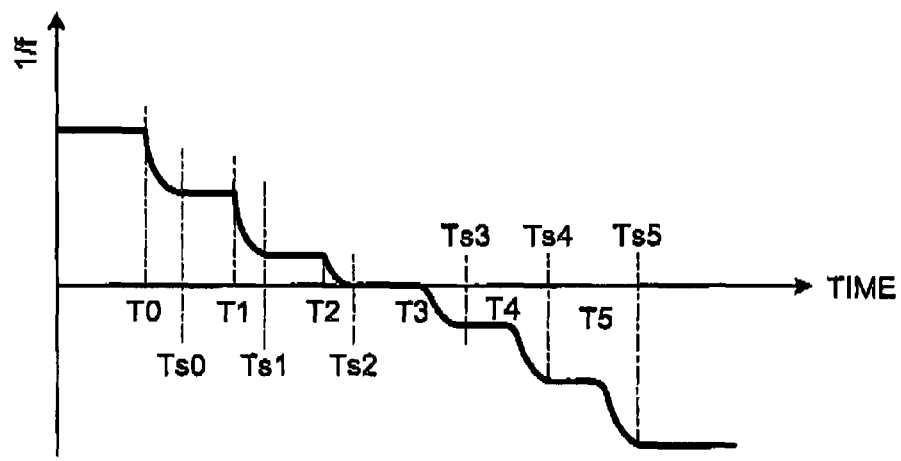

In the case of the above-mentioned liquid crystal lens, the transient response operation period tf of the liquid crystal upon the rise of the driving voltage V0 from 0 V to 5 V and the transient response operation period, tr, of the liquid crystal upon the fall of the driving voltage V0 from 5 V to 0 V are shown as the response periods in FIG. 33. FIG. 33 is a table showing the response times for each temperature when voltage is applied to the liquid crystal, the processing times at the focus signal serial extraction, and the sampling numbers at the focus signal collective extraction. In addition, the relation among the processing time at the serial extraction, the sampling number at the collective extraction, and each temperature are also clearly indicated in this table.

From the table of FIG. 33, it can be seen that when the temperature is 40° C., the transient response operation time tf of the liquid crystal for the rise and the response time tr of liquid crystal for the fall are both 100 ms, and when the temperature is 20° C., the transient response operation time tf for the rise and the response time tr for the fall of the liquid crystal are both 250 ms.

Next, the autofocus processing of the autofocus controller 5 are explained using a flowchart of FIG. 34. FIG. 34 is the flowchart showing the autofocus operation of the autofocus device in the sixth embodiment.

When the autofocus processing is initiated, first the temperature sensor 61 shown in FIG. 32 detects temperature information around the liquid crystal lens system 1 (step S701).

Next, in step S702, when the read temperature is lower than Th (step S702: YES), focus signal collective extraction control is performed (step S703).

Also in step S702, when the read temperature is higher than Th (step S702: NO), focus signal serial extraction control is performed (step S704).

Here, Th in step S702 is explained. The serial extraction processing time in FIG. 33 is the processing time when 10 focus positions are set up beforehand for short- and long-distance view, and the collective extraction sampling number is the sampling number during the transient response operation of the liquid crystal at 20 hertz frame frequency, i.e., when the autofocus signal is sampled every 50 milliseconds.

Here, if serial extraction control is performed at the temperature lower than 15° C., the autofocus operation time of 3 seconds or more is necessary as shown in the serial extraction processing time in FIG. 33, and is not practical. Furthermore, as shown in the collective extraction sampling numbers in FIG. 33, if collective extraction control is performed at the temperature higher than 20° C., it becomes impossible to sample the autofocus signals at the ten focus positions set up beforehand for short- and long-distance view and it becomes impossible to judge the exact focus position.

Therefore, Th may be determined to be a temperature that is 15° C. or higher, at which the serial extraction processing time is 3 seconds or less, and in addition, 20° C. or lower, at which the collective extraction sampling number is ten or more positions.

Next, the focus signal collective extraction control in step S703 is explained. As mentioned above, at low temperature, a long time is required to complete the transient response operation of the liquid crystal. Therefore, in the case of a low temperature below Th in step S702, the image signals generated from the optical images that passed through the liquid crystal lens system 1 and the optical lens system 2 are sampled at predetermined cycles during the transient response operation period of the liquid crystal.

In the autofocus device according to the sixth embodiment, the refractive index change profile of the liquid crystal and the focal length change profile of the liquid crystal lens 7 during the transient response operation period tf upon the rise of the driving voltage, are the same as in the first embodiment shown in FIG. 6, therefore, explanation thereof is omitted. An example of the relation between the focal length of the liquid crystal lens 7 in the static state, and the voltage applied to the liquid crystal lens 7 to make the focal length of the liquid crystal lens 7 a given value is also the same as in the first embodiment shown in FIG. 7, therefore explanation thereof is omitted.

In FIG. 7, for example, when the response of the liquid crystal has been completed while applying 5 V to the peripheral electrode 22 of the pattern electrode 10 and 1 V to the core electrode 20 of the pattern electrode 10, the focal length of the liquid crystal lens 7 is 100 mm. Also, when the response of the liquid crystal has been completed while applying 1 V to both the core electrodes 20 of the pattern electrodes 10 and the peripheral electrode 22 of the pattern electrodes 10, the focal length of the liquid crystal lens 7 becomes infinite.

Next, the voltage application pattern to the liquid crystal lens 7 for changing the liquid crystal lens 7 into both the convex lens state and the concave lens state is explained. The liquid crystal lens 7 becomes in the convex lens state when the voltage Vouter applied to the peripheral electrode 22 in the pattern electrode 10 is higher than the voltage Vinner applied to the core electrode 20, and when the situation is reversed, it becomes in the concave lens state.

Since the voltage application pattern to the liquid crystal lens and the change of the inverse of a focal length in the focus signal collective extraction control are the same as those of the first embodiment shown in FIGS. 8-1 to 8-3, explanation thereof is omitted.

If the first voltage V1 is set to 0 V and the second voltage V2 is set to 5 V, the voltage Vouter of the peripheral electrode 22 rises at time T0, and at this time, the transient response operation time tf of the liquid crystal lens 7 at the low temperature 0° C. is about 650 ms, as shown in FIG. 33.

The voltage Vinner of the core electrode 20 rises at time T1, and at this time, the transient response operation time tf of the liquid crystal lens 7 at the low temperature 0° C. is about 650 ms, as shown in FIG. 33. Further, the voltage Vouter of the peripheral electrode 22 falls at time T2, and the transient response operation time tr of the liquid crystal lens 7 at this time at the low temperature 0° C. is about 650 ms, as shown in FIG. 33. Therefore, the time required to complete the autofocus control is about 1.95 seconds in total.

Next, the focus signal serial extraction control step, S704, shown in FIG. 34 is explained. The focus signal serial extraction control step at S704 applies the driving voltages corresponding to a given position to the liquid crystal lens, obtains an autofocus signal after the response time in FIG. 33 has elapsed, and then, applies the driving voltages corresponding to the next position to the liquid crystal lens, and after the response time in FIG. 33 has elapsed, obtains the autofocus signal again.

Figures 1, 36:
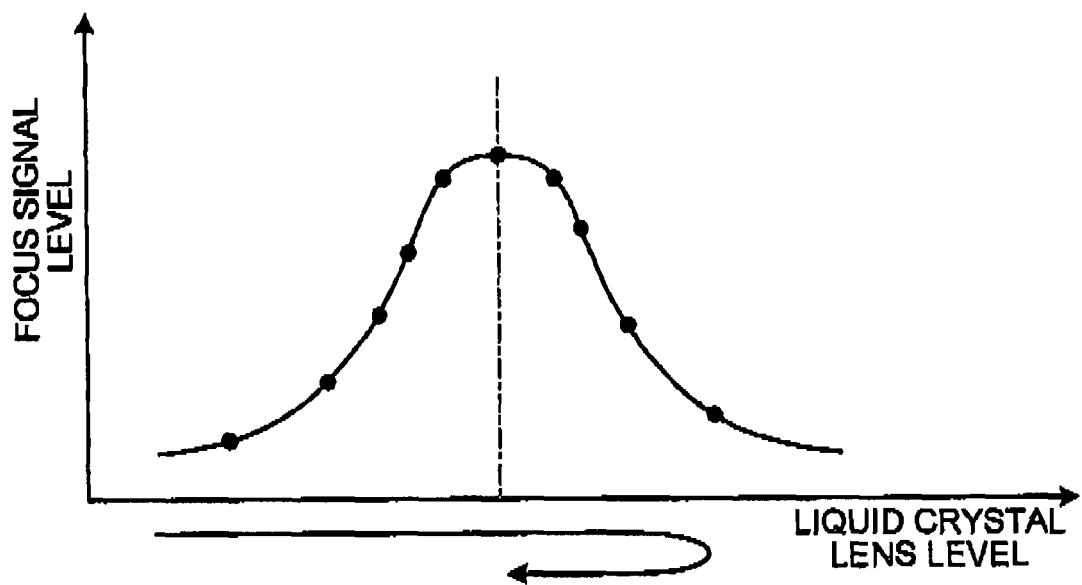
Figures 2, 36:
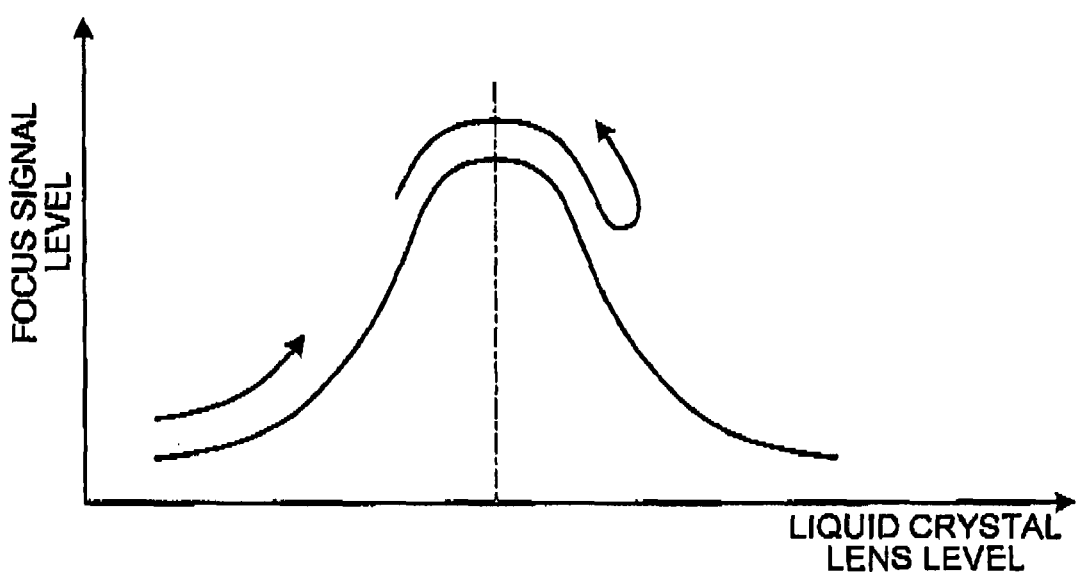

Here, the voltage application method to the liquid crystal lens 7 in this focus signal serial extraction unit is explained referring to FIGS. 35-1, 35-2, 35-3, 36-1, and 36-2. FIGS. 35-1, 35-2, and 35-3 are graphs showing the voltage application patterns to the liquid crystal lens, and the changes of the inverse of the focal length in the focus signal serial extraction control. FIGS. 36-1 and 36-2 are graphs showing schematically the operation of the focus signal serial extraction control.

First, an autofocus signal is obtained in the condition where a voltage V4 is applied to the peripheral electrode 22 of the pattern electrode 10 and a voltage V1 is applied to the core electrode 20 of the pattern electrode 10. Next, at time T0, the voltage applied to the peripheral electrode 22 is changed to V3, and the next autofocus signal is obtained after time Ts0 when the response of the liquid crystal completes. Next, at time T1, the voltage applied to the peripheral electrode 22 is changed to V2, and the next autofocus signal is further obtained after the time Ts1 when the response of the liquid crystal completes. Next, at time T2, the voltage applied to the peripheral electrode 22 is changed to V1, and the subsequent autofocus signal is still further obtained after time Ts2 when the response of the liquid crystal completes. Next, at time T3, the voltage applied to the core electrode 20 is changed to V2, and the subsequent autofocus signal is further obtained after the time Ts3 when the response of the liquid crystal completes. After this, by repeating similar procedures until Ts5, the autofocus signals of all the focus regions can be obtained.

Here, with the scanning procedure as shown in FIG. 36-1, the maximum is obtained after the autofocus signals of all the focus regions are obtained, but by the hill-climbing method as shown in FIG. 36-2, the procedure of obtaining the maximum by successively comparing the magnitude of the obtained autofocus signal to that of the preceding one may be adopted.

Seventh Embodiment

Figures 37, 38:
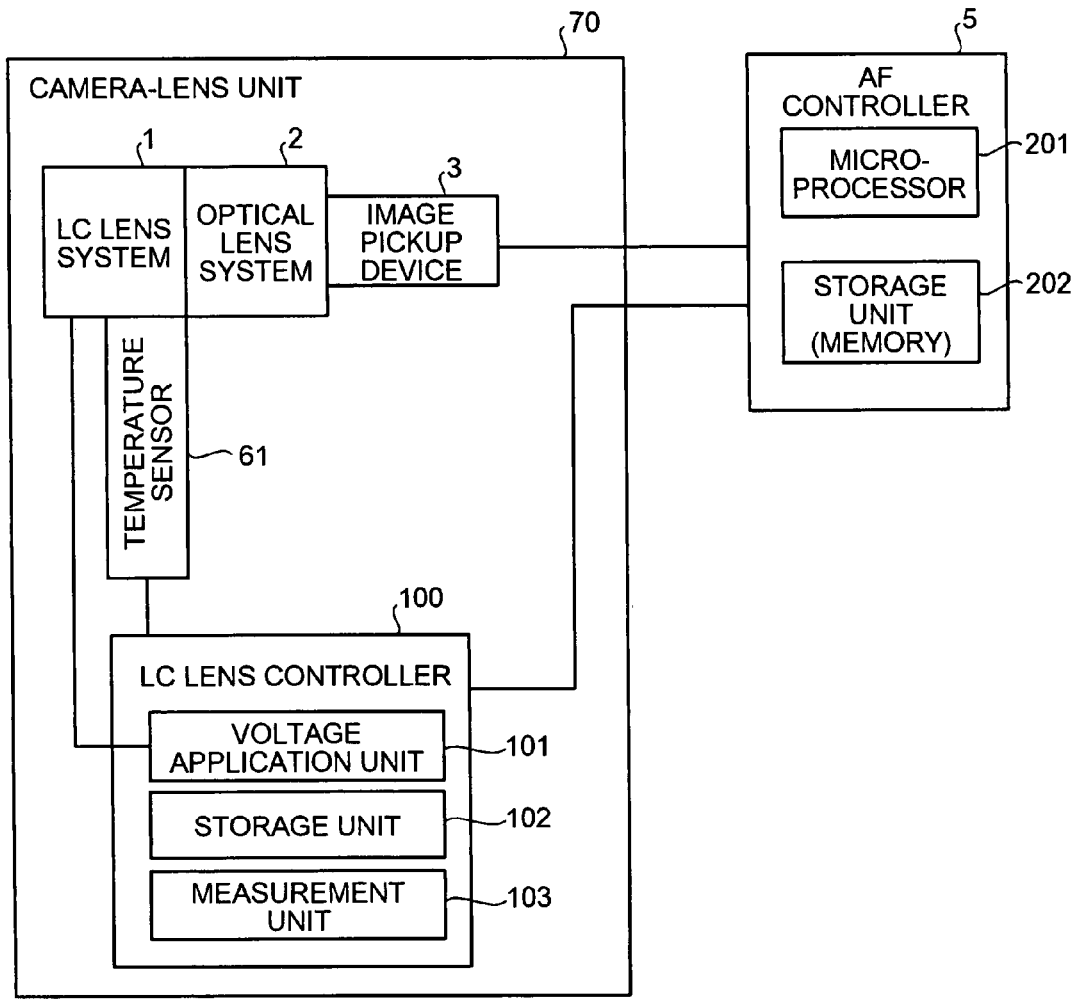
FIG. 37 is a block diagram of an autofocus device according to a seventh embodiment.
FIG. 38 is a table showing the voltages to be applied and lens levels with respect to focal lengths.

FIG. 37 is a block diagram of a schematic configuration of the autofocus device of the present invention. As shown in FIG. 37, the autofocus device of the present invention includes a camera lens unit 70 and the autofocus controller 5. Here, the camera lens unit 70 is equipped with the liquid crystal lens system 1, the optical lens system 2, the image pickup device 3, a liquid crystal (LC) lens controller 100, and the temperature sensor 61. The liquid crystal lens system 1 has a configuration in which the liquid crystal lens for the P wave and the liquid crystal lens for the S wave are combined. The optical lens system 2 has an aperture, a pan-focus group lens, and an infrared-ray cut filter. The image pickup device 3 has an image sensor including a solid state image pickup device such as CCD and CMOS, and an analog-digital converter. The temperature sensor 61 measures the temperature of the liquid crystal lens system 1, and is arranged near the liquid crystal lens system 1.

The optical images focused by passing through the liquid crystal lens system 1 and the optical lens system 2 are changed into electrical signals by the image sensor of the image pickup device 3. The electrical signals output from the image sensor are changed into digital signals by the analog-digital converter. The autofocus controller 5 extracts the high frequency component of the images in a specific region by sampling at predetermined cycles from the digital signals output from the analog-digital converter to obtain the focus signals (hereafter, "autofocus signals"). And the lens level at which the autofocus signal level becomes the maximum is judged based on the obtained plural autofocus signals, and the lens level for the maximum autofocus signal is set to the liquid crystal lens controller 100.

The autofocus controller 5 has a microprocessor 201 to perform a series of controls mentioned above, and a (second) storage unit 202. The (second) storage unit 202 has a read-only memory unit (ROM unit) that stores the programs executed by the microprocessor 201, and a writable memory unit (RAM unit) that is used as a working area of the microprocessor 201.

The liquid crystal lens controller 100 is equipped with a voltage applying unit 101, a (first) storage unit 102, and a measuring unit 103. Upon receiving a transient response initiation request from the autofocus controller 5, the measuring unit 103 measures the elapsed time from the initiation of transient response. In the (first) storage unit 102, the elapsed time from the initiation of the transient response and the lens level at that time, are stored beforehand for each temperature. The voltage applying unit 101 applies voltages to the liquid crystal lens system 1 with the driving method mentioned afterwards during the transient response.

The liquid crystal lens system 1 and the optical lens system 2 correspond to the optical lens unit. The image pickup device 3 corresponds to the photoelectric converting unit. The autofocus controller 5 corresponds to the focus signal extracting unit of the liquid crystal lens control unit, the focus point judging unit, and the second storage unit. The liquid crystal lens controller 100 corresponds to the voltage applying unit of the liquid crystal lens control unit, the first storage unit, and the measuring unit. The temperature sensor 61 corresponds to the temperature detecting unit.

In this way, since the liquid crystal lens controller 100 in the camera lens unit 70 holds lens levels corresponding to the elapsed time from the initiation of the transient response, the autofocus controller 5 can obtain the lens levels correctly, without taking into account the characteristics and the variations of the liquid crystal panel.

Since the configuration of the liquid crystal lens system 1 in the autofocus device according to the seventh embodiment is the same as that of the autofocus device according to the first embodiment shown in FIGS. 2 and 3, explanation thereof is omitted. Also, since the configuration of the pattern electrode 10 provided to the liquid crystal lens 7 in the autofocus device according to the seventh embodiment, and the effects of this liquid crystal lens 7 are the same as those of the autofocus device according to the first embodiment shown in FIG. 4, explanation thereof is omitted. The change in the refractive index when a voltage is applied to the liquid crystal in a condition that the light having the polarization plane in the same direction as the alignment direction of the liquid crystal is passing through the liquid crystal, is also the same as that of the autofocus device according to the first embodiment shown in FIG. 5, those explanations are omitted. Since the profile of the change of the refractive index of the liquid crystal in the transient response operation period tf upon the rise of the driving voltage in the autofocus device according to the seventh embodiment, and the profile of the change of the focal length of the liquid crystal lens 7 are the same as those of the first embodiment shown in FIG. 6, explanation thereof is omitted.

Next, the voltage application method to the liquid crystal lens 7 is explained referring to FIGS. 16-1 to 16-3 of the first embodiment. For example, as shown in FIGS. 16-1 and 16-2, first, the voltage Vouter applied to the peripheral electrode 22 is set to the second voltage V2, and the voltage Vinner applied to the core electrode 20 is set to the first voltage V1. Subsequently, at time T0, only the voltage Vinner of the core electrode 20 is changed to the second voltage V2. Then, at time T1, only the voltage Vouter of the peripheral electrode 22 is changed to the first voltage V1, and the operation is terminated at time T2.

The liquid crystal lens 7 is, in the convex lens state with the maximum lens power at time T0, in the convex lens state in which the lens power gradually becomes smaller in the period from time T0 to time T1, and in the parallel glass state at time T1. The liquid crystal lens 7 is in the concave lens state in which the lens power gradually becomes larger in the period from time T1 to time T2, and is in the concave lens state with the maximum lens power at time T2.

As shown in FIG. 16-3, the value of 1/f is the maximum positive value at the time T0, then, changes along an upward convex curve between the time T0 and the time T1, and then, along a downward convex curve after passing an inflection point to become zero, and changes along a downward convex curve to reach the maximum negative value at time T2 between time T1 and time T2.

Here, the relation between the focal length of the liquid crystal lens 7 in the static state and the applied voltage is shown and the lens level in that time is defined. FIG. 38 is a table showing the voltage to apply and the lens level against the focal length.

First, the relation between the focal length of the liquid crystal lens 7 and the applied voltage to the pattern electrode is explained. For example, as shown in FIG. 38, when the response of the liquid crystal has been completed while applying 5 V to the peripheral electrode 22 of the pattern electrode 10, and 1V to the core electrode 20 of the pattern electrode 10, the focal length f of the liquid crystal lens 7 becomes 100 mm. Moreover, when the response of the liquid crystal has been completed while applying 1 V to both the core electrode 20 of the pattern electrode 10 and the peripheral electrode 22 of the pattern electrode 10, the focal length f of the liquid crystal lens 7 becomes infinite ($\infty$).

Next, the voltage application pattern to the liquid crystal lens 7 for changing the liquid crystal lens 7 to both the convex lens state and that the concave lens state is explained. The liquid crystal lens 7 becomes in the convex lens state when the voltage Vouter applied to the peripheral electrode 22 in the pattern electrode 10 is higher than the voltage Vinner applied to the core electrode 20, and when the situation is reversed, the liquid crystal lens 7 becomes in the concave lens state.

Next, the lens level for the liquid crystal lens 7 is defined. For example, as shown in FIG. 38, the lens level at the focal length of 100 mm is defined as "0", and similarly the lens level at the focal length of 200 mm as "1", at the focal length of 500 mm as "2", at the focal length of 1000 mm as "3", at the focal length of as "4", at the focal length of −1000 mm as "5", at the focal length of −500 mm as "6", at the focal length of −200 mm as "7", and the lens level at the focal length of −100 mm is defined as "8", respectively.

Figure 39:
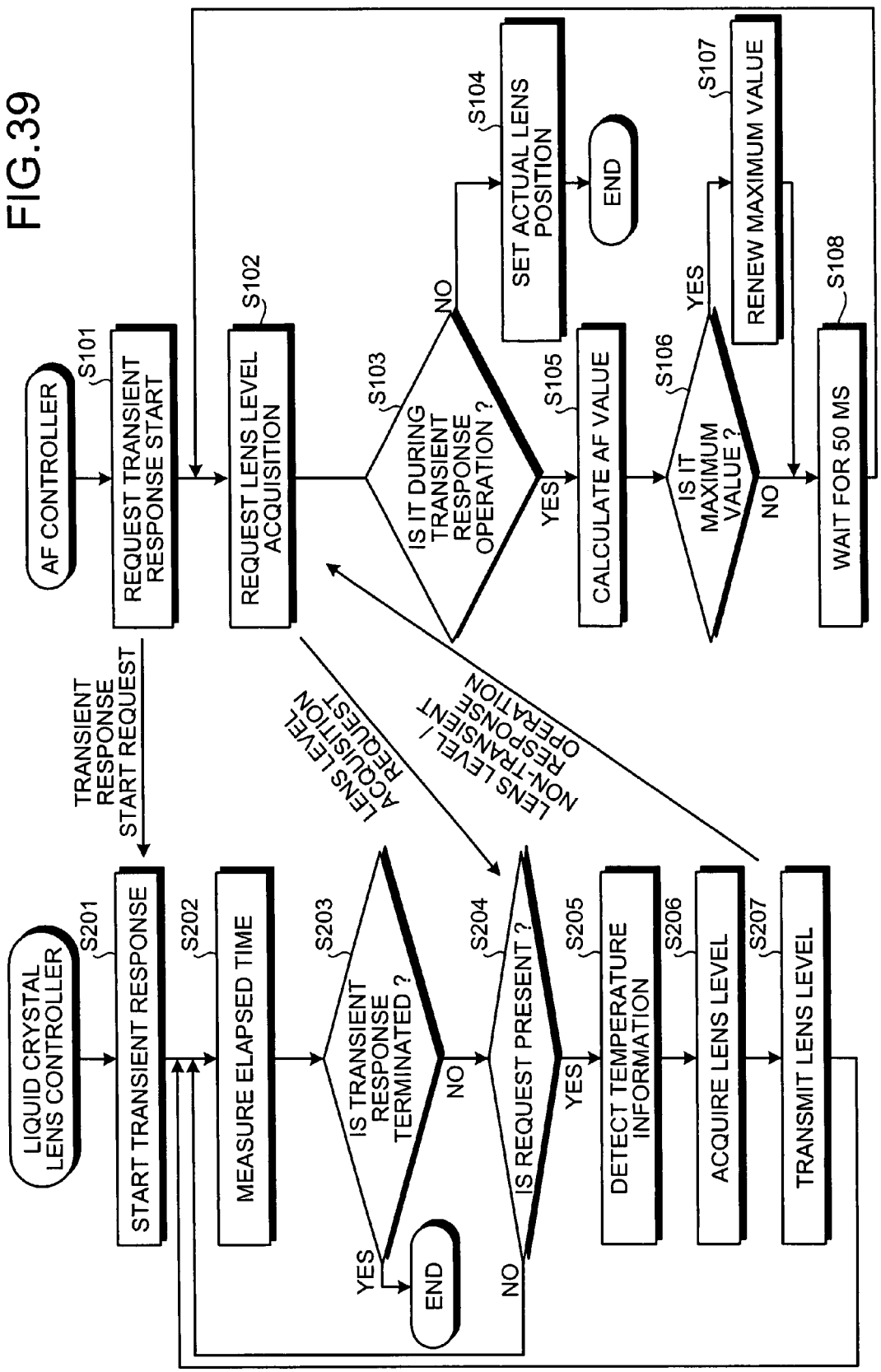
FIG. 39 a flowchart of an autofocus operation of the autofocus device according to the seventh embodiment.

Next, the autofocus process in the autofocus controller 5 and the liquid crystal lens controller 100 is explained referring to a flowchart shown in FIG. 39. FIG. 39 is a flowchart showing the autofocus operation of the autofocus device of the seventh embodiment.

When the autofocus processing is initiated, the autofocus controller 5 first outputs a transient response initiation request to the liquid crystal lens controller 100 (step S101). And in step S102, the autofocus controller 5 outputs a lens level acquisition request to the liquid crystal lens controller 100 (step S102).

On the other hand, upon receiving the transient response initiation request from the autofocus controller 5, the liquid crystal lens controller 100 initiates the transient response operation by the voltage application method mentioned above (step S201). Here, at the initiation of the transient response, the measuring unit 103 starts to measure the elapsed time after the start of the transient response operation (step S202).

And, the liquid crystal lens controller 100 compares the transient response completion time stored beforehand in the (first) storage unit 102 with the elapsed time measured by the measuring unit 103 (step S203), and finishes the transient response operation, if the transient response completion time has passed (step S203: YES).

On the other hand, if the transient response completion time has not passed in step S203 (step S203: NO), the liquid crystal lens controller 100 judges whether the lens level acquisition request (the request) has received from the autofocus controller 5 (step S204). Here, when the lens level acquisition request has not been received from the autofocus controller 5 (step S204: NO), process returns to step S202, and repeats processes at step S203 and step S204.

When the lens level acquisition request has been received from the autofocus controller 5 in step S204 (step S204: YES), the temperature sensor 61 detects the temperature information near the liquid crystal lens system 1 (step S205), and the liquid crystal lens controller obtains the lens level corresponding to the elapsed time from transient response initiation from a lens level table for every temperature information stored in the (second) storage unit 202 (step S206), and transmits the lens level to the autofocus controller 5 (step S207). When the transient response operation has been completed, a negative value, for example, is transmitted as the lens level that the transient response operation shows, to the autofocus controller 5 instead of the lens level.

On the other hand, when the autofocus controller 5 receives the lens level from the liquid crystal lens controller 100, it is judged whether the transient response is in operation (step S103), and if in operation, the autofocus controller 5 computes the autofocus (AF) value (step S105) and judges whether it is the maximum autofocus value after the start of the transient response (step S106). When it is the maximum autofocus value (step S106: YES), the autofocus value and the lens level at that time is held (updated) in the (second) storage unit 202 in the autofocus controller 5 (step S107). On the other hand, when it is not the maximum autofocus value (step S106: NO), the process proceeds to step S108 without doing anything.

And after a frame time of 50 milliseconds (step S108), for example, the process returns to step S102, and the process in step S102 is repeated until the transient response operation is completed. If the transient response operation has been completed in step S103 (step S103: NO), the lens level that has been the maximum autofocus value among those stored in the (second) storage unit 202 is set up to the liquid crystal lens controller 100 (step S104), and a series of processing is completed.

Here, the lens level table stored in the first storage unit in step S206 is explained. FIG. 40 is a table showing an example of a correspondence table of the elapsed time from the start of the transient response operation and the lens level.

The lens level table stored in the (first) storage unit 102 given in the table shown in FIG. 40 indicates the relation between the elapsed time from the start of the transient response and the lens level, for each temperature state having been set up beforehand (here, the temperature states 1 to 4 are shown as an example). As for the data indicated on this table, the table is constituted based on the actual optical characteristics of the liquid crystal lens 7. Furthermore, the table of the elapsed times and the lens levels is prepared for temperature states with steps of 5° C. or 10° C. This should also be set based on the optical characteristics.

For example, in the temperature state 1, the lens level "0" is transmitted to the autofocus controller 5 at the time less than 150 ms after the start of the transient response. Similarly, the lens level "1" at the time from 150 ms to less than 250 ms, the lens level "2" at the time from 250 ms to less than 330 ms, the lens level "3" at the time from 330 ms to less than 450 ms, the lens level "4" at the time from 450 ms to less than 600 ms, the lens level "5" at the time from 600 ms to less than 680 ms, the lens level "6" at the time from 680 ms to less than 780 ms, the lens level "7" at the time from 780 ms to less than 900 ms, the lens level "8" at the time from 900 ms to less than 1000 ms, and a negative number at the time 1000 ms or more, respectively, is transmitted to the autofocus controller 5.

Also, in other temperature states 2-4, the same operations are performed based on the data shown in the table of FIG. 40. In addition, these data show an example, and the lens level can be controlled with a more sufficient precision by setting five or more temperature information.

As described above, according to the seventh embodiment, the focus point detection can be carried out with sufficient speed for practical use, by extracting collectively plural focus signals corresponding to the focus matching degree during the transient response operation of the liquid crystal lens 7. Moreover, by storing the lens level corresponding to the elapsed time from the start of the transient response in the liquid crystal lens controller 100 in the camera lens unit 70, the autofocus controller 5 can be designed and produced as an independent module, without the characteristics of the liquid crystal lens 7 being taken into account.

As explained above, according to the present invention, since plural autofocus signals are extracted by sampling image signals plural times during the transient response operation period of the liquid crystal lens 7, the focus point can be detected during one or two times of the transient response operation period of the liquid crystal lenses 7. Therefore, an autofocus device that can detect the focus point sufficiently speedily for practical use is obtained.

Moreover, according to the present invention, since the moving parts, such as an actuator for driving a lens are not required, downsizing of the device can be attained. Moreover, power consumption can be reduced. Further, since it is excellent in shock resistance, a merit of high reliability is also obtained. Also, since the liquid crystal lens system 1 serves also as the protective windowpane outside the optical lens system 2, downsizing of the device can be attained further.

In the above, the present invention is not limited to each embodiment mentioned described above, and various modifications can be applied. For example, the values indicated in the embodiments, such as those of dimensions, characteristics and times are only examples, and the present invention is not limited to those values. Also, the type of the liquid crystal is not limited to the nematic liquid crystals, either.

Moreover, the transient response operation times tf and tr of the liquid crystal are not always about 500 ms. For example, the response speed of the liquid crystal to the rise and the fall of a driving voltage varies depending on the driving system of the liquid crystal is whether the pulse height modulation method or the pulse width modulation method, resulting in variation of tf and tr.

Moreover, since the characteristics of the liquid crystal change depending on the material of the liquid crystal, the response speed of the liquid crystal to the rise and the fall of the driving voltage varies, resulting in variation of tf and tr. Especially when the TN (twist nematic) liquid crystal is used, influence of the rotational viscosity and the like is large.

Furthermore, alignment of the liquid crystal includes homogeneous (horizontal) alignment, homeotropic (vertical) alignment, hybrid alignment, twist alignment, and bend alignment. Depending on such alignment, the response speed of the liquid crystal to the rise and the fall of a driving voltage varies, resulting in variation of tf and tr. Moreover, tf and tr vary according to a configuration of cells and the like.

INDUSTRIAL APPLICABILITY

As described above, the autofocus device according to the present invention is useful for devices having autofocus functions, and is especially suitable for autofocus functions of a camera, a digital camera, a movie camera, a camera unit in a cellular phone equipped with a camera, a camera mounted on a vehicle, etc. as a rear monitor etc., a camera unit of an endoscope, and glasses having the function of changing power of the lens, and the like.

The invention claimed is:

1. An autofocus device comprising:
an optical lens unit including a liquid crystal lens;
a photoelectric converting unit that converts an optical image formed through the optical lens unit into an electrical signal to output an image signal; and
a liquid crystal lens control unit that extracts a focus signal corresponding to a focus matching degree from the image signal, and controls a driving condition of the liquid crystal lens such that the focus signal becomes maximum value, wherein
the liquid crystal lens control unit includes
a voltage applying unit that applies a predetermined voltage to the liquid crystal lens,
a focus signal extracting unit that extracts a plurality of focus signals by performing, at predetermined cycles, sampling of an image signal generated based on an optical image that has passed through the liquid crystal lens under transient response operation caused by application of the predetermined voltage by the voltage applying unit, and
a focus point judging unit that judges a maximum value of the focus signal based on the focus signals extracted by the focus signal extracting unit.

2. The autofocus device according to claim 1, wherein the voltage applying unit applies, as the predetermined voltage, a voltage to bring the liquid crystal lens into a convex lens state.

3. The autofocus device according to claim 1, wherein the voltage applying unit applies, as the predetermined voltage, a voltage to bring the liquid crystal lens into a concave lens state.

4. The autofocus device according to claim 1, wherein the voltage applying unit applies, as the predetermined voltage, a first voltage to bring the liquid crystal lens into a convex lens state, and a second voltage to bring the liquid crystal lens into a concave lens state, at different timings.

5. The autofocus device according to claim 4, wherein the voltage applying unit applies voltage such that a period is present in which a third voltage that is neither to bring the liquid crystal lens into the convex lens state nor to bring the liquid crystal lens into the concave lens state is applied, between a period in which the first voltage is applied to the liquid crystal lens and a period in which the second voltage is applied to the liquid crystal lens.

6. The autofocus device according to claim 4, wherein when it is judged that the focus signal is at a maximum value while the liquid crystal lens is in the transient response operation caused by application of either one of the first voltage or the second voltage, the liquid crystal lens control unit cancels application of the other one of the first voltage and the second voltage to the liquid crystal lens.

7. The autofocus device according to claim 1, wherein
the liquid crystal lens includes a liquid crystal layer held between two transparent substrates each of which has a pattern electrode and a common electrode formed thereon, the pattern electrode including a core electrode and peripheral electrodes connected with resistors, and
the voltage applying unit applies different predetermined voltages to the core electrode and to the peripheral electrodes, and modulates amplitude of a smaller voltage of the different predetermined voltages.

8. The autofocus device according to claim 7, wherein the voltage applying unit modulates the amplitude such that the amplitude is enlarged only during a predetermined time, and then, is gradually attenuated to be returned to a predetermined amplitude.

9. The autofocus device according to claim 1, wherein
the liquid crystal lens includes a liquid crystal layer held between two transparent substrates each of which has a pattern electrode and a common electrode formed thereon, the pattern electrode including a core electrode and peripheral electrodes connected with resistors, and
the voltage applying unit applies different predetermined voltages to the core electrode and to the peripheral electrodes, and modulates a pulse width of a smaller voltage of the different predetermined voltages.

10. The autofocus device according to claim 9, wherein the voltage applying unit modulates the pulse width such that the pulse width is widened only during a predetermined time, and then, is gradually narrowed to be returned to a predetermined pulse width.

11. The autofocus device according to claim 1, wherein the focus signal extracting unit includes
a focus signal serial extraction unit that extracts a plurality of focus signals by performing the sampling in a state in which liquid crystal operation of the liquid crystal lens is stable, the state obtained while changing the voltage applied to the liquid crystal lens by the voltage applying unit; and
a focus signal collective extraction unit that extracts a plurality of focus signals by performing, at predetermined cycles, the sampling of the image signal generated based on the optical image that has passed through the liquid crystal lens under the transient response operation caused by application of the predetermined voltage by the voltage applying unit.

12. The autofocus device according to claim 11, wherein the liquid crystal lens control unit further includes an extraction method selecting unit that performs selection between the focus signal serial extraction unit and the focus signal collective extraction unit.

13. The autofocus device according to claim 12, further comprising a temperature detecting unit that detects temperature of the liquid crystal lens, wherein
the extraction method selecting unit selects the focus signal serial extraction unit or the focus signal collective extraction unit based on information indicative of the temperature detected by the temperature detecting unit.

14. The autofocus device according to claim 1, wherein the liquid crystal lens control unit further includes
a measuring unit that measures elapsed time since the sampling is started;
a first storage unit that stores data in which a focal length of the liquid crystal lens and the elapsed time are associated; and
a second storage unit that stores a focal length corresponding to a focus signal judged to be maximum based on the elapsed time using the data stored in the first storage unit, and
the liquid crystal lens control unit adjusts the liquid crystal lens to the focal length after the sampling is completed, regarding the focal length stored in the second storage unit as a focal length of the focus point.

15. The autofocus device according to claim 1, further comprising a temperature detecting unit that detects temperature of the liquid crystal lens, wherein
the first storage unit stores a plurality of pieces of data in which a focal length at each temperature and the elapsed time are associated for each temperature, and
a focal length is stored in the second storage unit using data corresponding to temperature information from the temperature detecting unit.

16. The autofocus device according to claim 14, further comprising:
a camera lens unit including the voltage applying unit, the focus signal extracting unit; the measuring unit, the first storage unit; the optical lens unit, and the photoelectric converting unit; and
an autofocus controller including the focus point judging unit and the second storage unit, wherein
the camera lens unit and the autofocus controller are connected through an interface, and
the voltage applying unit and the focus signal extracting unit in the camera lens unit are operated by an instruction from the autofocus controller to store a desired focal length in the second storage unit.

* * * * *